US012600398B2

(12) United States Patent
Sack et al.

(10) Patent No.: US 12,600,398 B2
(45) Date of Patent: Apr. 14, 2026

(54) MULTI-FOLD CHILD CARRIAGE

(71) Applicant: Wonderland Switzerland AG, Steinhausen (CH)

(72) Inventors: Daniel A. Sack, Mohnton, PA (US); Patrick J. G. Bowers, West Chester, PA (US); Curtis M. Hartenstine, Birdsboro, PA (US); Andrew J. Horst, Morgantown, PA (US); Colin F. Eggert-Crowe, King of Prussia, PA (US); Lance J. Clemmer, Mohnton, PA (US)

(73) Assignee: WONDERLAND SWITZERLAND AG, Steinhausen (CH)

( * ) Notice: Subject to any disclaimer, the term of this patent is extended or adjusted under 35 U.S.C. 154(b) by 250 days.

(21) Appl. No.: 18/258,367

(22) PCT Filed: Dec. 20, 2021

(86) PCT No.: PCT/US2021/064457
§ 371 (c)(1),
(2) Date: Jun. 20, 2023

(87) PCT Pub. No.: WO2022/140305
PCT Pub. Date: Jun. 30, 2022

(65) Prior Publication Data
US 2024/0034384 A1 Feb. 1, 2024

Related U.S. Application Data

(60) Provisional application No. 63/237,443, filed on Aug. 26, 2021, provisional application No. 63/174,843, (Continued)

(51) Int. Cl.
B62B 9/26 (2006.01)
A47D 11/00 (2006.01)
(Continued)

(52) U.S. Cl.
CPC ................ B62B 9/26 (2013.01); A47D 11/00 (2013.01); A47D 13/027 (2022.08);
(Continued)

(58) Field of Classification Search
CPC B62B 7/145; B62B 7/06; B62B 7/062; B62B 7/08; B62B 7/142; B62B 9/203;
(Continued)

(56) References Cited

U.S. PATENT DOCUMENTS 2,564,862 A 8/1951 Stopinski
5,516,142 A 5/1996 Hartan
(Continued)

FOREIGN PATENT DOCUMENTS

CA 2554667 A1 9/2005
CN 1344647 A * 4/2002
(Continued)

OTHER PUBLICATIONS

Chinese Application No. 202123257322.9 filed Dec. 21, 2021; First Notification to Make Rectification dated Apr. 22, 2022; 2 pages.
(Continued)

*Primary Examiner* — John D Walters
(74) *Attorney, Agent, or Firm* — CANTOR COLBURN LLP

(57) ABSTRACT

In one example, a child carriage has a frame with wheels. The frame has a coupler that removably couples the child carriage to a child carrier, such as a seat or bassinet. The frame has first and second leg assemblies, each having a front leg and a rear leg that are pivotably coupled about a first axis. The first crosspiece extends between the front legs of the first and second leg assemblies, and the second crosspiece extends between the rear legs of the first and second leg assemblies. The carriage is devoid of any push handle that extends above the child carrier. The frame folds (Continued)

about (i) the first axis from an expanded configuration to a first folded configuration so as to align hinges of the first and second crosspieces along a second axis, and (ii) the second axis from the first folded configuration to a second folded configuration.

24 Claims, 33 Drawing Sheets

Related U.S. Application Data filed on Apr. 14, 2021, provisional application No. 63/128,441, filed on Dec. 21, 2020.

(51) Int. Cl.

| | |
|---|---|
| *A47D 13/02* | (2006.01) |
| *B60N 2/28* | (2006.01) |
| *B62B 7/06* | (2006.01) |
| *B62B 7/08* | (2006.01) |
| *B62B 7/14* | (2006.01) |
| *B62B 9/20* | (2006.01) |

(52) U.S. Cl.
CPC ......... *B60N 2/2845* (2013.01); *B60N 2/2848* (2013.01); *B62B 7/06* (2013.01); *B62B 7/062* (2013.01); *B62B 7/08* (2013.01); *B62B 7/142* (2013.01); *B62B 7/145* (2013.01); *B62B 9/203* (2013.01); *B62B 2202/023* (2013.01); *B62B 2205/20* (2013.01); *B62B 2205/22* (2013.01)

(58) Field of Classification Search
CPC ......... B62B 9/26; A47D 13/027; A47D 11/00; B60N 2/2845; B60N 2/2848
See application file for complete search history.

(56) References Cited

U.S. PATENT DOCUMENTS

| | | | |
|---|---|---|---|
| 6,273,451 B1 | 8/2001 | Julien et al. | |
| 6,766,930 B2 | 7/2004 | Dixon et al. | |
| 6,793,280 B2 | 9/2004 | Washizuka et al. | |
| 7,021,825 B1 | 4/2006 | Schultz | |
| 7,090,239 B2 * | 8/2006 | Yoshie | B62B 7/06 |
| | | | 280/47.38 |
| 7,513,512 B2 * | 4/2009 | Yoshie | B60N 2/2845 |
| | | | 280/47.38 |
| 7,543,841 B2 | 6/2009 | Dotsey et al. | |
| 7,694,996 B2 * | 4/2010 | Saville | B62B 7/062 |
| | | | 280/47.38 |
| 8,491,000 B2 * | 7/2013 | Yeh | B62B 7/142 |
| | | | 280/647 |
| 9,238,520 B2 | 1/2016 | Jeremiah | |
| 9,242,585 B2 | 1/2016 | Kozinski | |
| 9,260,039 B1 | 2/2016 | Satterfield | |
| 9,428,207 B2 | 8/2016 | Hartenstine et al. | |
| 9,545,941 B2 | 1/2017 | Pacella et al. | |
| 9,578,938 B1 | 2/2017 | Verneuille | |
| 9,725,106 B2 * | 8/2017 | Pos | B62B 9/102 |
| 9,834,243 B1 * | 12/2017 | Zhang | B62B 7/086 |
| 10,196,169 B2 | 2/2019 | Tsui | |
| 11,191,331 B2 | 12/2021 | Zemel et al. | |
| 11,851,099 B2 | 12/2023 | Nieuwenhuizen et al. | |
| 2001/0040357 A1 | 11/2001 | Barrrett et al. | |
| 2002/0005628 A1 | 1/2002 | Hartenstine et al. | |
| 2002/0109321 A1 | 8/2002 | Turner et al. | |
| 2004/0187212 A1 | 9/2004 | Pacella | |
| 2006/0119079 A1 | 6/2006 | Yoshie et al. | |
| 2007/0045975 A1 | 3/2007 | Yang | |
| 2007/0296182 A1 | 12/2007 | Saville et al. | |
| 2009/0127810 A1 | 5/2009 | Dotsey et al. | |
| 2010/0001492 A1 * | 1/2010 | Driessen | B62B 9/12 |
| | | | 280/642 |

| | | |
|---|---|---|
| 2010/0078916 A1 | 4/2010 | Chen |
| 2010/0230933 A1 | 9/2010 | Dean et al. |
| 2012/0025492 A1 | 2/2012 | Grintz et al. |
| 2012/0119457 A1 | 5/2012 | Williams |
| 2012/0228854 A1 | 9/2012 | Mountz |
| 2013/0001927 A1 | 1/2013 | Mellinger |
| 2013/0009388 A1 | 1/2013 | Funakara |
| 2013/0134692 A1 | 5/2013 | Cheng et al. |
| 2013/0140797 A1 | 6/2013 | Fritz et al. |
| 2014/0097598 A1 | 4/2014 | Sundberg et al. |
| 2015/0091267 A1 | 4/2015 | Conner |
| 2015/0251681 A1 | 9/2015 | Castillo |
| 2015/0360709 A1 | 12/2015 | Pos |
| 2016/0286917 A1 | 10/2016 | Lewis |
| 2017/0240072 A1 | 8/2017 | Wright |
| 2017/0313337 A1 | 11/2017 | Horst |
| 2018/0208094 A1 | 7/2018 | Medina Luna et al. |
| 2019/0337550 A1 | 11/2019 | Eggert-Crowe et al. |
| 2024/0017759 A1 | 1/2024 | Sack et al. |
| 2024/0034383 A1 | 2/2024 | Sack et al. |
| 2024/0034386 A1 | 2/2024 | Sack et al. |
| 2024/0298817 A1 | 9/2024 | Sack et al. |
| 2024/0341499 A1 | 10/2024 | Sack et al. |

FOREIGN PATENT DOCUMENTS

| | | |
|---|---|---|
| CN | 1158204 C | 7/2004 |
| CN | 101553391 B | 1/2011 |
| CN | 101823499 B | 5/2012 |
| CN | 204998593 U | 1/2016 |
| CN | 206087706 U | 4/2017 |
| CN | 106428181 B | 10/2018 |
| CN | 110774133 A | 2/2020 |
| CN | 110775133 A | 2/2020 |
| CN | 111361624 A | 7/2020 |
| CN | 111497923 B | 7/2021 |
| DE | 8525146 U1 | 2/1986 |
| EP | 0939019 A1 | 9/1999 |
| JP | S62138636 U | 9/1987 |
| JP | S62138637 U | 9/1987 |
| JP | H01173070 A | 7/1989 |
| JP | 2002096734 A | 4/2002 |
| JP | 2008030741 A | 2/2008 |
| JP | 2010519094 A | 6/2010 |
| TW | I235122 B | 7/2005 |
| TW | M325257 U | 1/2008 |
| WO | 2008033014 A3 | 4/2009 |
| WO | 2022140306 A1 | 6/2022 |
| WO | 2022140307 A1 | 6/2022 |
| WO | 2022140308 A1 | 6/2022 |
| WO | 2022140310 A1 | 6/2022 |

OTHER PUBLICATIONS

Chinese Application No. 202123257322.9 filed Dec. 21, 2021; Notice of Allowance dated Jan. 5, 2023; 4 pages.
Chinese Application No. 202123257322.9 filed Dec. 21, 2021; Second Notification to Make Rectification dated Sep. 2, 2022; 1 page.
Chinese Application No. 202123258435.0 filed Dec. 21, 2021; First Notification to Make Rectification dated Apr. 22, 2022; 1 page.
Chinese Application No. 202123258435.0 filed Dec. 21, 2021; Notice of Allowance dated Jan. 16, 2023; 4 pages.
Chinese Application No. 202123258435.0 filed Dec. 21, 2021; Second Notification to Make Rectification dated Sep. 2, 2022; 1 page.
Chinese Application No. 202123270495.4 filed Dec. 21, 2021; First Notification to Make Rectification dated Apr. 22, 2022; 1 page.
Chinese Application No. 202123270495.4 filed Dec. 21, 2021; Notice of Allowance dated Jan. 5, 2023; 4 pages.
Chinese Application No. 202123270495.4 filed Dec. 21, 2021; Third Notification to Make Rectification dated Sep. 2, 2022; 1 page.
Chinese Application No. 202123270576.4 filed Dec. 21, 2021; First Notification to Make Rectification dated Apr. 22, 2022; 2 pages.
Chinese Application No. 202123270576.4 filed Dec. 21, 2021; Notice of Allowance dated Jan. 5, 2023; 5 pages.

(56) References Cited

OTHER PUBLICATIONS

Chinese Application No. 202123270576.4 filed Dec. 21, 2021; Second Notification to Make Rectification dated Sep. 2, 2022; 1 page.

International Search Report for International Application No. PCT/US2021/064457; International Filing Date: Dec. 20, 2021; Date of Mailing: Apr. 28, 2022; 4 pages.

International Search Report for International Application No. PCT/US2021/064459; International Filing Date: Dec. 20, 2021; Date of Mailing: Mar. 15, 2022; 3 pages.

International Search Report for International Application No. PCT/US2021/064464; International Filing Date: Dec. 20, 2021; Date of Mailing: Apr. 28, 2022; 4 pages.

International Search Report for International Application No. PCT/US2021/064465; International Filing Date: Dec. 20, 2021; Date of Mailing: Apr. 26, 2022; 4 pages.

International Search Report for International Application No. PCT/US2021/064467; International Filing Date: Dec. 20, 2021; Date of Mailing: Apr. 28, 2022; 5 pages.

Invitation to Pay Additional Fees for International Application No. PCT/US2021/064457; International Filing Date: Dec. 20, 2021; Date of Mailing: Feb. 15, 2022; 3 pages.

Invitation to Pay Additional Fees for International Application No. PCT/US2021/064464; International Filing Date: Dec. 20, 2021; Date of Mailing: Feb. 25, 2022; 2 pages.

Invitation to Pay Additional Fees for International Application No. PCT/US2021/064465; International Filing Date: Dec. 20, 2021; Date of Mailing: Feb. 25, 2022; 3 pages.

Invitation to Pay Additional Fees for International Application No. PCT/US2021/064467; International Filing Date: Dec. 20, 2021; Date of Mailing: Feb. 25, 2022; 2 pages.

Written Opinion for International Application No. PCT/US2021/064457; International Filing Date: Dec. 20, 2021; Date of Mailing: Apr. 28, 2022; 9 pages.

Written Opinion for International Application No. PCT/US2021/064459; International Filing Date: Dec. 20, 2021; Date of Mailing: Mar. 15, 2022; 9 pages.

Written Opinion for International Application No. PCT/US2021/064464; International Filing Date: Dec. 20, 2021; Date of Mailing: Apr. 28, 2022; 11 pages.

Written Opinion for International Application No. PCT/US2021/064465; International Filing Date: Dec. 20, 2021; Date of Mailing: Apr. 26, 2022; 8 pages.

Written Opinion for International Application No. PCT/US2021/064467; International Filing Date: Dec. 20, 2021; Date of Mailing: Apr. 28, 2022; 8 pages.

Extended European Search Report for European Application No. 21912004.5; Report Mail Date Jun. 7, 2024 (8 Pages).

International Preliminary Report on Patentability for International Application No. PCT/US2021/064457; International Filing Date: Dec. 20, 2021; Date of Mailing: Jun. 29, 2023; 11 pages.

International Preliminary Report on Patentability for International Application No. PCT/US2021/064459; International Filing Date: Dec. 20, 2021; Date of Mailing: Jun. 29, 2023; 11 pages.

International Preliminary Report on Patentability for International Application No. PCT/US2021/064464; International Filing Date: Dec. 20, 2021; Date of Mailing: Jun. 29, 2023; 13 pages.

International Preliminary Report on Patentability for International Application No. PCT/US2021/064465; International Filing Date: Dec. 20, 2021; Date of Mailing: Jun. 29, 2023; 10 pages.

International Preliminary Report on Patentability for International Application No. PCT/US2021/064467; International Filing Date: Dec. 20, 2021; Date of Mailing: Jun. 29, 2023; 10 pages.

U.S. Appl. No. 18/258,413; Non-Final Office Action dated Oct. 2, 2025; 42 pages.

European Application No. 219120006.0-1009; European Search Report dated Feb. 17, 2025; 11 pages.

European Application No. 21912002.0-1009; European Search Report dated Nov. 25, 2024; 9 pages.

European Application No. 21912003.7-1009; European Search Report dated Nov. 26, 2024; 10 pages.

European Application No. 21912005.0-1009; European Search Report dated Oct. 9, 2024; 10 pages.

Taiwanese Application No. 110147633; Office Action dated Jul. 4, 2025; 17 pages.

Taiwanese Application No. 110147636; Office Action dated Jul. 3, 2025; 12 pages.

Taiwanese Application No. 110147637; Office Action dated Jul. 3, 2025; 12 pages.

U.S. Appl. No. 18/258,413; Restriction Requirement dated Jul. 15, 2025; 9 pages.

JP Office Action with English Translation; JP Appl No. 2023-537685; issued Aug. 5, 2025; pp. 1-10, with English Translation.

Japanese Office Action, Application No. 2023537684, mailed Dec. 16, 2025, with English Translation, 12 pages.

* cited by examiner

MULTI-FOLD CHILD CARRIAGE

CROSS-REFERENCE TO RELATED APPLICATIONS

This application is a National Stage Application of PCT/US2021/064457, filed Dec. 20, 2021, which claims priority to U.S. provisional patent application No. 63/128,441, filed Dec. 21, 2020, U.S. provisional patent application No. 63/174,843, filed Apr. 14, 2021, and U.S. provisional patent application No. 63/237,443, filed Aug. 26, 2021, the disclosures of all of which are hereby incorporated by reference as if set forth in their entireties herein.

TECHNICAL FIELD

The present disclosure relates generally to wheeled carriages for transporting children.

BACKGROUND

Strollers are commonly used to transport young children, such as to push infants in infant car seats when the infant car seats are removed from a vehicle. Most strollers comprise a frame that can be folded so that they can be stored in a car trunk or other storage location. Reducing the size to which strollers fold has been a goal of the juvenile product industry for some time. Although improvements have been made in this area, there is still a desire in the industry to reduce the size to which strollers fold.

SUMMARY

In one example, a carriage for pushing a child carrier is removable from the carriage. The carriage comprises a frame and a plurality of wheels. The frame comprises at least one seat coupler, first and second leg assemblies, and first and second crosspieces. The at least one seat coupler is configured to removably couple the child carrier to the carriage. The first and second leg assemblies each comprise a front leg and a rear leg that are pivotably coupled to one another about a first pivot axis. The first crosspiece extends between the front legs of the first and second leg assemblies to space the front legs from one another and comprises a hinge. The second crosspiece extends between the rear legs of the first and second leg assemblies to space the rear legs from one another and comprises a hinge. The wheels are attached to the front and rear legs of the first and second leg assemblies. The carriage is devoid of any push handle that extends above the child carrier. The frame is configured to fold about the first pivot axis from an expanded configuration to a first folded configuration so as to align the hinges of the first and second crosspieces with one another along a second pivot axis. The frame is configured to fold about the second pivot axis from the first folded configuration to a second folded configuration.

In another example, a carriage comprises a frame, a basket, and a plurality of wheels. The frame is configured to support a removable child carrier above a riding surface. The frame comprises first and second leg assemblies, and first and second crosspieces. Each of the first and second leg assemblies comprises a front leg and a rear leg that are pivotably coupled to one another about a first pivot axis. The first crosspiece extends between the front legs of the first and second leg assemblies to space the front legs from one another and comprises a hinge. The second crosspiece extends between the first and second leg assemblies to space the rear legs from one another and comprises a hinge. The wheels are attached to the front and rear legs of the first and second leg assemblies. The basket is attached to the frame and disposed between the first and second leg assemblies. The basket has first and second sides, an open upper end, a closed lower end, and a rear end. The rear end extends between the first and second sides and extends outwardly from the second crosspiece along a longitudinal direction such that the second crosspiece is disposed within the basket below the upper end. The frame is configured to fold about the first pivot axis from an expanded configuration to a first folded configuration. The frame is configured to fold about a second pivot axis from the first folded configuration to a second folded configuration, the second pivot axis extending through the hinges of both the first and second crosspieces. The carriage is configured to be transitioned to the first and second folded configurations while the basket is attached to the frame.

BRIEF DESCRIPTION OF THE DRAWINGS

The following description of the illustrative embodiments may be better understood when read in conjunction with the appended drawings. It is understood that potential embodiments of the disclosed systems and methods are not limited to those depicted.

3

Figures 1, 2:
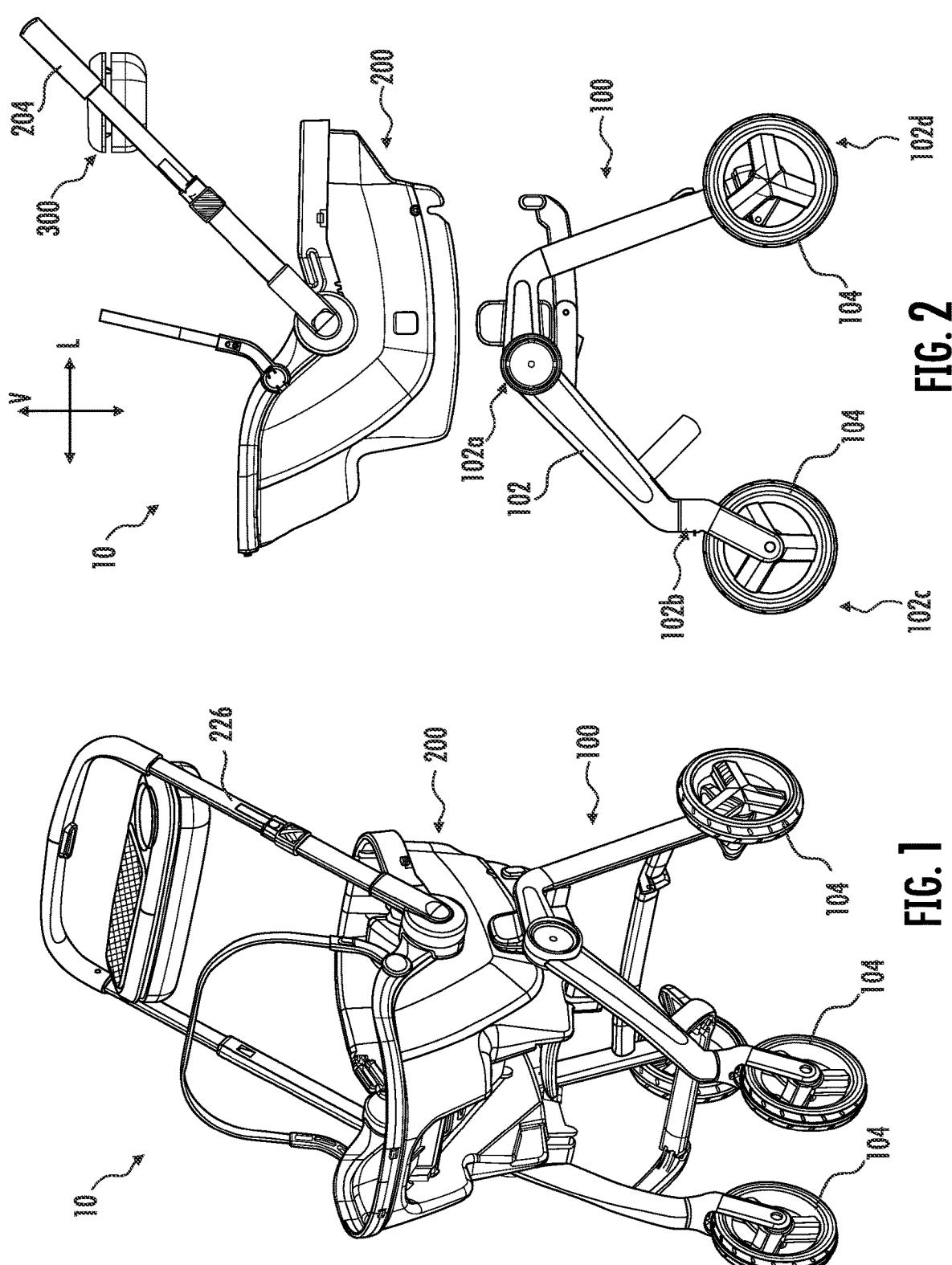
FIG. 1 shows a perspective view of a travel system according to one example that comprises a child carriage, a child carrier, and an organizer.
FIG. 2 shows a side view of the travel system of FIG. 1 with the child carrier decoupled from the child carriage.
Figure 3:
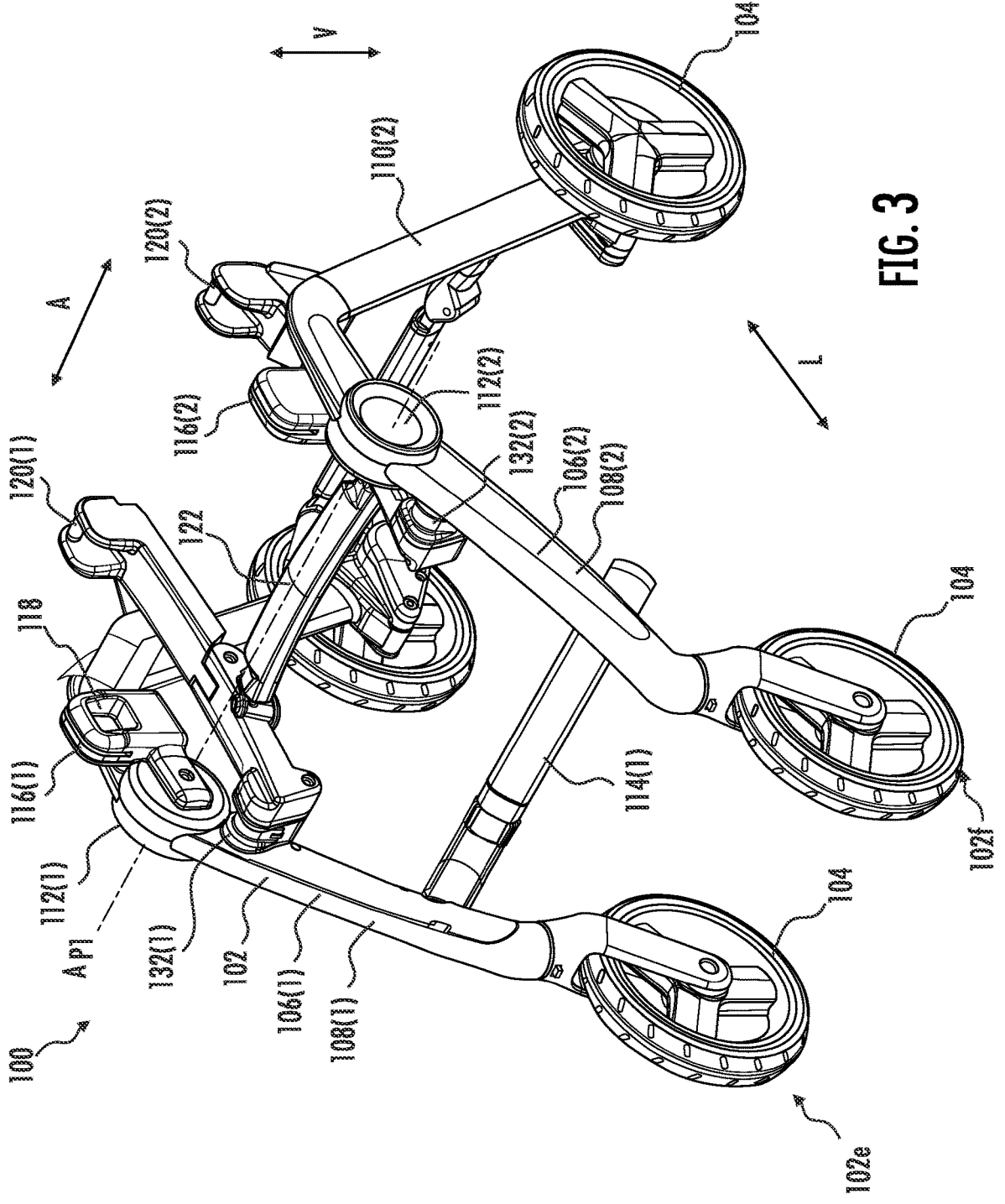
FIG. 3 shows a front perspective view of the child carriage of FIG. 1 according to one example.
Figure 9A:
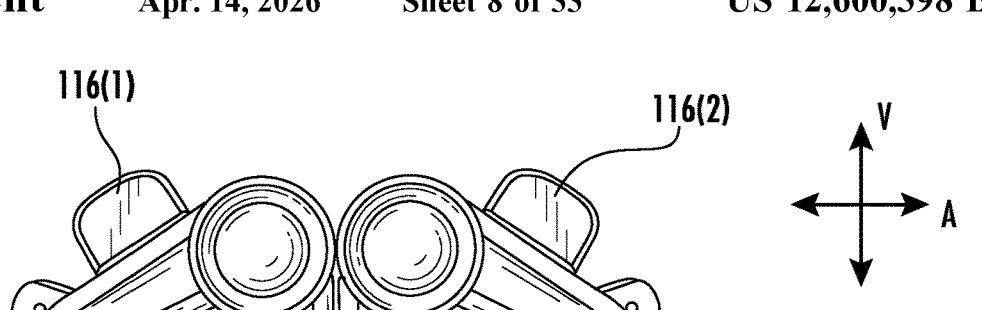
Figure 9A:
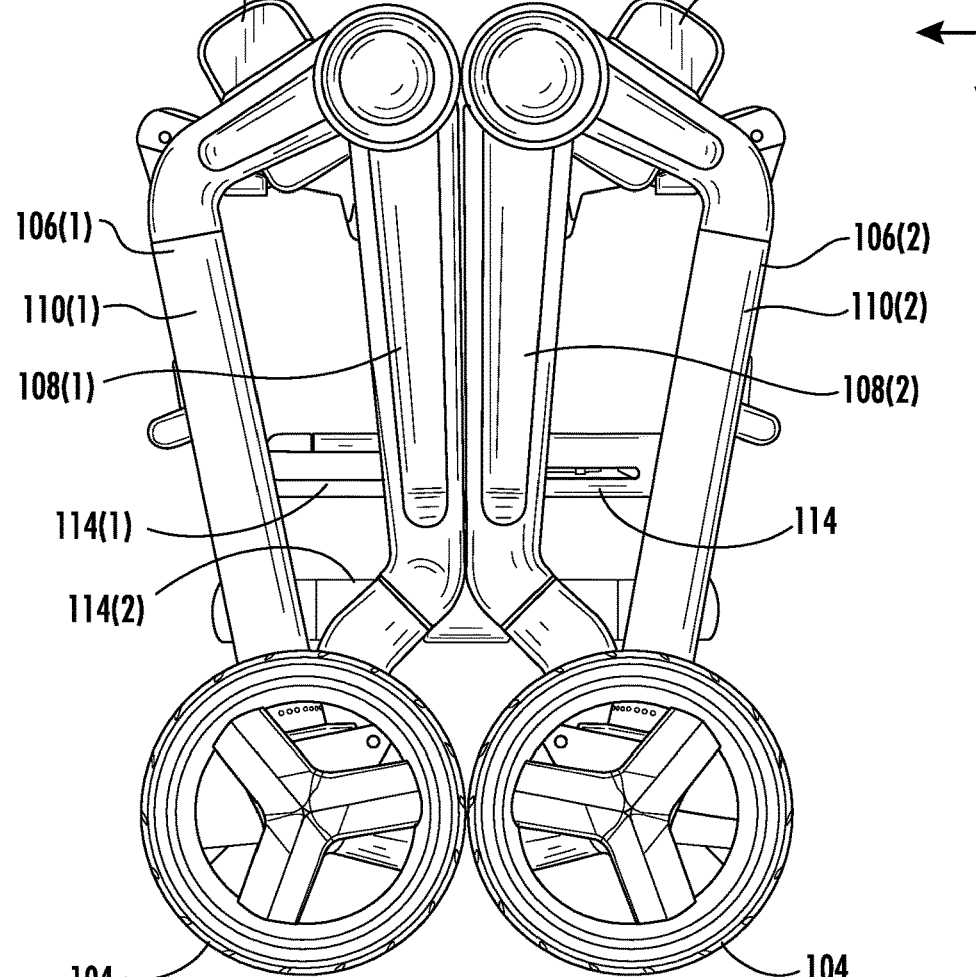
Figure 9B:
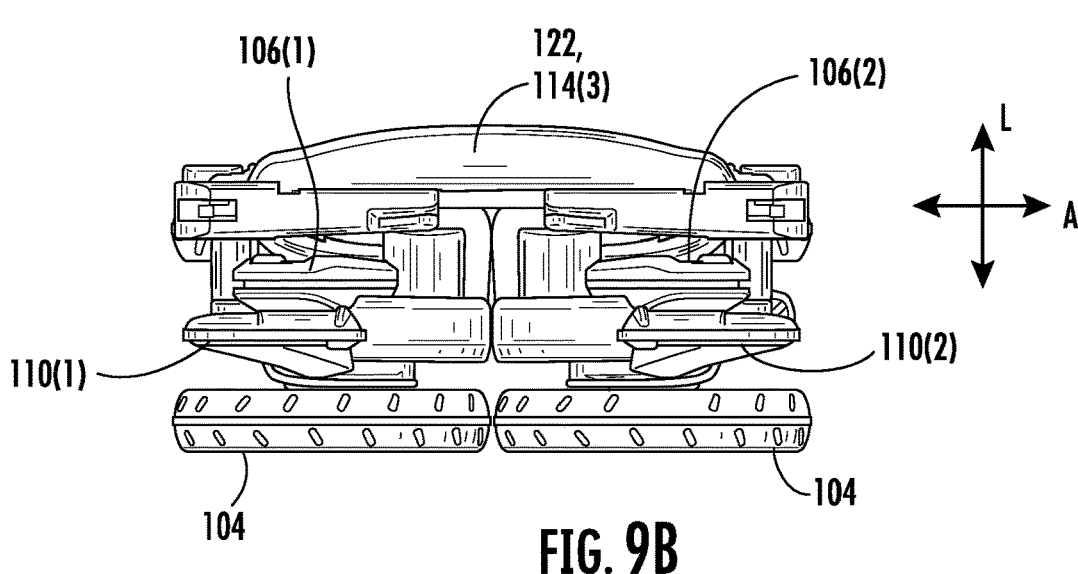
Figures 10, 11:
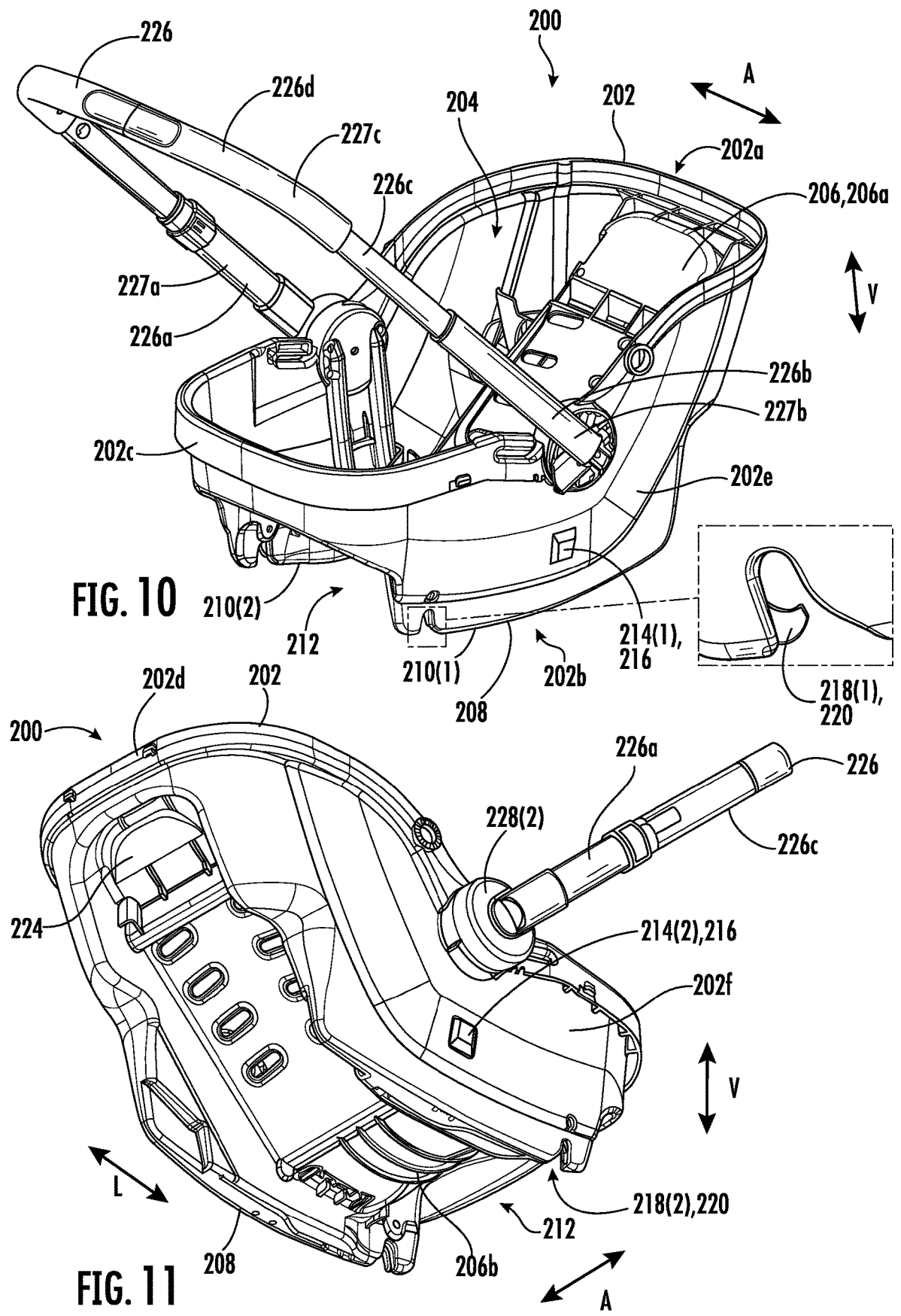
Figures 12A, 12B:
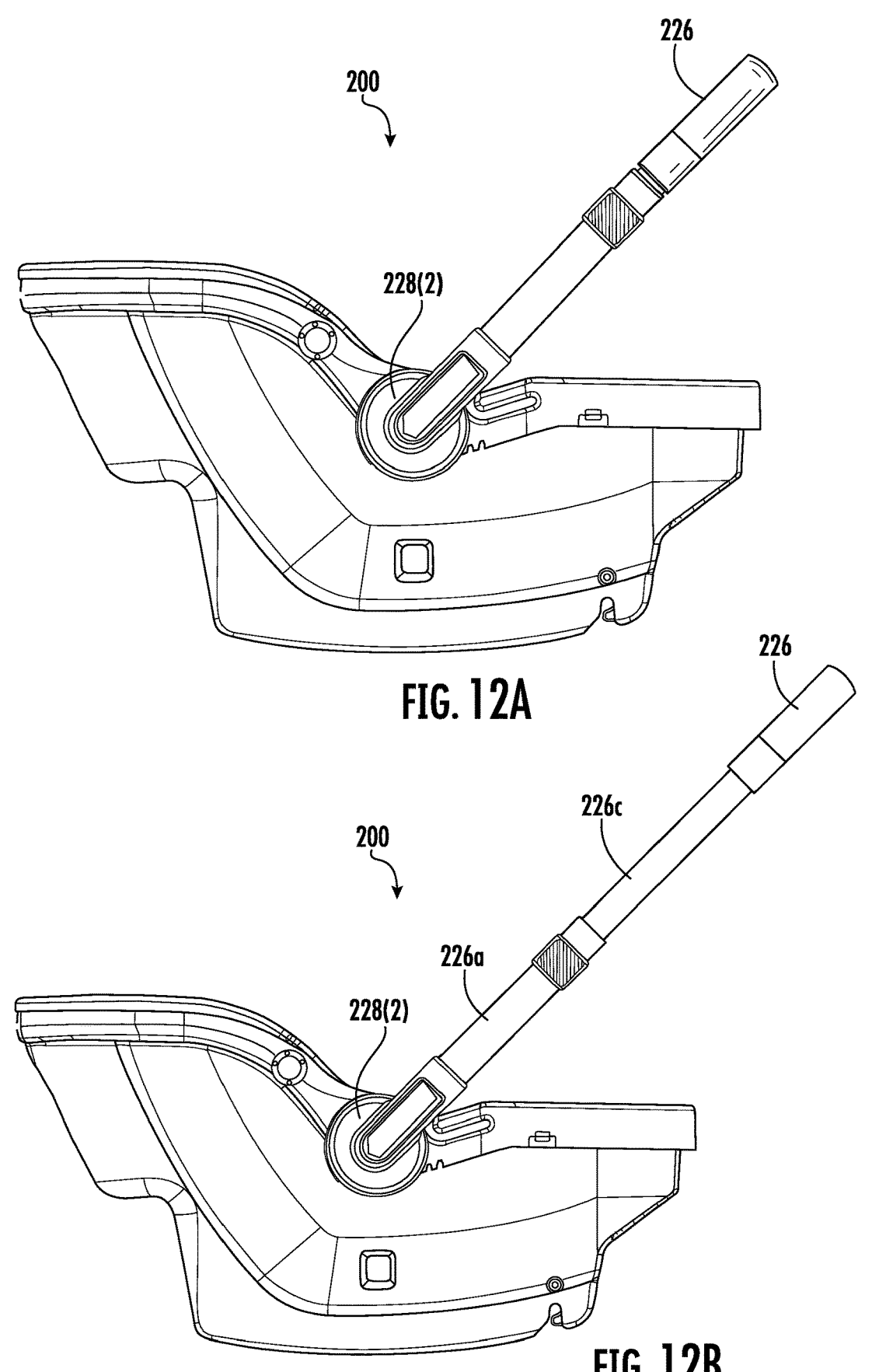
Figure 13A:
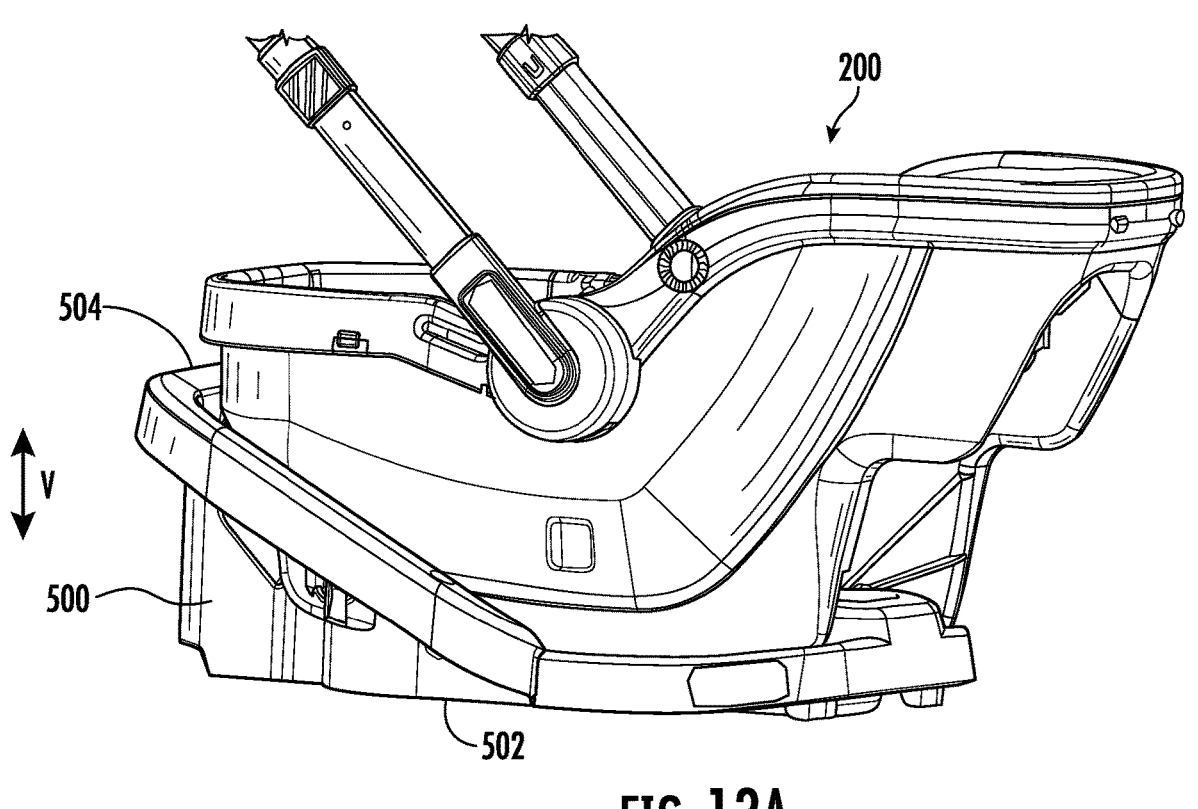
Figure 13B:
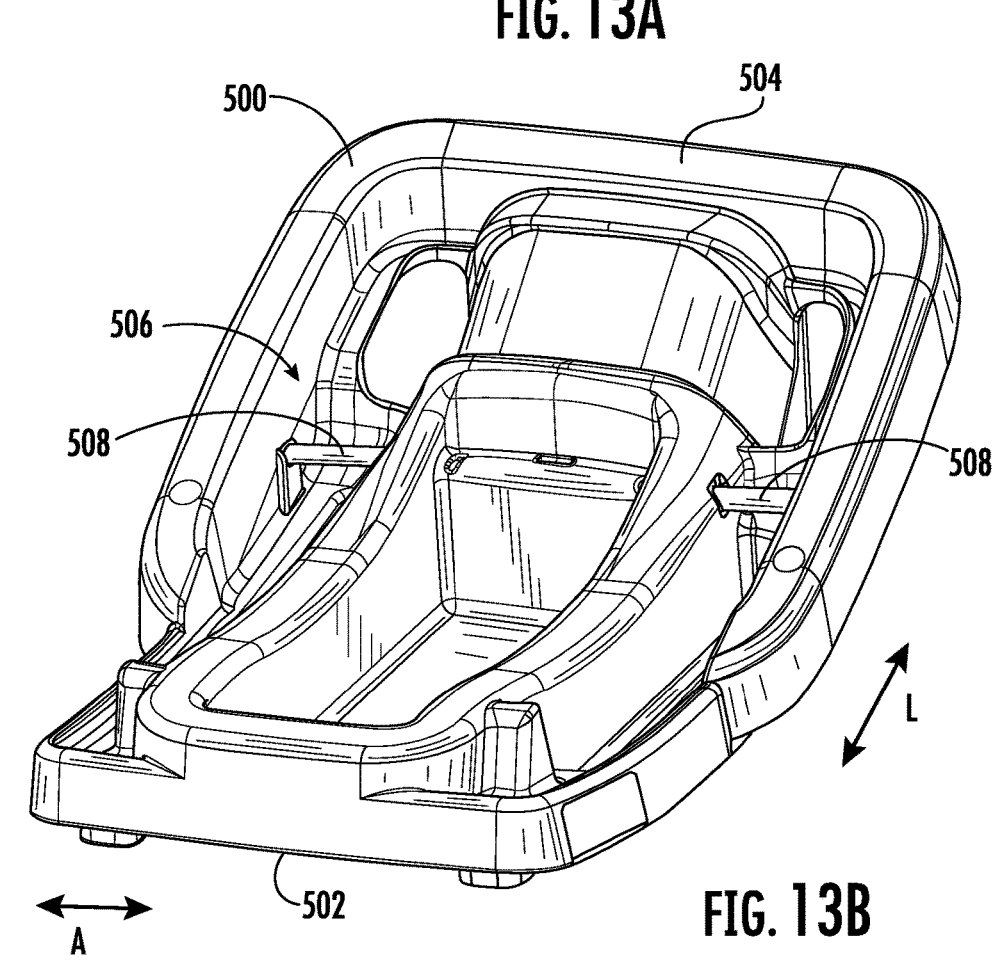
Figure 14:
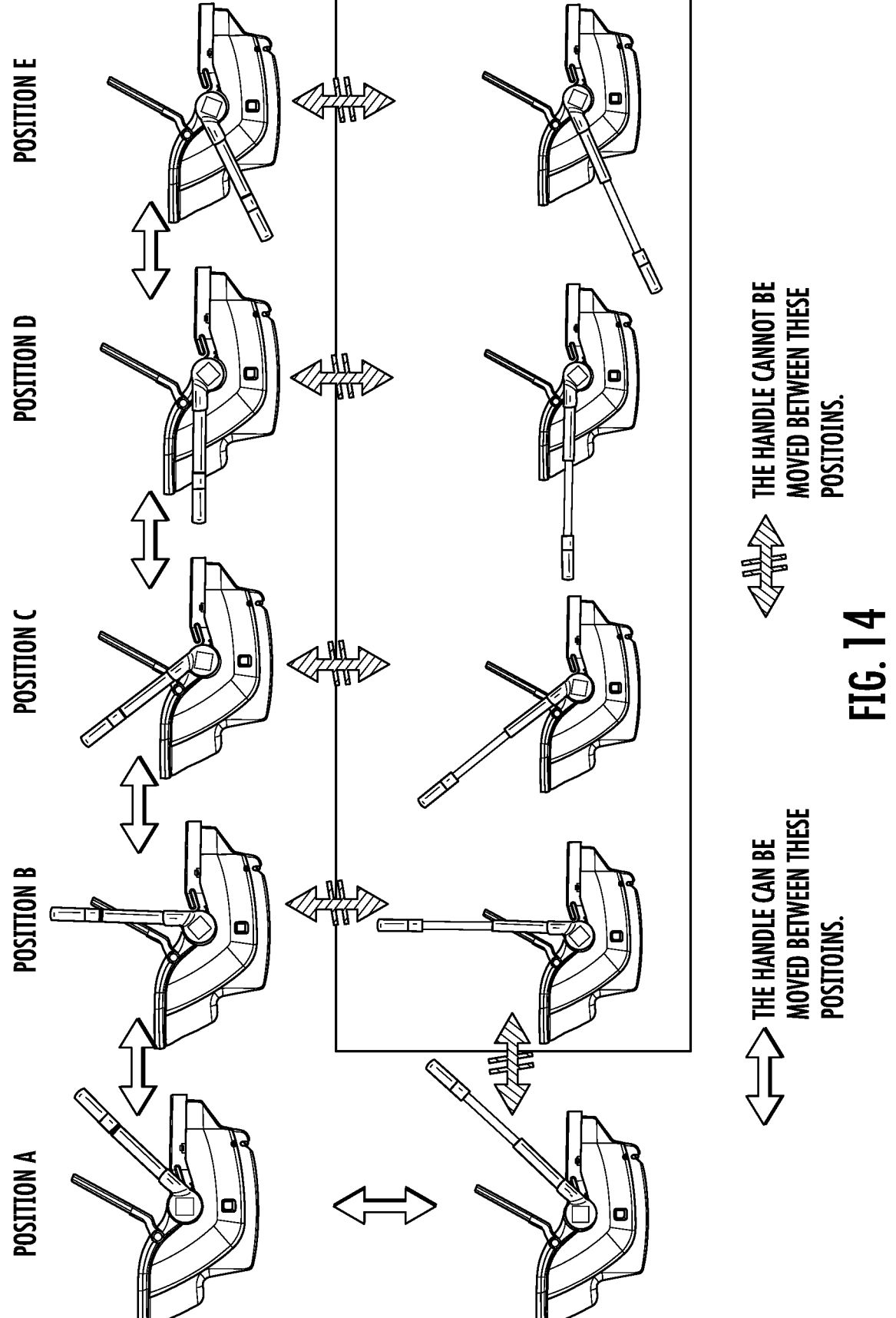
Figure 15:
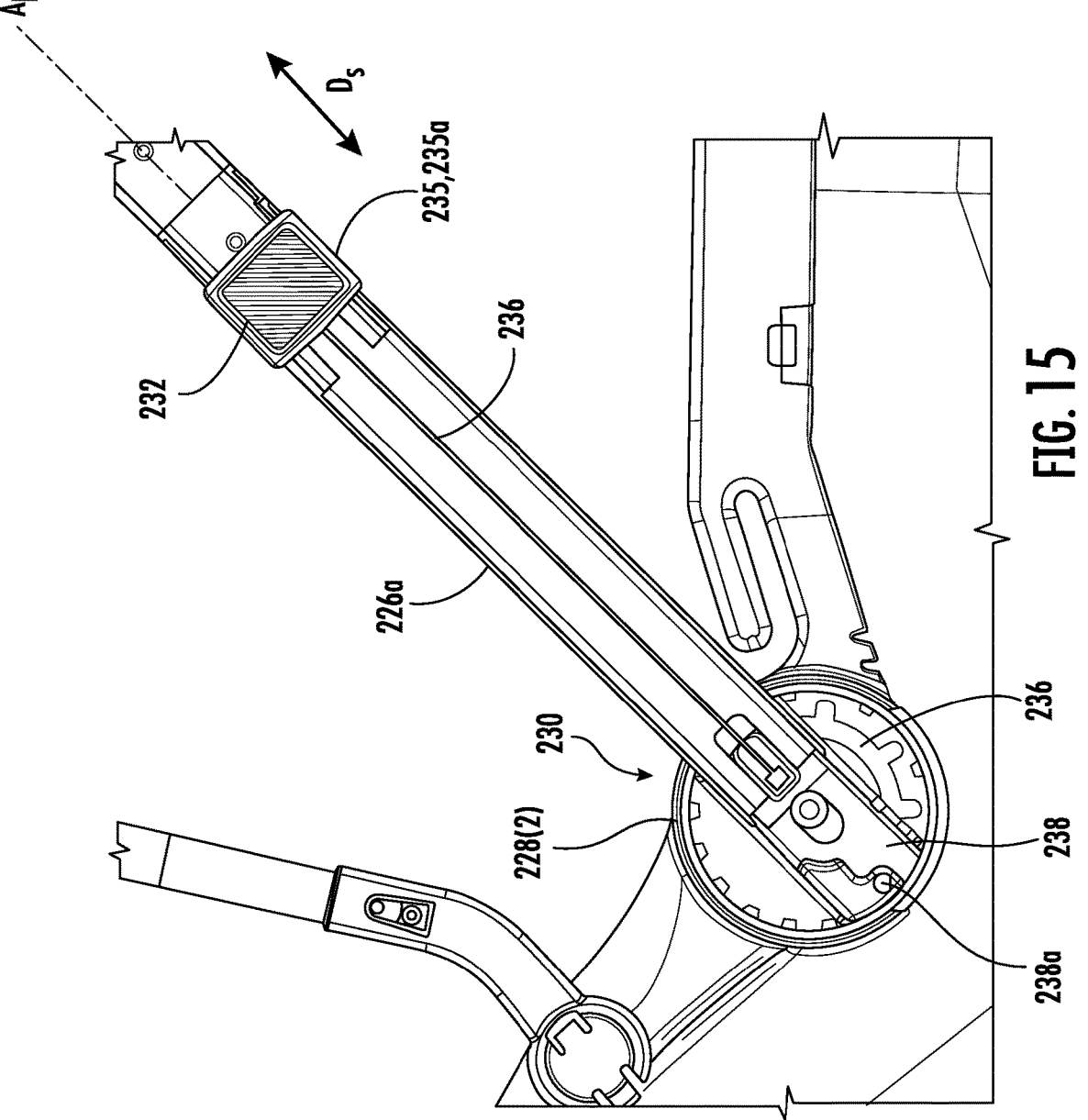
Figures 16, 17:
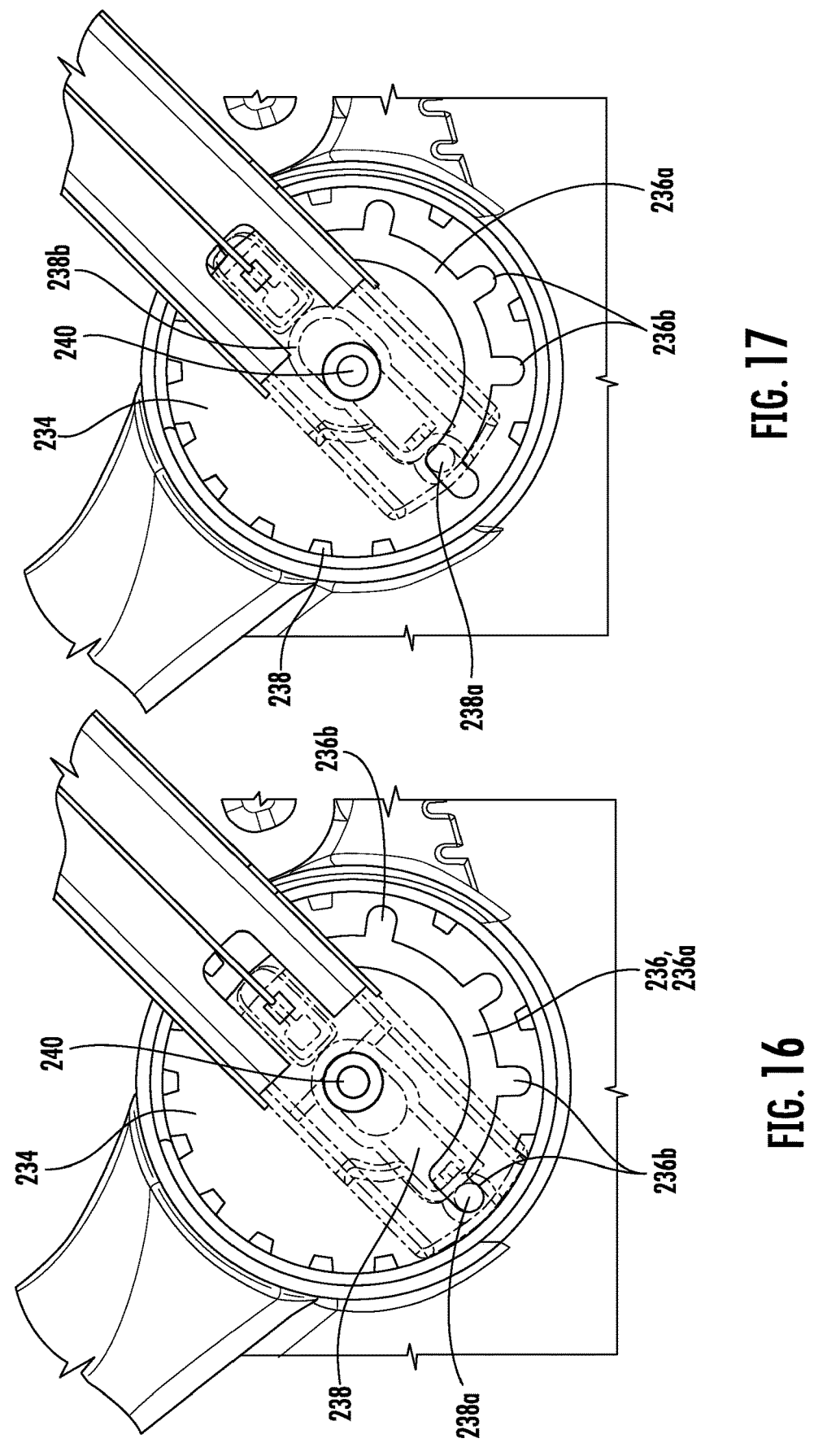
Figures 18, 19:
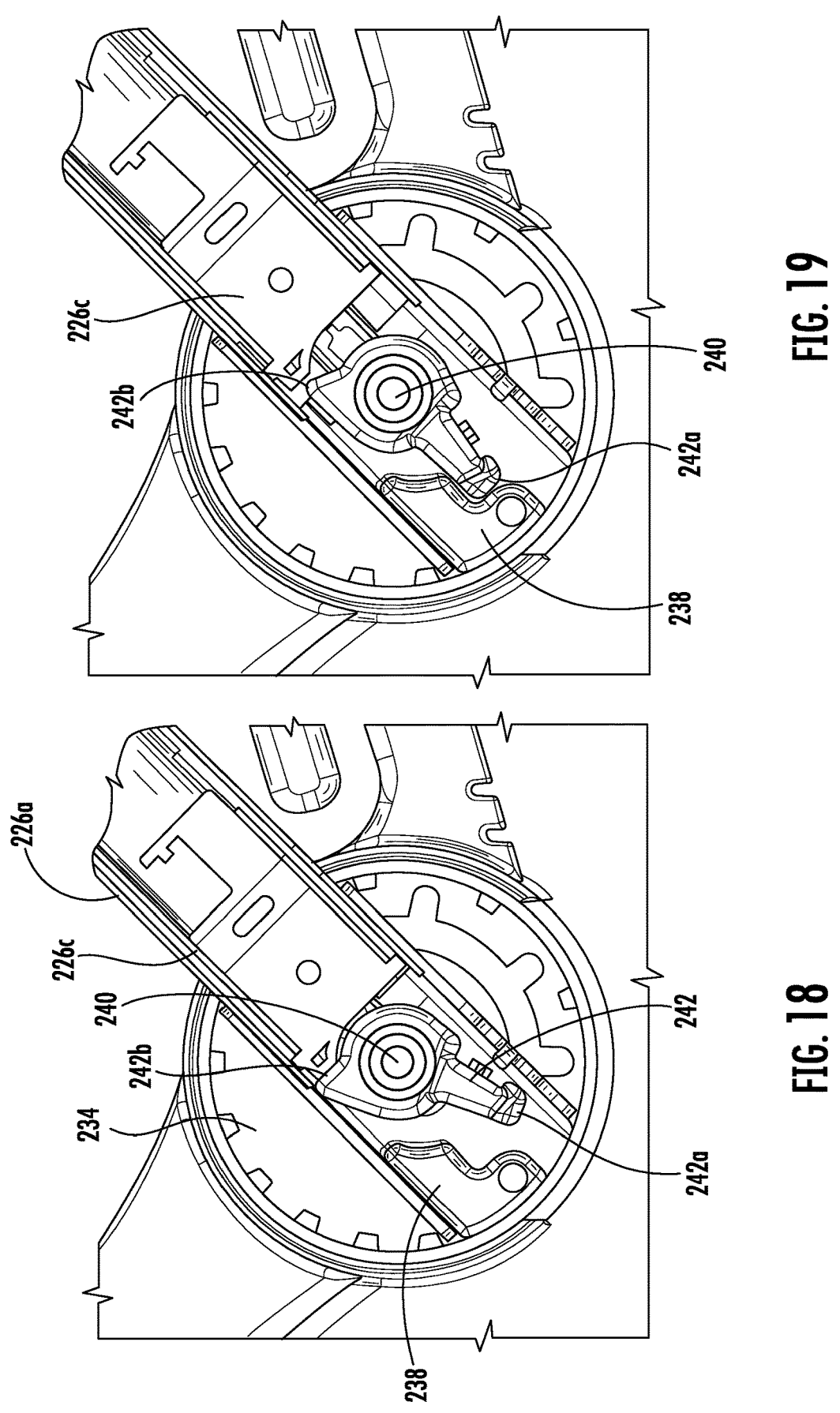
Figure 20:
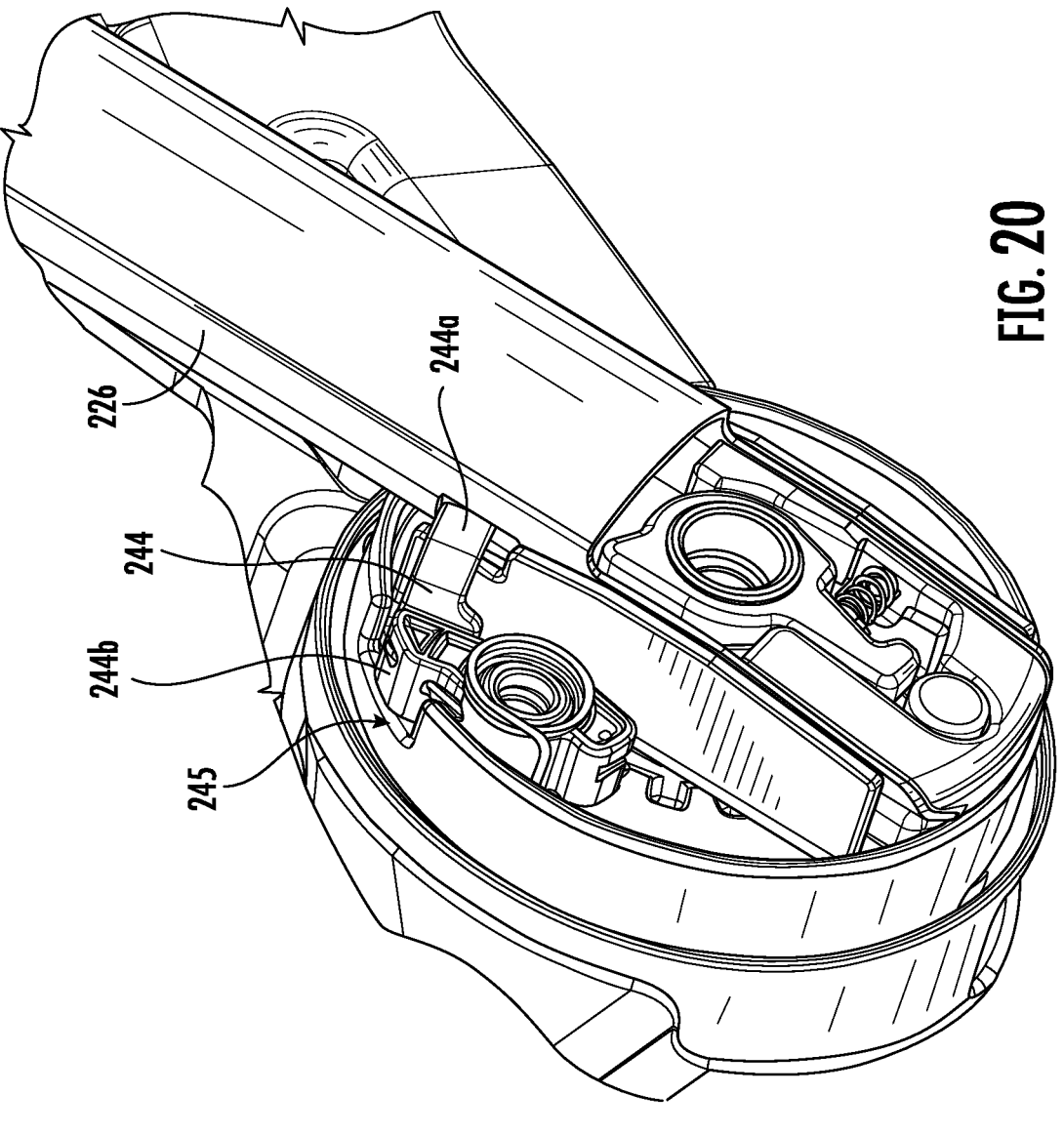
Figures 21, 22:
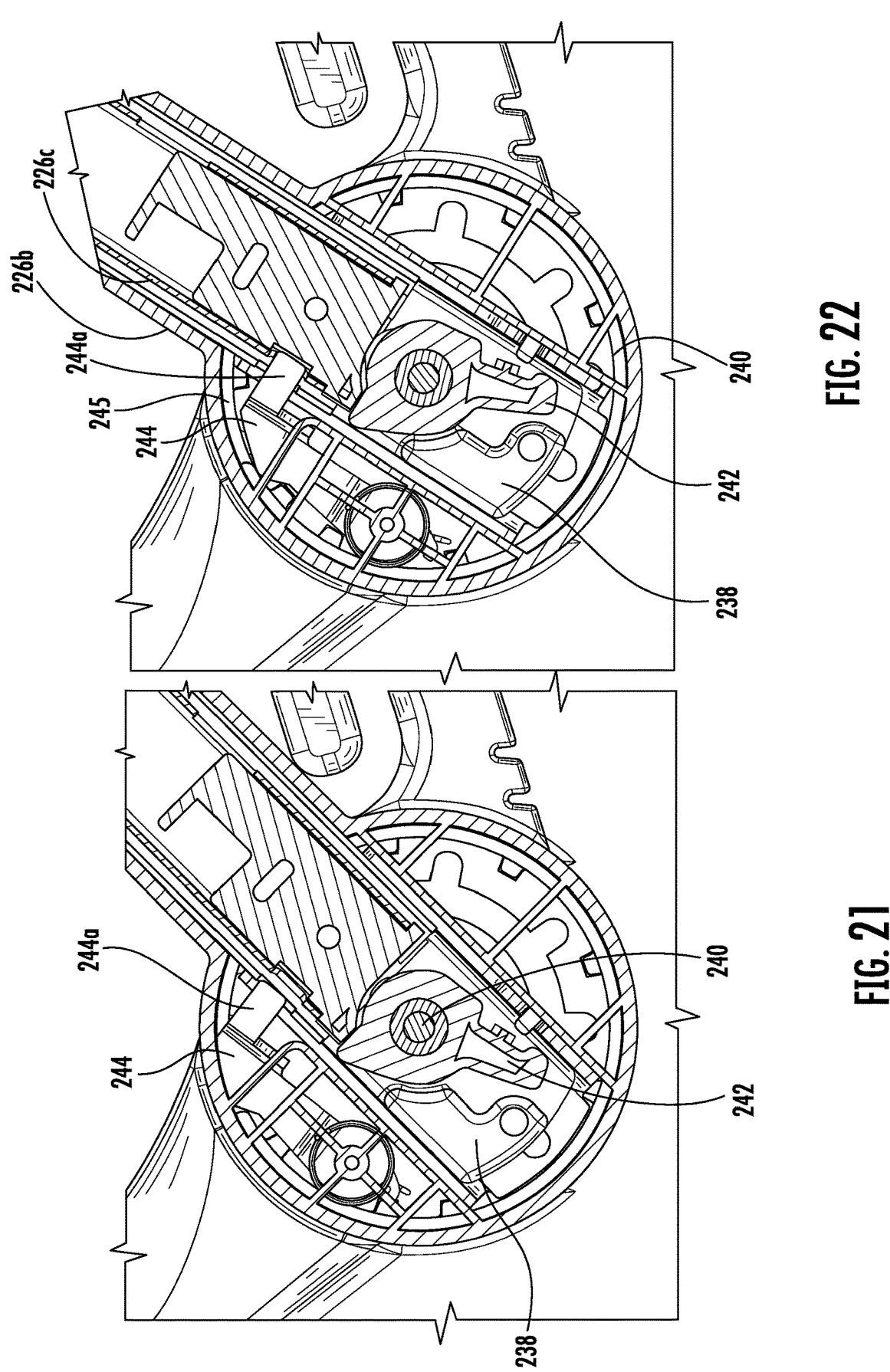
Figures 23, 24:
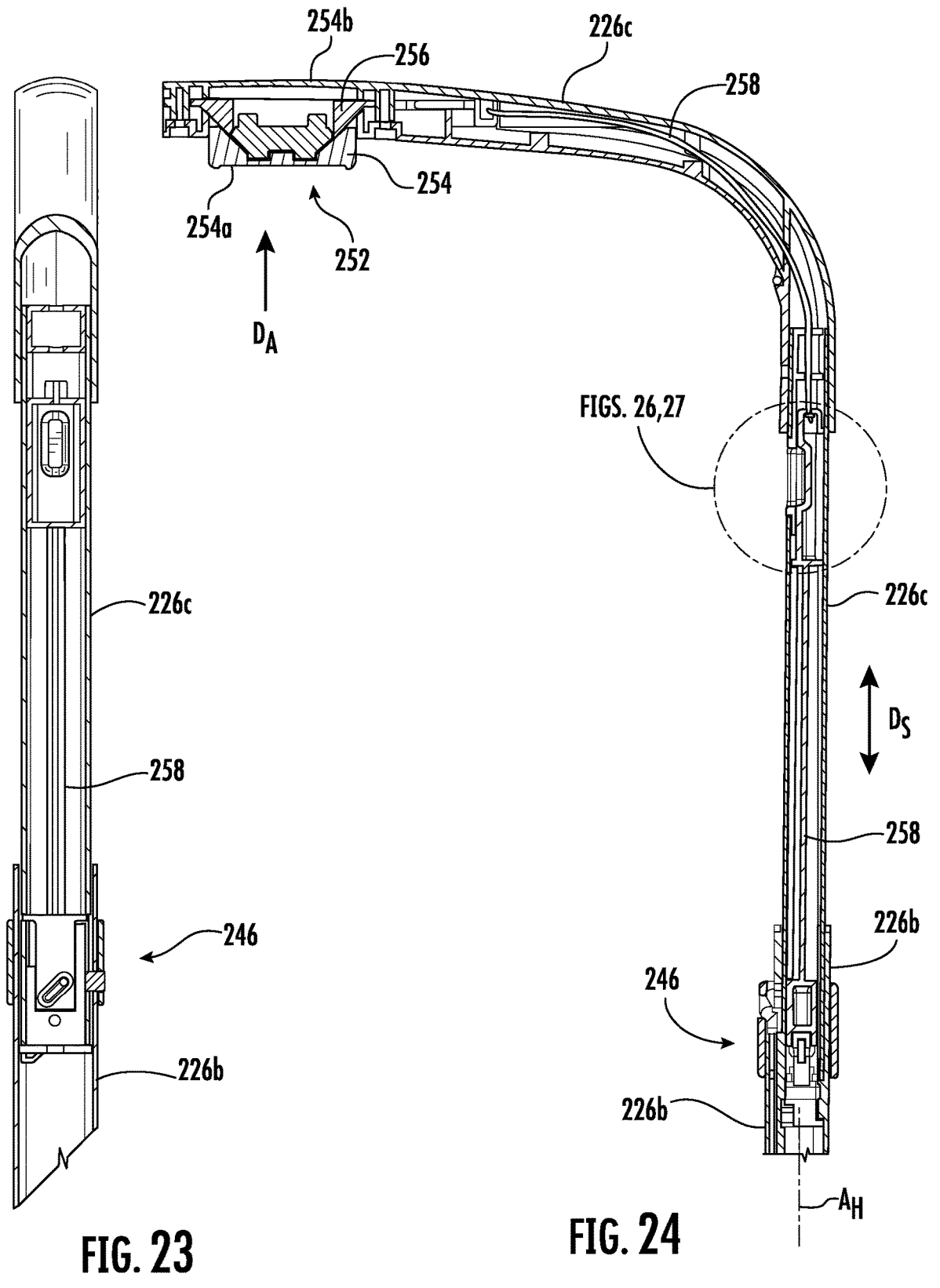
Figure 25:
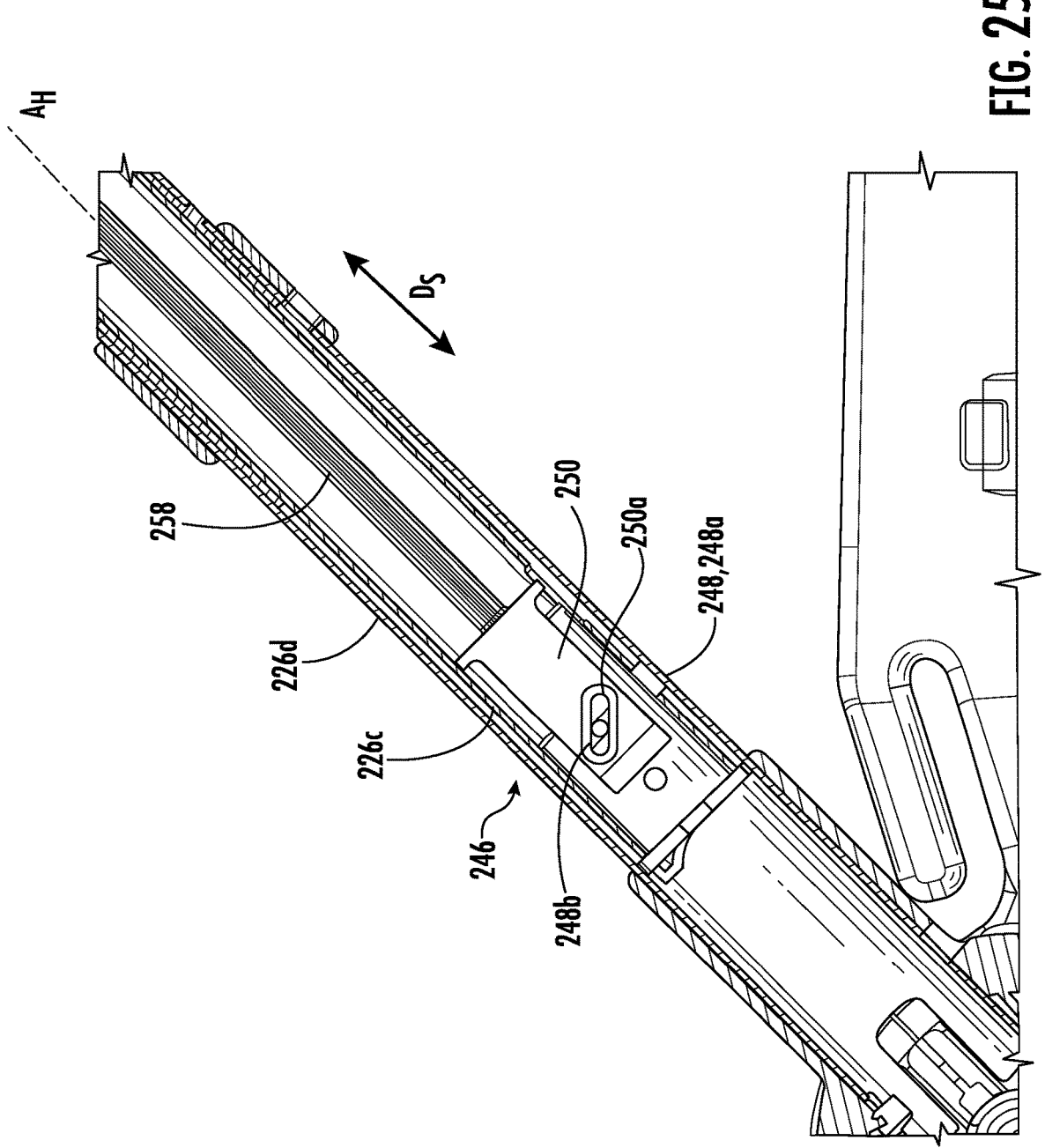
Figure 27:
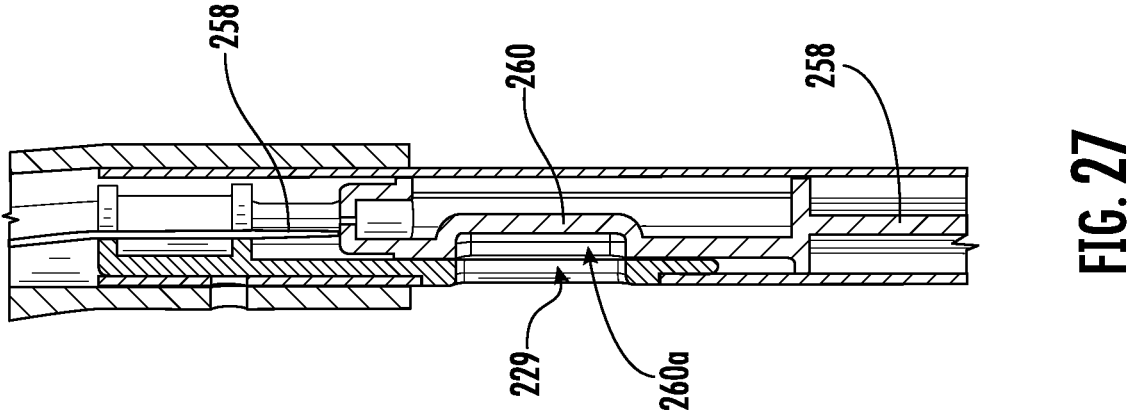
Figure 26:
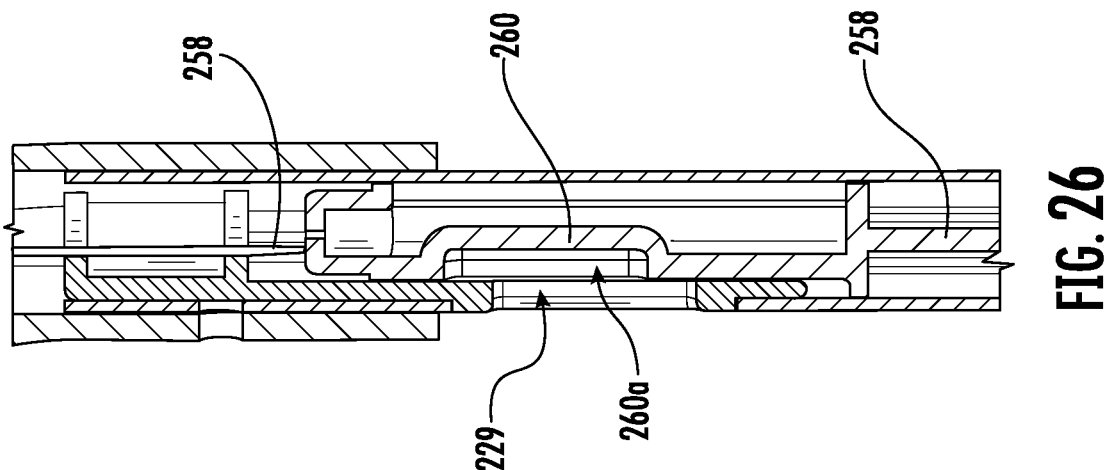

FIG. 9A shows a front view of the child carriage of FIG. 3, with the child carriage in a second folded configuration;

FIG. 9B shows a top view of the child carriage of FIG. 3, with the child carriage in a second folded configuration;

FIG. 10 shows a front perspective view of the child carrier of FIG. 1 according to one example;

FIG. 11 shows a rear perspective view of the child carrier of FIG. 10;

FIG. 12A shows a side view of the child carrier of FIG. 10, the child carrier having a handle in a retracted position;

FIG. 12B shows a side view of the child carrier of FIG. 10, the child carrier having a handle in an extended position;

FIG. 13A shows a perspective view of the child carrier of FIG. 10 coupled to a car seat base;

FIG. 13B shows a perspective view of the car seat base of FIG. 13A;

FIG. 14 shows a plurality of side views of the child carrier of FIG. 10 with the handle in various rotational positions;

FIG. 15 shows an outer side view of a portion of the child carrier of FIG. 10 that includes a portion of the handle and a hub that attaches the handle to a body of the child carrier, wherein a portion of the hub is removed to show a rotation lock;

FIG. 16 shows an outer side view of the hub of FIG. 15, with the rotation lock in a locked position;

FIG. 17 shows an outer side view of the hub of FIG. 15, with the rotation lock in an unlocked position;

FIG. 18 shows an outer side view of the hub of FIG. 15, the child carrier having a rotation stop in a released position to allow the rotation lock to move to the unlocked position;

FIG. 19 shows an outer side view of the hub of FIG. 15, the child carrier having a rotation stop in a blocking position to block the rotation lock from moving to the unlocked position;

FIG. 20 shows an inner side view of the hub of FIG. 15, with a portion of the hub removed to show a handle extension stop;

FIG. 21 shows an outer side view of the hub of FIG. 15, with a portion of the hub removed to show the handle extension stop, wherein the handle extension stop is in a released position;

FIG. 22 shows an outer side view of the hub of FIG. 15, with a portion of the hub removed to show the handle extension stop, wherein the handle extension stop is in a blocking position to prevent the handle from being extended;

FIG. 23 shows an outer side cross-sectional view of a portion of the handle of the child carrier of FIG. 10 according to one example, the portion including a handle extension lock configured to selectively lock the handle in the extended and retracted positions;

FIG. 24 shows a top cross-sectional view of a portion of the handle of the child car seat of FIG. 10, the portion including a handle extension lock and an actuator configured to actuate the handle extension lock;

FIG. 25 shows an outer side cross-sectional side view of a portion of the handle of the child carrier of FIG. 10, the portion having the handle extension lock;

FIG. 26 shows cross-sectional view of a portion of the handle of the child carrier of FIG. 10, the portion including an organizer latch in a blocking position;

FIG. 27 shows cross-sectional view of a portion of the handle of the child carrier of FIG. 10, the portion including an organizer latch in an unblocked position;

4

Figure 4:
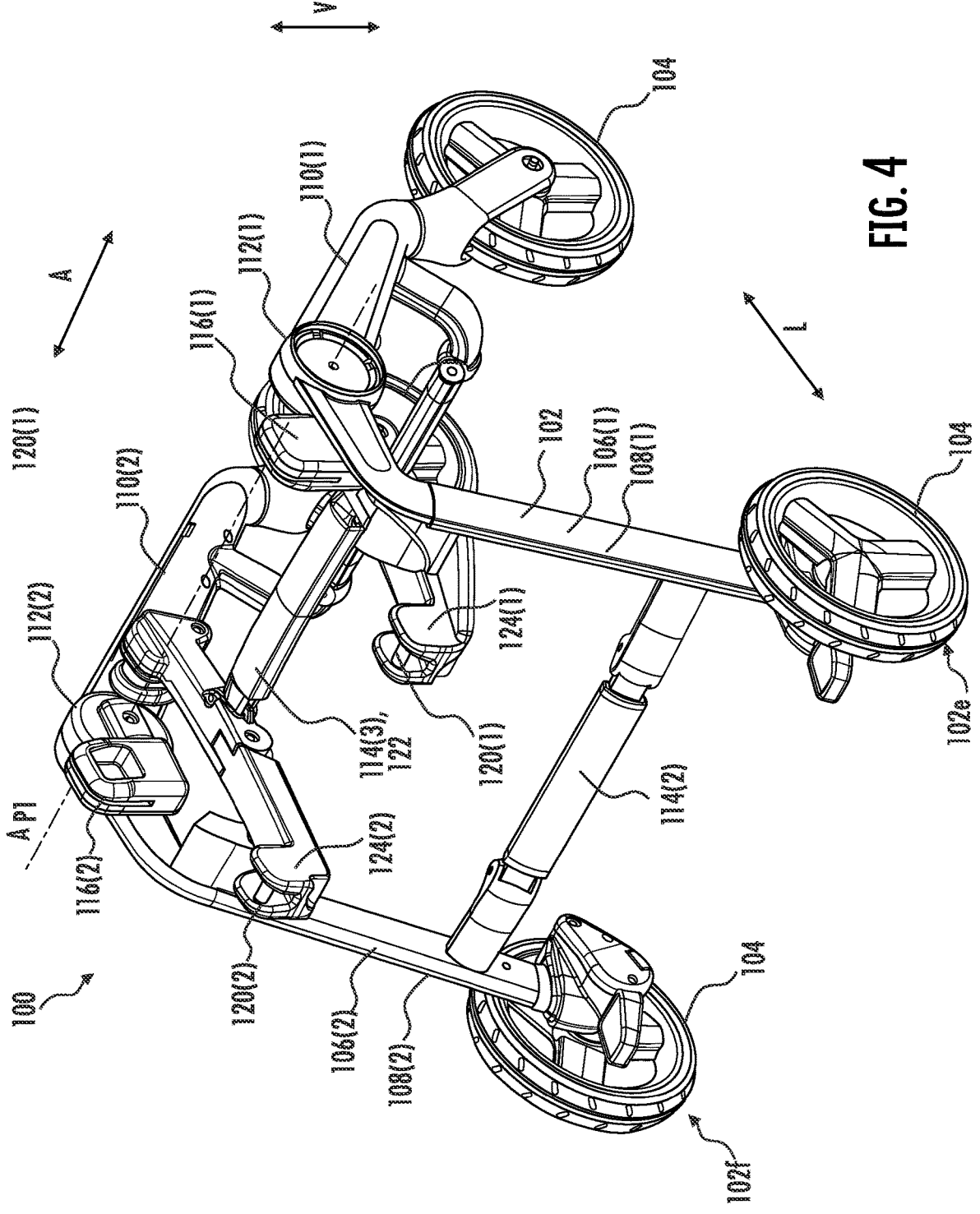
FIG. 4 shows a rear perspective view of the child carriage of FIG. 3.
Figure 28:
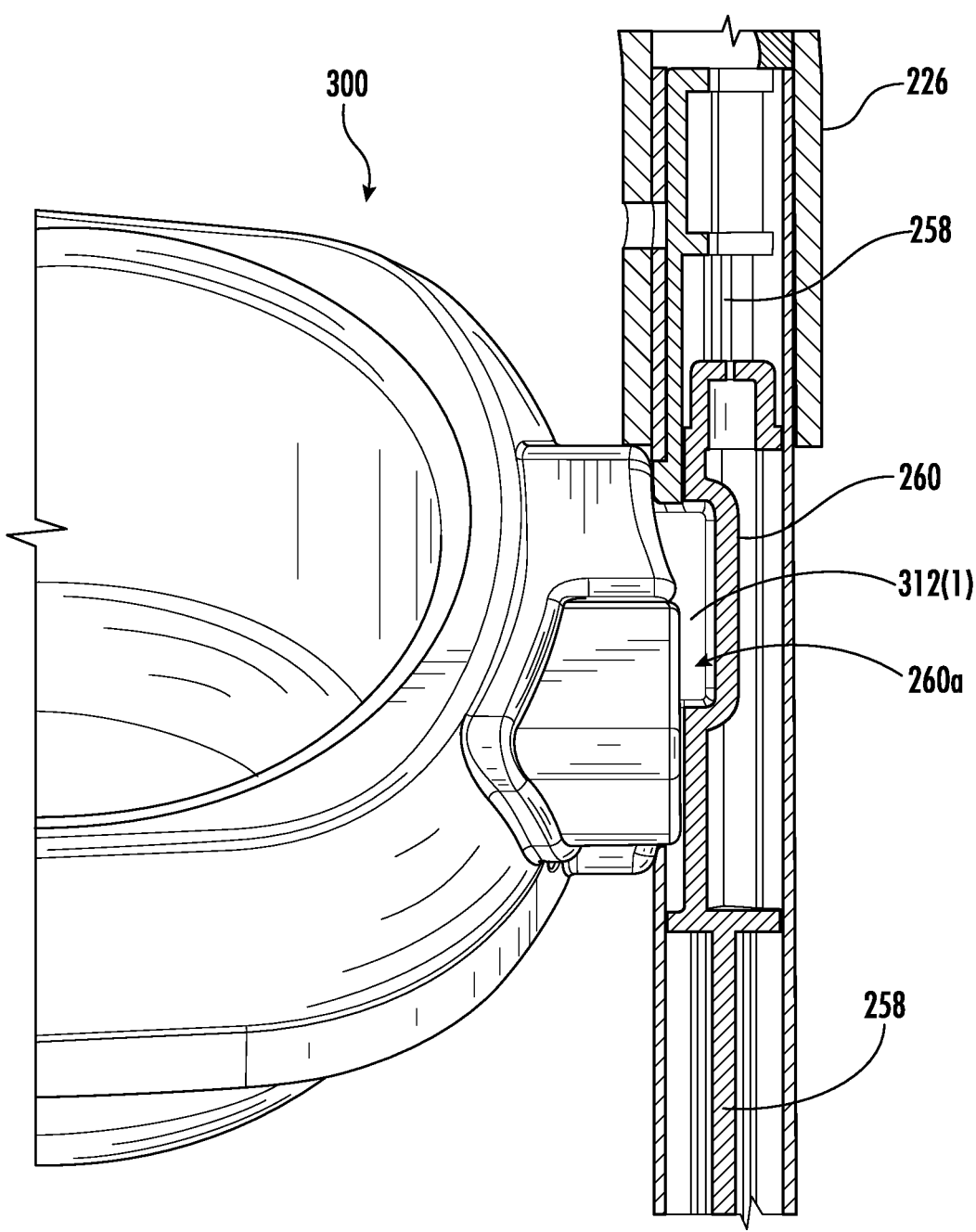
Figures 29, 30:
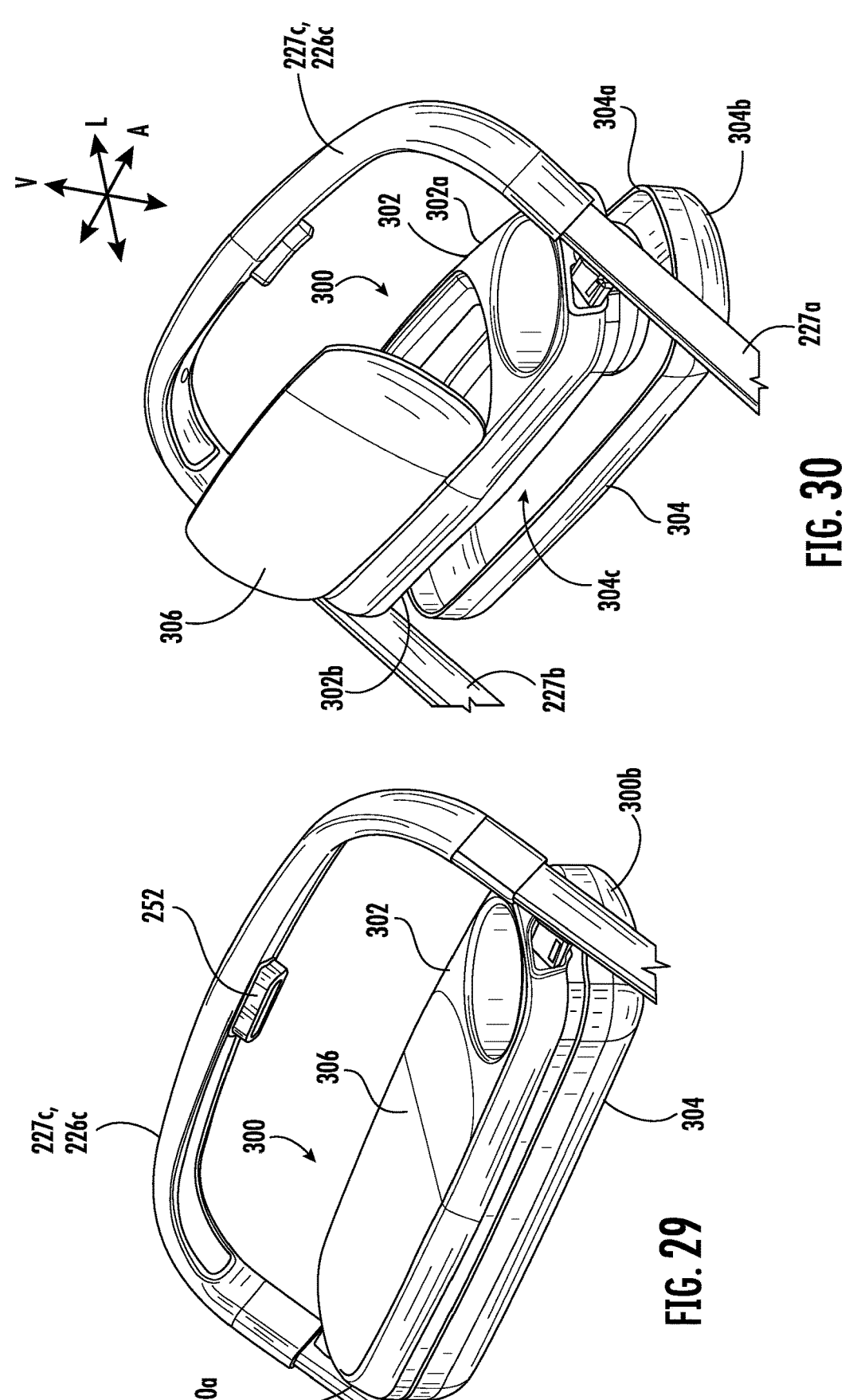
Figures 31, 32, 33:
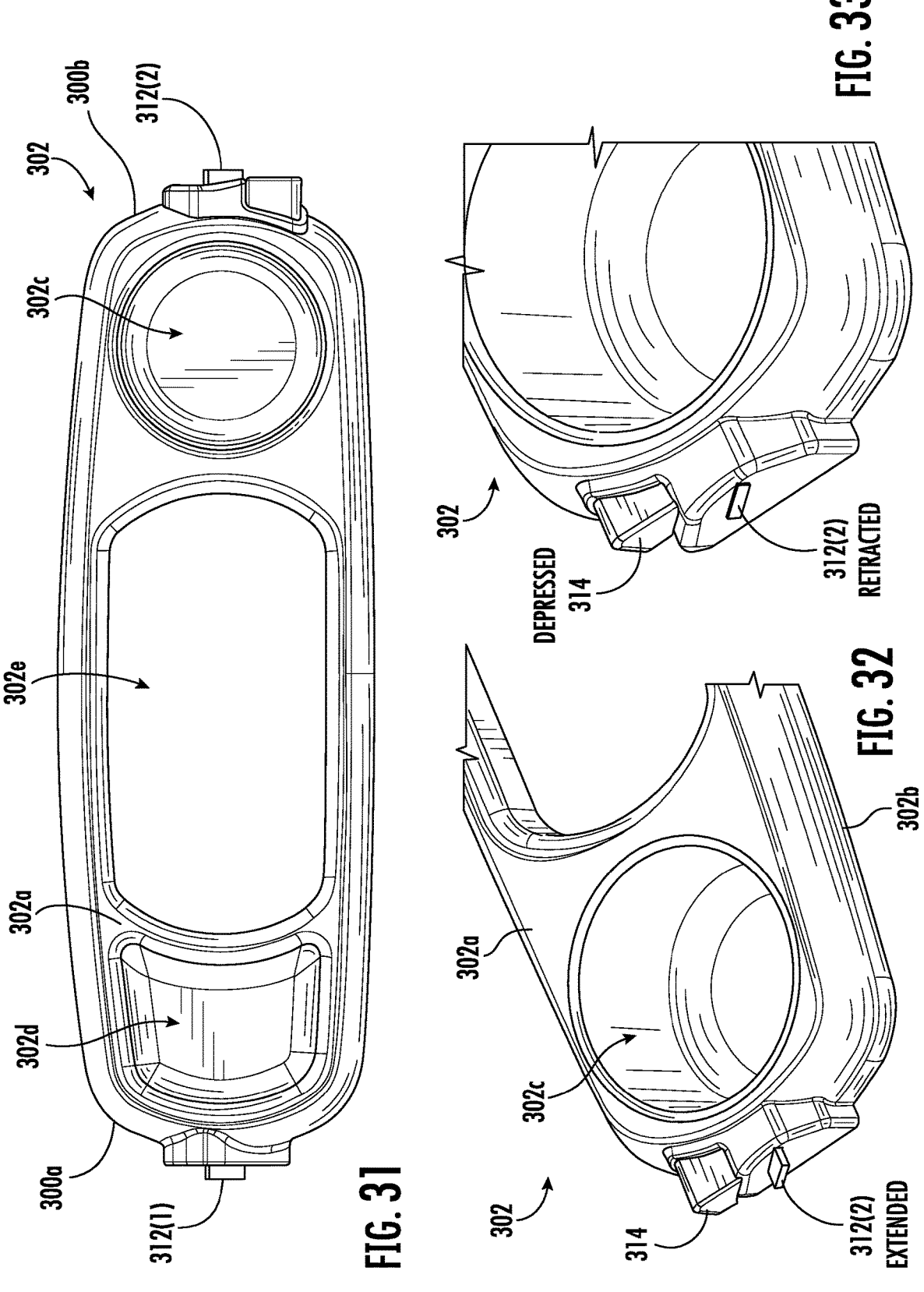
Figures 34, 35:
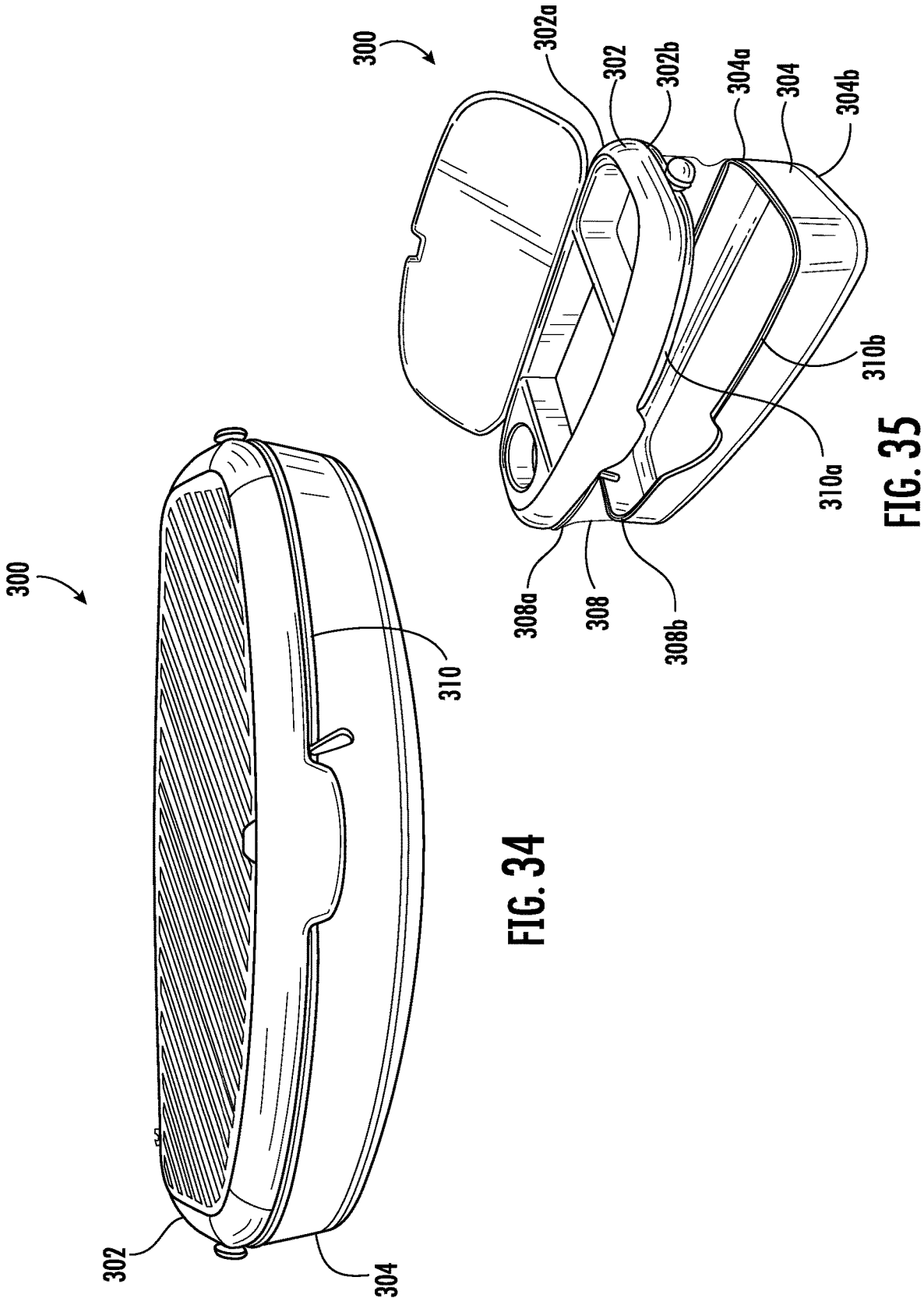
Figures 36A, 36B:
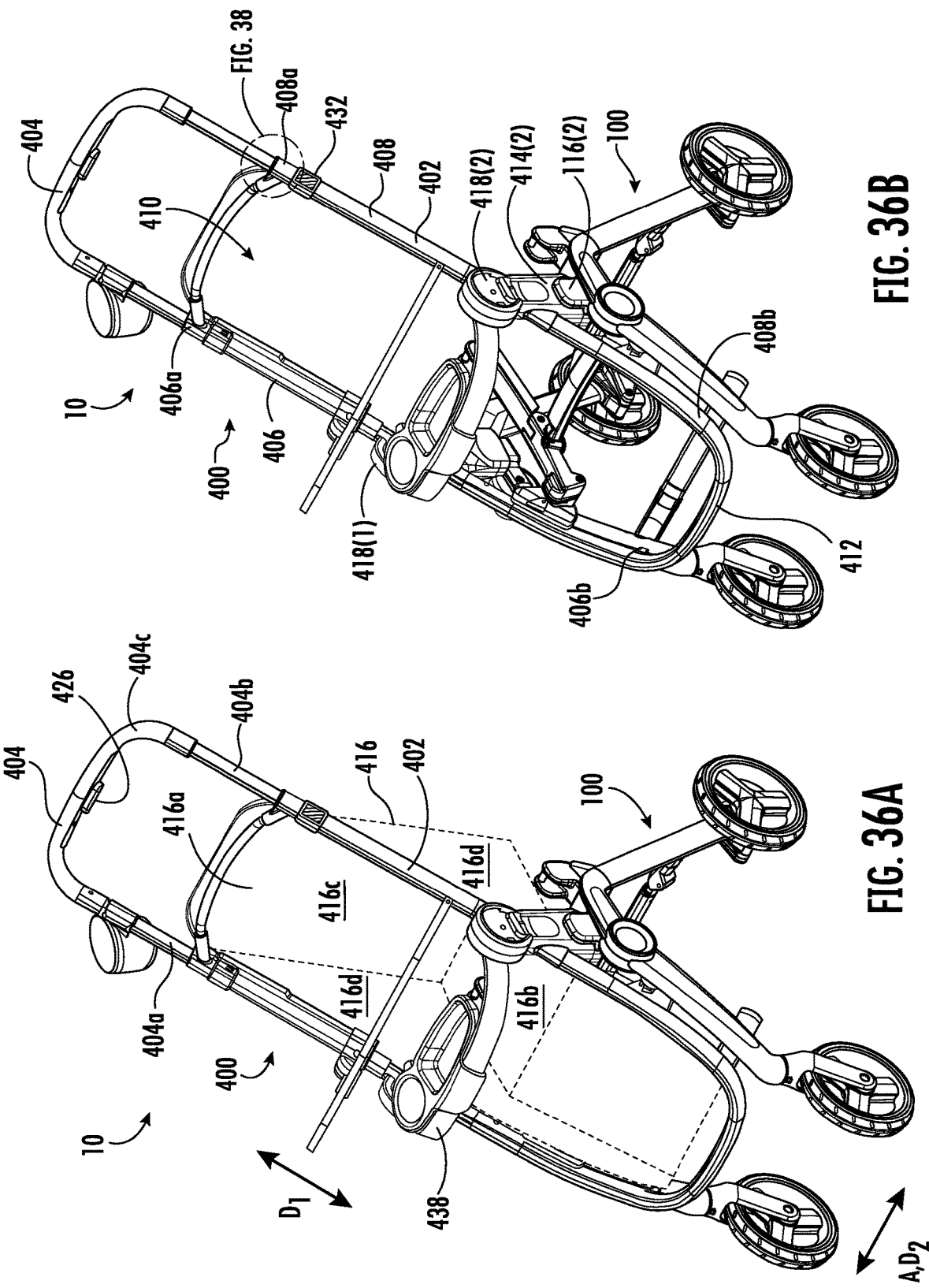
Figure 37B:
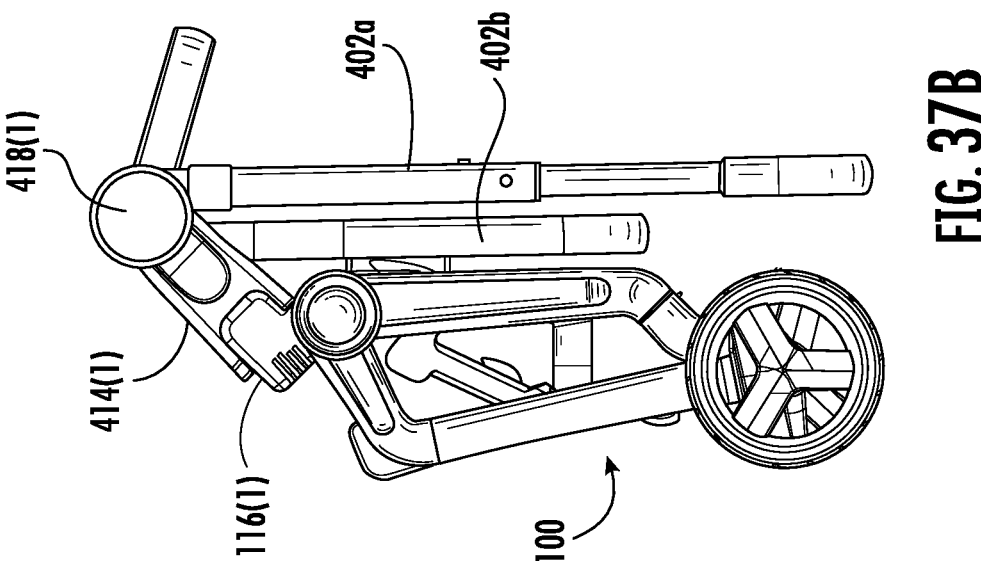
Figure 37A:
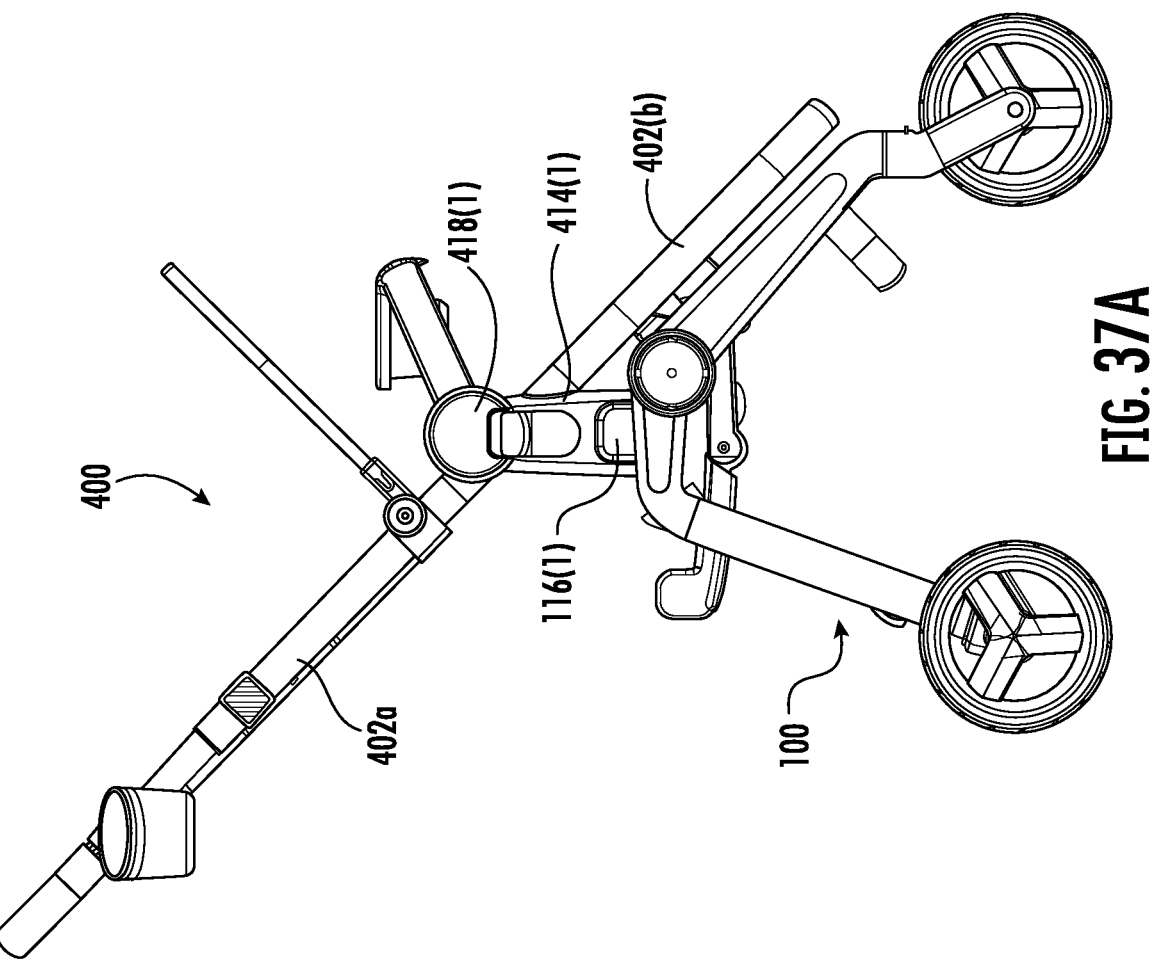
Figure 38:
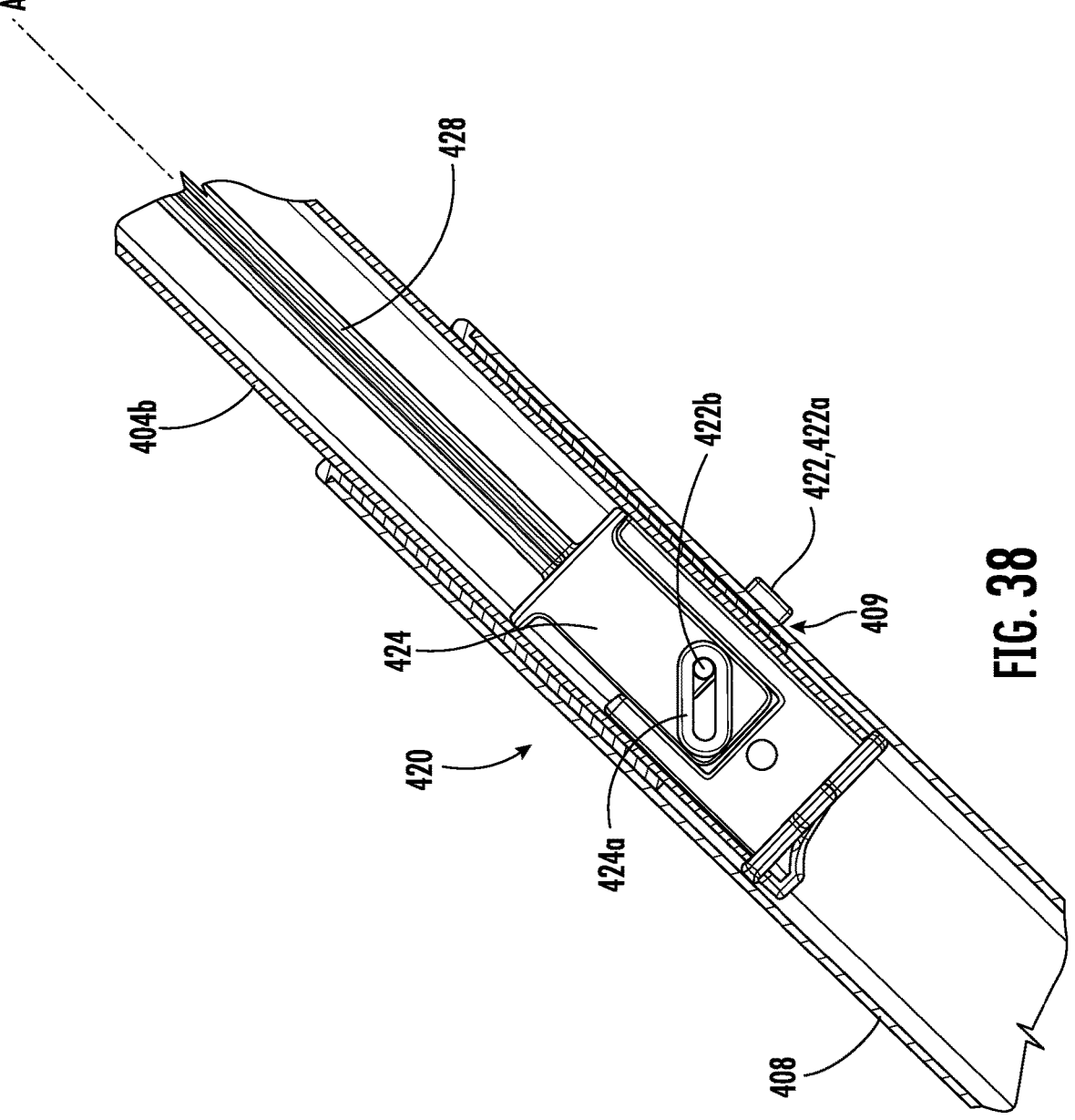
Figure 39A:
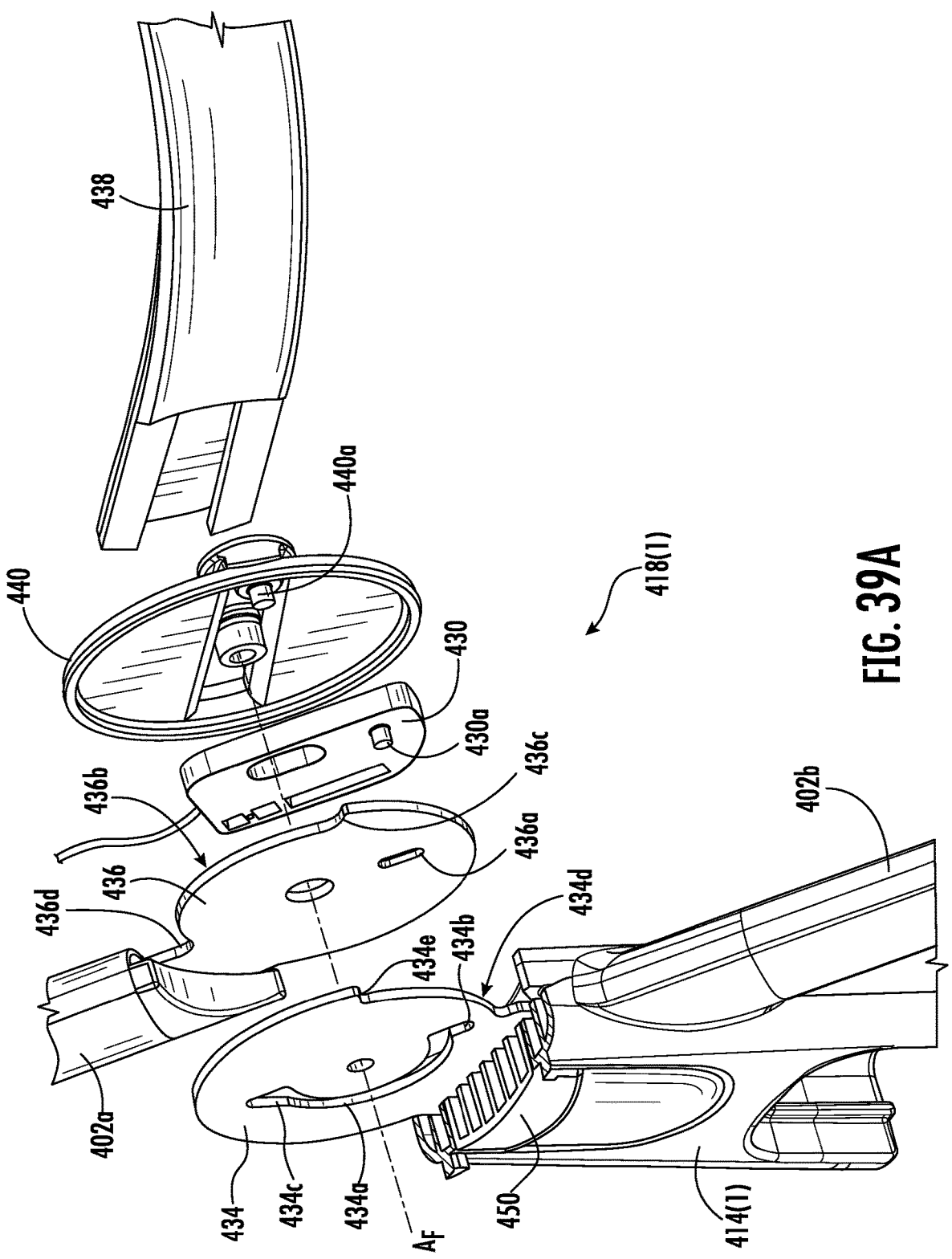
Figures 39B, 39C:
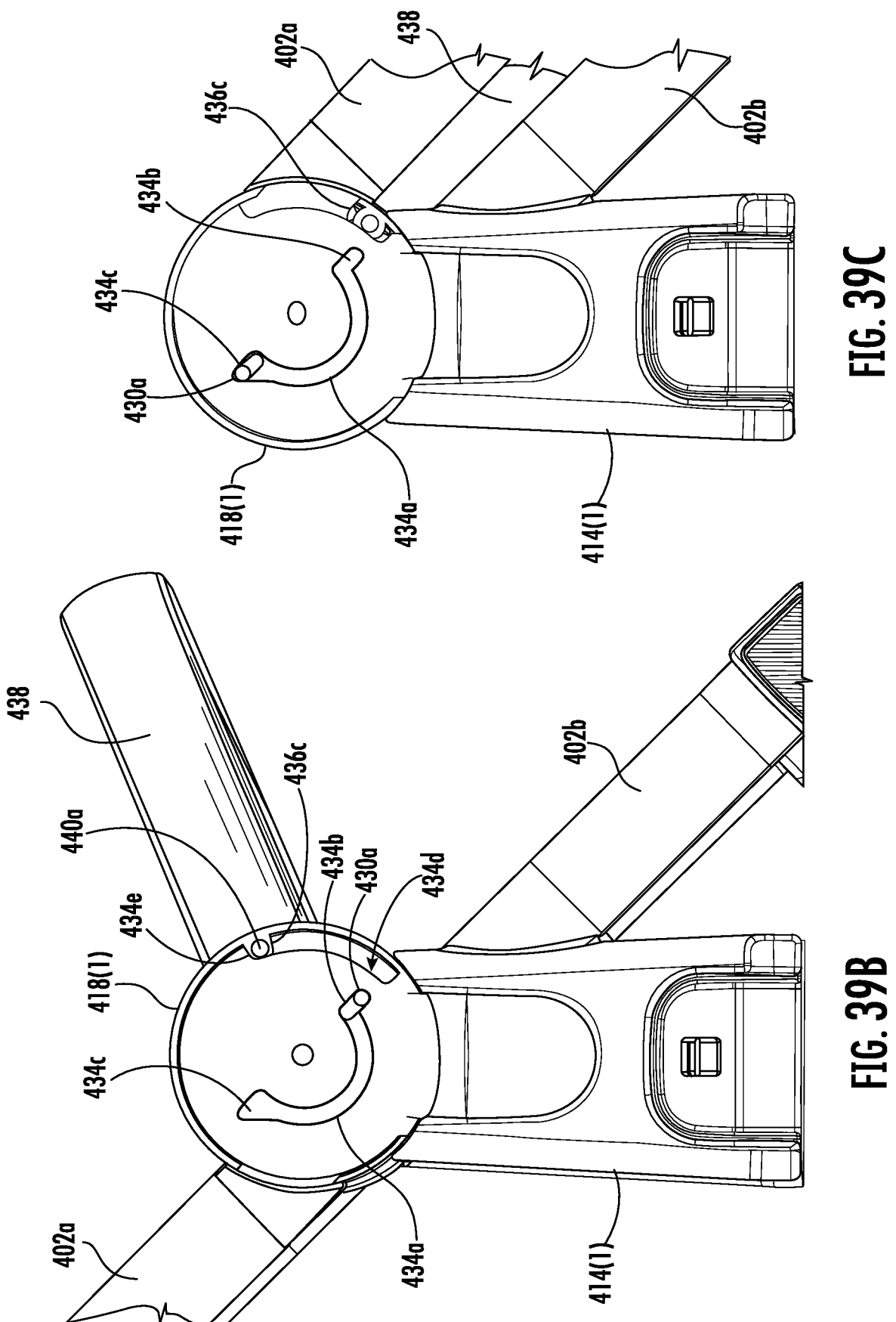
Figures 40A, 40B:
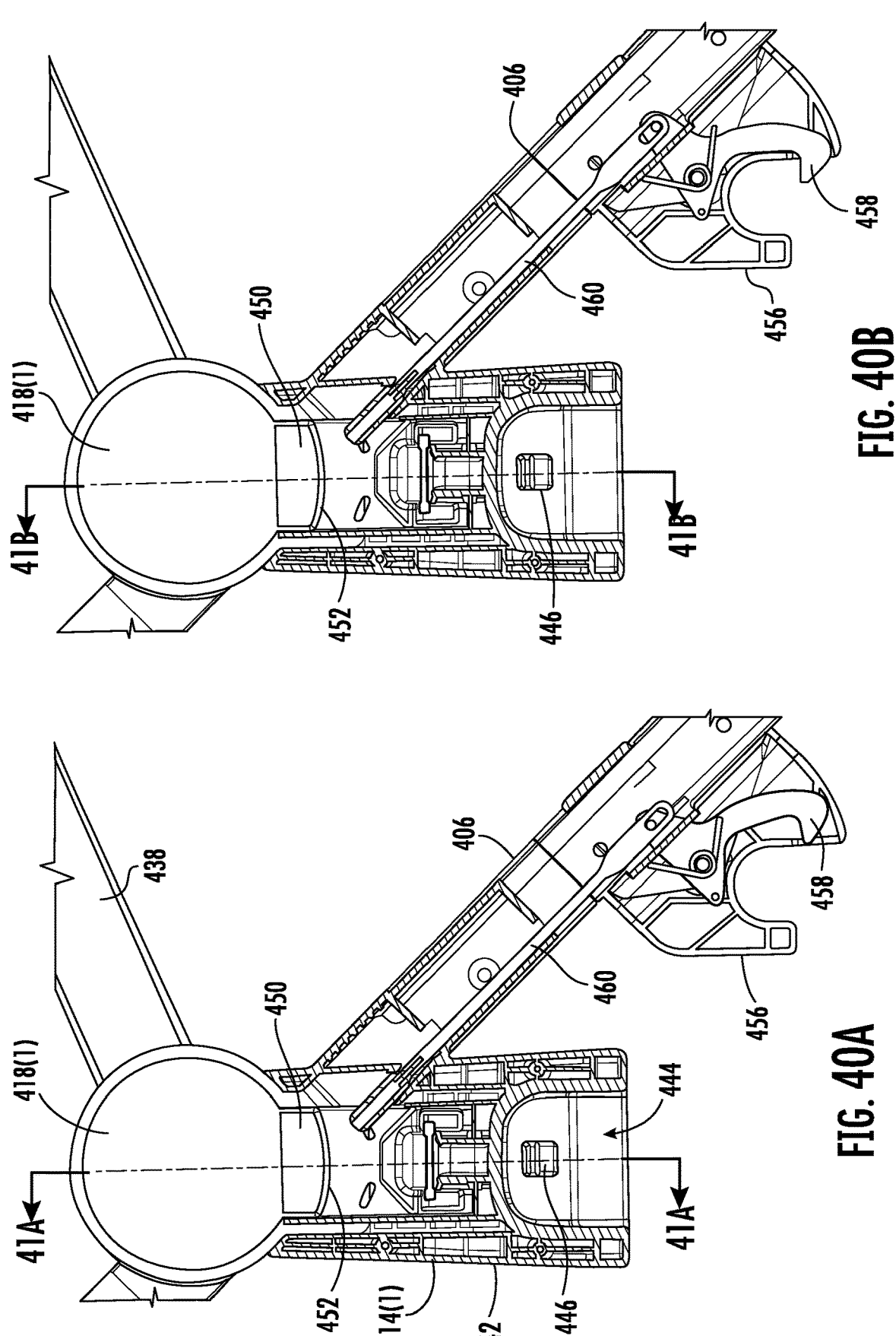
Figures 41A, 41B, 42:
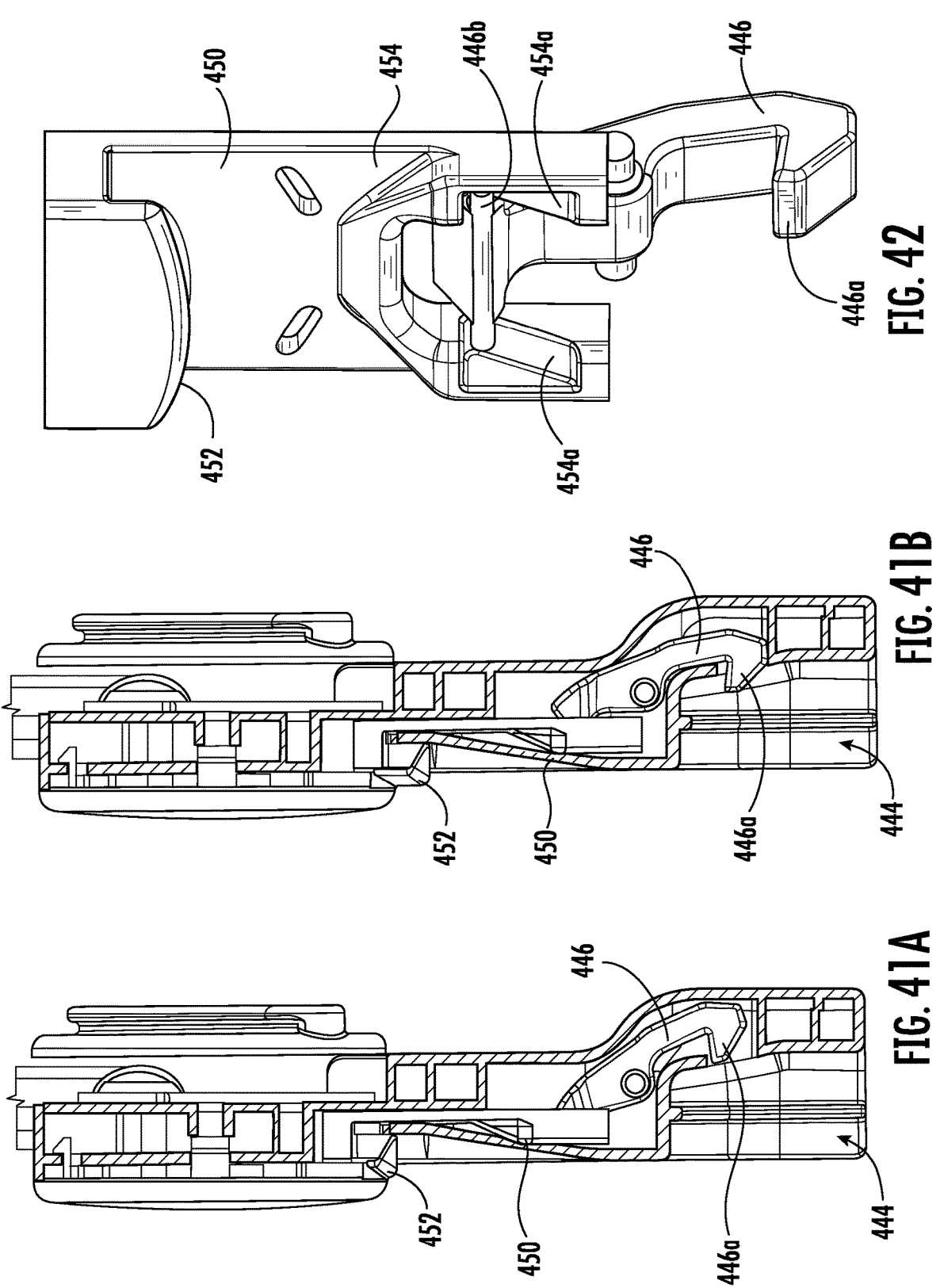
Figures 43, 44, 45:
Figures 46, 47, 48:
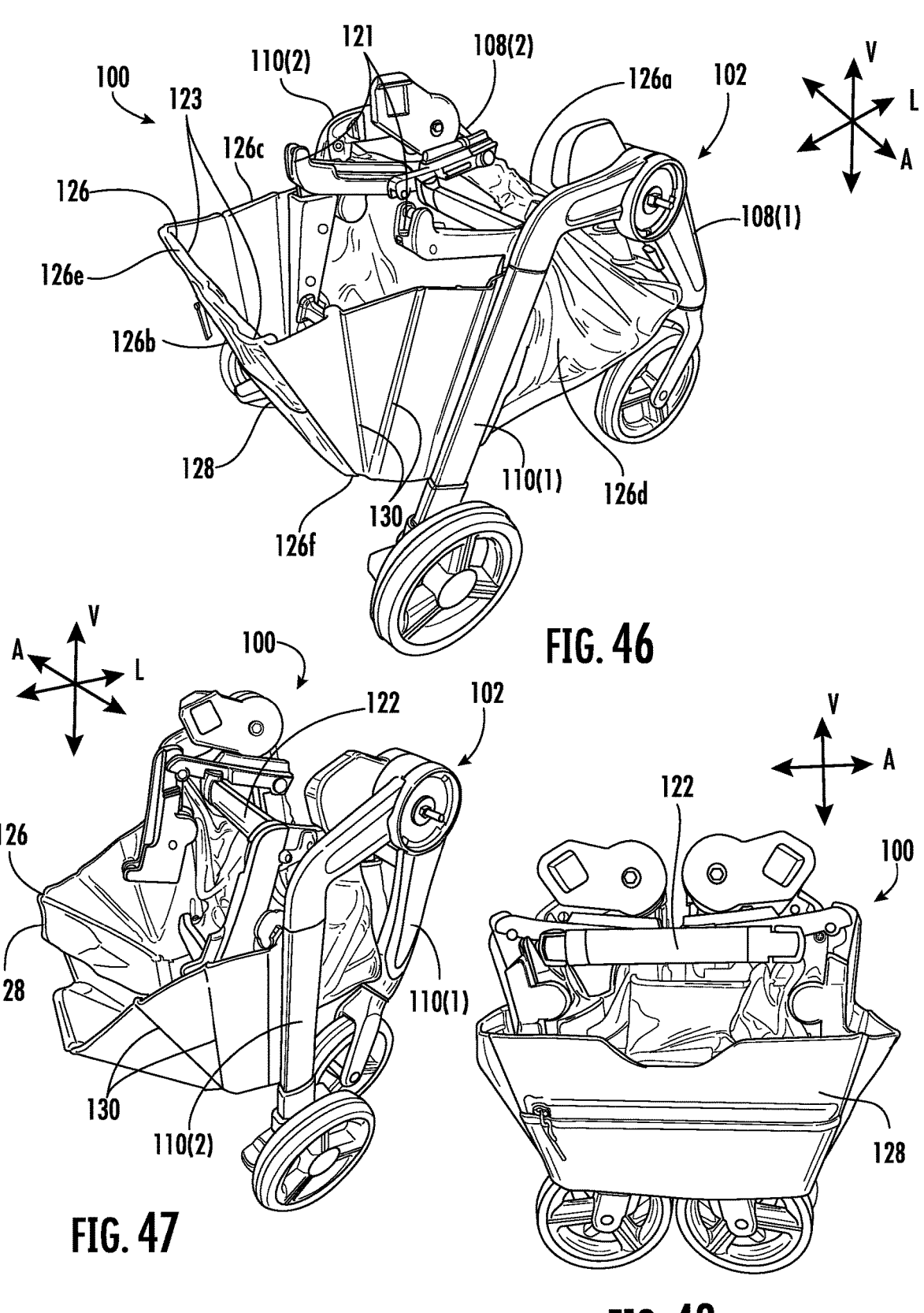

FIG. 28 shows a perspective view of a portion of the organizer and portion of the handle of the child carrier of FIG. 10, where the portion of the handle is shown in cross-section;

FIG. 29 shows a perspective view of a portion of the travel system of FIG. 1 that includes the organizer and a portion of the handle of the child carrier of FIG. 10;

FIG. 30 shows a perspective view of a portion of the travel system of FIG. 1 that includes the organizer and a portion of the handle of the child carrier of FIG. 10, where the organizer is exploded;

FIG. 31 shows a top view of a tray of the organizer of the travel system of FIG. 1 according to one example;

FIG. 32 shows a perspective view of a first side of the tray of the organizer of the travel system of FIG. 1 according to one example, where the tray has a coupler for attaching to the child carrier handle, the coupler shown in an extended position;

FIG. 33 shows a perspective view of the first side of the tray of the organizer of the travel system of FIG. 1, wherein the coupler is shown in a retracted position;

FIG. 34 shows a perspective view of the organizer of FIG. 1 according to another example, with the organizer in a compact configuration;

FIG. 35 shows a perspective view of the organizer of FIG. 34, with the organizer in an expanded configuration;

FIG. 36A shows a perspective view of a travel system comprising the child carriage of FIGS. 3 and 4 and a toddler seat with a soft goods seat shown in phantom lines;

FIG. 36B shows a perspective view of the travel system of FIG. 36A without the soft goods seat;

FIG. 37A shows a side view of the travel system of FIGS. 36A and 36B, with the carriage and toddler seat in expanded configurations;

FIG. 37B shows a side view of the travel system of FIGS. 36A and 36B, with the carriage and toddler seat in a folded configuration;

FIG. 38 shows a partial cross-sectional side view of the region of the handle of the toddler seat circled in FIG. 36B, illustrating a handle extension lock of the toddler seat;

FIG. 39A shows an exploded view of a fold hub of the toddler seat of FIGS. 36A and 36B, with an outer cover of the fold hub hidden;

FIG. 39B shows a side view of the fold hub of FIG. 39A, with the outer cover of the fold hub hidden and the toddler seat in the expanded configuration;

FIG. 39C shows a side view of the fold hub of FIG. 39A, with the outer cover of the fold hub hidden and the toddler seat in the folded configuration FIG. 40A shows a side view of a portion of the toddler seat of FIGS. 36A and 36B that includes a fold hub, a first coupler, and a second coupler, where the portion is sectioned below the fold hub, and the second coupler is in an unlatched configuration;

FIG. 40B shows a side view of a portion of the toddler seat of FIGS. 36A and 36B that includes a fold hub, a first coupler, and a second coupler, where the portion is sectioned below the fold hub, and the second coupler is in a latched configuration;

FIG. 41A shows a cross-sectional end view of the fold hub and first coupler of FIG. 40A, with the first coupler in the unlatched configuration;

FIG. 41B shows a cross-sectional end view of the fold hub and first coupler of FIG. 40B, with the first coupler in the latched configuration;

FIG. 42 shows a perspective view of an actuator for the first and second couplers of FIGS. 40A to 41B, and a movable latch of the first coupler;

FIG. 43 shows a perspective view of the child carriage of FIGS. 3 and 4 with a basket;

FIG. 44 shows a side view of the child carriage of FIG. 43 in the first folded configuration;

FIG. 45 shows an end view of the child carriage of FIG. 43 in the second folded configuration;

FIG. 46 shows a perspective view of the child carriage of FIGS. 3 and 4 with another basket;

FIG. 47 shows a side view of the child carriage of FIG. 46 in the first folded configuration; and FIG. 48 shows an end view of the child carriage of FIG. 47 in the second folded configuration.

DETAILED DESCRIPTION

Figures 8A, 8B, 8C:
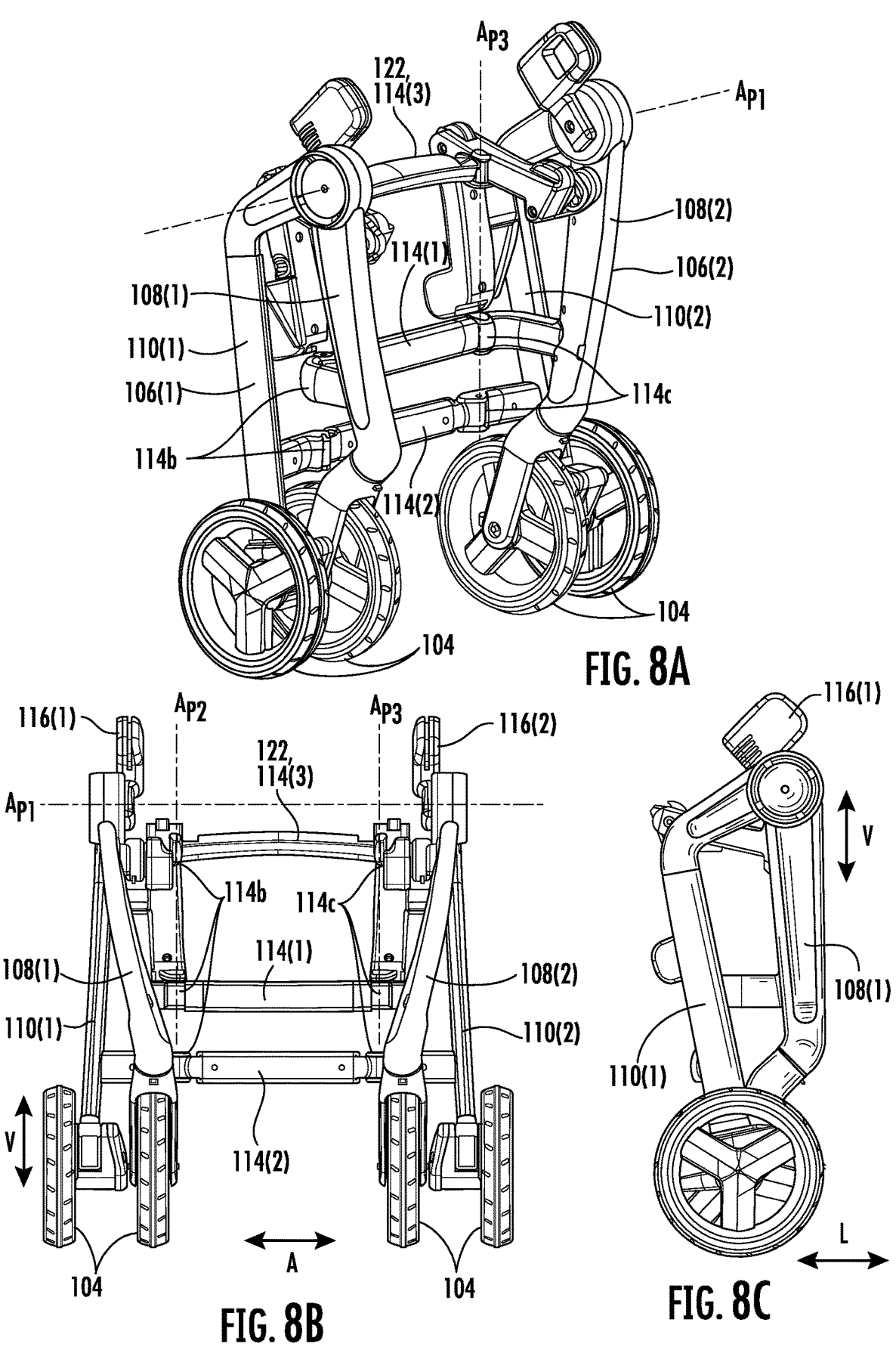
FIG. 8A shows a perspective view of the child carriage of FIG. 3, with the child carriage in a first folded configuration.
FIG. 8B shows a front view of the child carriage of FIG. 3, with the child carriage in a first folded configuration.
FIG. 8C shows a side view side the child carriage of FIG. 3, with the child carriage in a first folded configuration.

Turning to FIGS. 1 and 2, a travel system 10 is shown according to one example that comprises a child carriage 100 and at least one removable child carrier. In general, the at least one removable child carrier can comprise an infant car seat 200 as shown in FIGS. 1 and 2, a toddler seat 400 as shown in FIG. 36A, a bassinet (not shown), or carrycot (not shown). In some examples, the travel system 10 can comprise the infant car seat 200, the toddler seat 400, the bassinet, or the carrycot, or any combination thereof. The child carriage 100 comprises a frame 102 that is configured to support the child carrier (e.g., 200, 400) above a riding surface, and a plurality of wheels 104 that are attached to the frame 102 and configured to translate the child carriage 100 and the child carrier (e.g., 200, 400) along a riding surface. The child carrier (e.g., 200, 400) and child carriage 100 are configured to be removably coupled to one another. When not in use, the child carriage 100 can be folded compactly for storage in a vehicle, overhead storage bin of an airplane, or other storage location. As will be discussed in further detail below, the child carriage 100 can be configured to fold from an expanded configuration to a first folded configuration (e.g., FIGS. 8A to 8C), and can optionally be configured to fold from the first folded configuration to a second folded configuration (e.g., FIGS. 9A, 9B), where the child carriage 100 occupies a smaller volume in the second folded configuration than in the first folded configuration.

Unlike conventional strollers, the child carriage 100 is devoid of a push handle that is used to push a child. In other words, the child carriage 100 is devoid of a handle that extends above the child carrier that would be accessible to an adult to push the child carriage 100 while the adult is standing upright. Rather, the child carrier (e.g., 200, 400) comprises a handle (e.g., 226 in FIG. 10, 404 in FIG. 36A) that a caregiver can use to push the child carriage 100 and the child carrier (e.g., 200, 400) along the riding surface when the child carrier (e.g., 200, 400) is coupled to the child carriage 100. In some examples, the same handle (e.g., 226) can be used to carry the child carrier (e.g., 200) when the child carrier (e.g., 200) is detached from the child carriage 100. The child carrier (e.g., 200, 400) is configured such that removal of the child carrier (e.g., 200, 400) from the child carriage 100 causes the handle (e.g., 226, 404) to be removed with the child carrier (e.g., 200, 400) from the child carriage 100. As a result, the child carriage 100 can achieve a more compact folded volume than comparable conventional strollers that include push handles. In some examples, the travel system 10 can comprise a travel organizer 300 that can be configured to hold at least one item such as a beverage container, a mobile device, or other item for the caregiver. The travel organizer 300 can be configured to removably couple to the handle (e.g., 226, 404) of the child carrier (e.g., 200, 400).

Child Carriage

Turning now more specifically to FIGS. 2 to 4, the frame 102 of the child carriage 100 comprises an upper end 102a and a lower end 102b that are offset from one another along a vertical direction V. The frame 102 comprises a front end 102c and a rear end 102d that are offset from one another along a longitudinal direction L, perpendicular to the vertical direction V. The frame comprises a first side 102e and a second side 102f that are offset from one another along a lateral direction A, perpendicular to both the vertical direction V and the longitudinal direction L.

The child carriage 100 comprises a plurality of wheels 104 disposed at the lower end 102b of the frame 102. The upper end 102a of the frame 102 is configured to removably couple to the child carrier (e.g., 200, 400) so as to space the child carrier (e.g., 200, 400) above the riding surface. As will be described in further detail below, the upper end 102a of the frame 102 comprises at least one seat coupler that is configured to removably couple the child carrier (e.g., 200, 400) to the child carriage 100 such that movement of the child carrier (e.g., 200, 400) relative to the child carriage 100 is limited along at least one of the vertical direction V, the longitudinal direction L, and the lateral direction A. In some examples, the at least one seat coupler is configured to removably couple the child carrier (e.g., 200, 400) to the child carriage 100 such that movement of the child carrier (e.g., 200, 400) relative to the child carriage 100 is limited along at least two of the vertical direction V, the longitudinal direction L, and the lateral direction A, such as along all three of the vertical direction V, the longitudinal direction L, and the lateral direction A. For instance, the at least one seat coupler can be configured to removably couple the child carrier (e.g., 200, 400) to the carriage 100 so as to prevent removal of the child carrier (e.g., 200, 400) along an upwards direction. The at least one seat coupler can be configured to removably couple to a rigid portion of the child carrier (e.g., 200, 400), such as to a rigid body (e.g., 202 of FIG. 10) or shell of the child carrier (e.g., 200) or a rigid frame (e.g., 402 of FIG. 36A) of the child carrier (e.g., 400).

The frame 102 can comprise a first leg assembly 106(1), and a second leg assembly 106(2) that are offset from one another along the lateral direction A. The first leg assembly 106(1) can be adjacent the first side 102e and the second leg assembly 106(2) can adjacent the second side 102f The first leg assembly 106(1) can comprise a first front leg 108(1) and a first rear leg 110(1) that are offset from one another along a longitudinal direction L, perpendicular to the lateral direction A. The first leg assembly 106(1) can comprise a first hinge 112(1) that pivotably connects the first front leg 108(1) and the first rear leg 110(1) to one another. For example, the first hinge 112(1) can pivotably couple an upper end of the first front leg 108(1) to an upper end of the first rear leg 110(1). The first hinge 112(1) can define a pivot axis $A_{P1}$ that extends along the lateral direction A. The first front leg 108(1) and first rear leg 110(1) can be configured to pivot about the pivot axis $A_{P1}$ such that a lower end of the first front leg 108(1) and a lower end of the first rear leg 110(1) move towards one another along the longitudinal direction L to the first folded configuration and away from one another along the longitudinal direction L to an expanded configuration.

The second leg assembly 106(2) can comprise a second front leg 108(2) and a second rear leg 110(2) that are offset from one another along the longitudinal direction L. The second leg assembly 106(2) can comprise a second hinge 112(2) that pivotably connects the second front leg 108(2) and the second rear leg 110(2) to one another. For example, the second hinge 112(2) can pivotably couple an upper end of the second front leg 108(2) to an upper end of the second rear leg 110(2). The second hinge 112(2) can define a pivot axis API that extends along the lateral direction A. The second front leg 108(2) and second rear leg 110(2) can be configured to pivot about the pivot axis $A_{P1}$ such that a lower end of the second front leg 108(2) and a lower end of the second rear leg 110(2) move towards one another along the longitudinal direction L to the first folded configuration and away from one another along the longitudinal direction L to an expanded configuration.

The frame 102 can comprise at least one crosspiece 114(1), 114(2) that extends between the first and second leg assemblies 106(1) and 106(2) so as to space the first and second leg assemblies 106(1) and 106(2) from one another along the lateral direction A. Each crosspiece can be shaped as a bar, a tube, or can have any other suitable shape. The at least one crosspiece 114(1), 114(2) can comprise a first crosspiece 114(1) that extends from the front leg 108(1) to the front leg 108(2). The first crosspiece 114(1) can have a first end that is attached to the first front leg 108(1) and a second end that is attached to the second front leg 108(2). The at least one crosspiece 114(1), 114(2) can comprise a second crosspiece 114(2) that extends from the first rear leg 110(1) to the second rear leg 110(2). The second crosspiece 114(2) can have a first end that is attached to the first rear leg 110(2) and a second end that is attached to the second rear leg 110(2). In some examples, the frame 102 can comprise a third crosspiece 114(3) that extends between the first and second leg assemblies 106(1) and 106(2). The third cross-piece 114(2) can be disposed at a position that is higher than the first and second crosspieces 114(1) and 114(2) with respect to the vertical direction V. The third crosspiece 114(2) can be disposed at a position that is between the first and second crosspieces 114(1) and 114(2) with respect to the longitudinal direction L when the child carriage 100 is in the expanded configuration. The third crosspiece 114(3) can define a carry handle 122. The carry handle 122 can be configured for carrying the child carriage 100 by hand when the child carrier (e.g., 200, 400) is detached from the child carriage 100.

The plurality of wheels 104 can comprise at least three wheels 104, and in some examples, can comprise four wheels 104. For example, the plurality of wheels 104 can comprise a first pair of wheels 104 disposed at the rear end 102d of the frame 102. A first wheel 104 of the first pair can be coupled to a lower end of the first rear leg 110(1) of the first leg assembly 106(1), and a second wheel 104 of the first pair can be coupled to a lower end of the second rear leg 110(2) of the second leg assembly 106(2). The plurality of wheels 104 can comprise at least one wheel 104 disposed at the front end 102e of the frame 102. For example, the plurality of wheels 104 can comprise a second pair of wheels 104 disposed at the front end 102e of the frame 102. A first wheel 104 of the second pair can be coupled to a lower end of the first front leg 108(1) of the first leg assembly 106(1), and a second wheel 104 of the second pair can be coupled to a lower end of the second front leg 108(2) of the second leg assembly 106(2). Alternatively, the plurality of wheels can comprise a single wheel 104 (not shown) disposed at the front end 102e of the frame. The single wheel 104 can be coupled to the lower end of the frame 102 at a location that is between the front legs 108(1) and 108(2) or the frame 102 can comprise a single front leg with a wheel 104 attached thereto.

As discussed above, the child carriage 100 can comprise at least one coupler that is configured to couple the child carrier (e.g., 200, 400) to the child carriage 100. FIGS. 2 to 4 show one specific example of couplers that can be used to couple the child carrier (e.g., 200, 400) to the child carriage 100; however, it will be understood that the child carrier (e.g., 200, 400) can be coupled to the child carriage 100 using another suitable coupler or couplers. In some examples, as shown in FIGS. 2 to 4, the at least one coupler can comprise a first pair of couplers 116(1), 116(2). A first coupler 116(1) of the first pair can be disposed at the first side 102e of the frame 102. The first coupler 116(1) can be attached to the first leg assembly 106(1). The first coupler 116(1) can be configured to couple to a first lateral side (e.g., 202e of FIGS. 10 and 11) of the child carrier (e.g., 200, 400). A second coupler 116(2) of the first pair can be disposed at the second side 102f of the frame 102. The second coupler 116(2) can be configured to couple to a second lateral side (e.g., 202f of FIGS. 10 and 11) of the child carrier (e.g., 200, 400). The second coupler 116(2) can be attached to the second leg assembly 106(2). In some examples, each of the first and second couplers 116(1) and 116(2) can define a bayonet 117 as shown, although examples of the disclosure are not so limited.

Each bayonet 117 can be a protrusion that extends upwards. Each bayonet 117 can be elongate generally along the vertical direction V. Each bayonet 117 can have a thickness along the lateral direction A, a height along the vertical direction V, and a width along the longitudinal direction L. The height can be greater than the thickness and/or width. In some examples, the width can be greater than the thickness.

Each of the first and second couplers 116(1), 116(2) can define a protrusion or an opening 118 that is configured to engage another of a protrusion and an opening (e.g., 216 of FIG. 10, 11 or 446 of FIGS. 40A, 40B) of the child carrier (e.g., 200, 400). FIGS. 2 to 4 show one example in which each coupler 116(1), 116(2) defines an opening 118 on an inner surface thereof that is configured to receive a protrusion (e.g., 216 of FIGS. 10, 11) of the child carrier (e.g., 200, 400). Each coupler 116(1), 116(2) can engage a different lateral side of the child carrier (e.g., 200, 400) so as to limit movement of the child carrier along the lateral direction A. The protrusion or recess 118 of each coupler 116(1), 116(2) can be configured to engage the other of a protrusion and an opening (e.g., 216 of FIGS. 10, 11) of the child carrier (e.g., 200, 400) so as to limit movement of the child carrier along the vertical direction V (e.g., along at least one of an upward and downward direction), and/or the longitudinal direction L.

The at least one coupler can comprise at least one other coupler, such as a pair of infant car seat couplers 120(1), 120(2), that is configured to removably couple to an infant car seat 200. The at least one infant car seat coupler 120(1), 120(2) can be configured to engage a movable latch 220 (see FIG. 10) of the infant car seat 200 that also affixes the infant car seat 200 to a car seat base 500 (see FIGS. 13A, 13B). Each of the at least one infant car seat coupler 120(1), 120(2) can define an engagement surface that is configured to be engaged by a movable latch 220 of the infant car seat 200 so as to limit movement of the infant car seat along at least one of the vertical direction V and the longitudinal direction L.

Each of the at least one infant car seat coupler 120(1), 120(2) can be offset from the first pair of couplers 116(1), 116(2) along the longitudinal direction L. For example, each of the at least one infant car seat coupler 120(1), 120(2) can be disposed in front of, or behind, the first pair of couplers 116(1), 116(2) with respect to the longitudinal direction L. The at least one infant car seat coupler 120(1), 120(2) couples the infant car seat 200 to the carriage 100 so as to limit torque applied to the pair of seat couplers 116(1), 116(2) when a force is applied to the handle 226 (see FIG. 10) of the infant car seat 200. In FIGS. 2 to 4, each infant car seat coupler 120(1), 120(2) includes a cylindrical pin having an outer curved surface that defines the engagement surface. Each cylindrical pin can be oriented such that a central axis of the cylindrical pin extends along the lateral direction A. It will be understood that, in alternative examples, each engagement surface can be defined by a shape other than a cylindrical pin or the cylindrical pin can be oriented in another manner.

The at least one coupler can comprise at least one toddler seat coupler 132(1), 132(2) that is configured to removably couple to a toddler seat 400. The at least one toddler seat coupler 132(1), 132(2) can be the same as the at least one infant car seat coupler 120(1), 120(2), or can another coupler that is separate from the at least one infant car seat coupler 120(1), 120(2). In some examples, the at least one coupler can comprise a pair of toddler seat couplers 132(1), 132(2), each being configured to removably couple to a toddler seat 400. The at least one toddler seat coupler 132(1), 132(2) can be configured to engage a movable latch 456 (see FIGS. 40A, 40B) of the toddler seat 400. Each of the at least one toddler seat coupler 132(1), 132(2) can define an engagement surface that is configured to be engaged by a movable latch 456 of the toddler seat 400 so as to limit movement of the toddler seat 400 along at least one of the vertical direction V and the longitudinal direction L. Each of the at least one toddler seat coupler 132(1), 132(2) can be offset from the first pair of couplers 116(1), 116(2) along the longitudinal direction L. For example, each of the at least one toddler seat coupler 132(1), 132(2) can be disposed in front of, or behind, the first pair of couplers 116(1), 116(2) with respect to the longitudinal direction L. In one example, each infant car seat coupler 120(1), 120(2) can be disposed behind the first pair of couplers 120(1), 120(2), and each toddler seat coupler 132(1), 132(2) can be disposed in front of the first pair of couplers 116(1), 116(2). The at least one toddler seat coupler 132(1), 132(2) couples the toddler seat 400 to the carriage 100 so as to limit torque applied to the pair of seat couplers 116(1), 116(2) when a force is applied to the handle 404 (see FIG. 36A) of the toddler seat 400.

The child carriage 100 can comprise at least one fold latch (e.g., 125 of FIGS. 6A to 7B described further below) that is configured to releasably lock the child carriage 100 in the expanded position. The child carriage 100 can comprise an actuator (e.g., 127 of FIG. 6A discussed further below) that is configured to actuate the at least one fold latch to move the at least one fold latch between an unlocked position, wherein the child carriage 100 is permitted to be folded, and a locked position, wherein the child carriage 100 is prevented from being folded. The actuator can comprise the third crosspiece 114(3) that defines the handle 122 that is configured to be grasped by a caregiver to move the at least one lock to the unlocked position. In some examples, the handle 122 can extend between the first and second leg assemblies 106(1) and 106(2). For example, the handle 122 can be elongate along the lateral direction A. In the examples of FIGS. 2 to 4, the handle 122 is shaped as a bar; however, it will be understood that the handle 122 can have other suitable shapes in other examples. For instance, the handle 122 could alternatively comprise a fabric webbing or cord (not shown) that extends between the first and second leg assemblies 106(1) and 106(2), the webbing or cord unlocking the fold latch when the webbing or cord is pulled.

In some examples, the handle 122 can comprise a movable actuator body (e.g., 129 in FIG. 6A discussed below), such as a movable button, that is configured to be engaged by a caregiver to move the at least one lock (e.g., 125 of FIGS. 6A to 7B) to the unlocked position when the movable actuator body is moved (e.g., when the movable button is depressed). The child carriage 100 can be configured such that the carriage 100 can be transitioned from the expanded configuration to the first folded configuration by pulling on the actuation handle 122 upwards along the vertical direction. In some examples, this can be performed after moving the movable actuator body. In other examples (such as when the handle comprises a webbing or cord), movement of the actuator handle 122 itself can cause the at least one lock to transition from the locked position to the unlocked position and then further movement of the actuation handle 122 can cause the child carriage 100 to transition from the expanded configuration to the first folded configuration.

The child carriage 100 can comprise at least one linkage 124(1), 124(2). FIGS. 3 and 4 show an example in which the child carriage 100 comprises a first linkage 124(1) attached to the first side 102e of the frame 102 and a second linkage 124(2) attached to the second side 102f of the frame 102. In some examples, each linkage 124(1), 124(2) can be configured to drive movement of one of the front legs 108(1), 108(2) and one of the rear legs 110(1), 110(2) towards one another when transitioning the child carriage 100 to the first folded configuration and away from one another when transitioning the child carriage 100 to the expanded configuration. Each of the at least one linkage 124(1), 124(2) can include at least one seat coupler. For example, each of the at least one linkage 124(1), 124(2) can include one of the infant car seat couplers 120(1), 120(2) and/or one of the toddler seat couplers 132(1), 132(2). In some examples, each of the at least one linkage 124(1), 124(2) can include a support surface that is configured to support the child carrier (e.g., 200, 400) thereon. Each of the at least one linkage 124(1), 124(2) can include a fold lock 125 (described in further detail below) that limits movement of the linkage when the fold lock 125 is in the locked position, thereby preventing the child carriage 100 from transitioning from the expanded configuration to the first folded configuration.

Figures 5A, 5B, 5C:
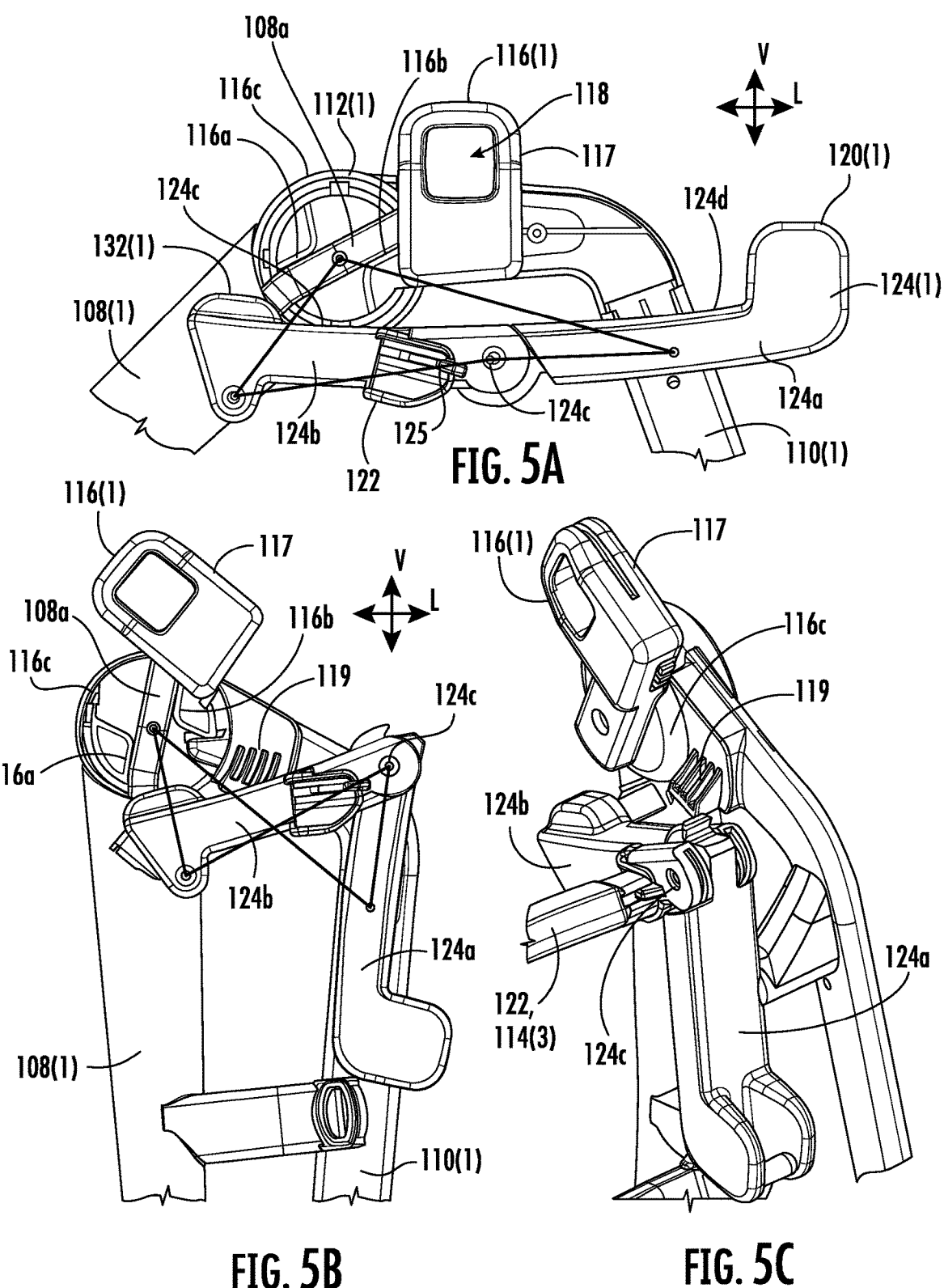
FIG. 5A shows a side view of an inner side of a linkage of the child carriage of FIG. 3, with the child carriage in an expanded configuration.
FIG. 5B shows a side view of the inner side of the linkage of FIG. 5A, with the child carriage in a first folded configuration.
FIG. 5C shows a perspective view of the linkage of 5A, with the child carriage in the first folded configuration.

With specific reference to FIGS. 5A to 5C, each linkage 124(1), 124(2) can comprise a first link 124a and a second link 124b. The first and second links 124a and 124b can have inner ends that are pivotably connected to one another at a first hinge 124c. The first link 124a can additionally be pivotably coupled to one of the front legs 108(1), 108(2), and the second link 124b can additionally be pivotably coupled to one of the rear legs 110(1), 110(2). The first and second links 124a and 124b of each linkage 124(1), 124(2) can each be shaped as a bar, or a plate, or can have any other suitable shape. The first and second links 124a and 124b of each linkage 124(1), 124(2) can define corresponding support surfaces 124c and 124d, respectively, that are aligned with one another when the child carriage 100 is in the expanded configuration. The support surfaces 124c and 124d can support a bottom surface of the child carrier (e.g., 200) when the child carrier (e.g., 200) is coupled to the frame 102 such that the bottom surface rests on the support surfaces 124c and 124d. This can prevent downward movement of the child carrier relative to the frame 102.

The third crosspiece 114(3) can be coupled to the at least one linkage. For example, the third crosspiece 114(3) can be coupled to the first linkage 124(1), such as to one of the first and second links 124a and 124b of the first linkage 124(1). The third crosspiece 114(3) can also be coupled to the second linkage 124(2), such as to one of the first and second links 124a and 124b of the second linkage. The third crosspiece 114(3) is configured such that, when the third crosspiece 114(3) is moved upwards relative to the first and second leg assemblies 106(1) and 106(2), the inner ends of the first and second links 124a and 124b of each linkage 124(1), 124(2) pivot relative to one another and move upwards. This in turn causes the outer ends of the first and second links 124a and 124b of each linkage 124(1), 124(2) to move towards one another, thereby drawing the front legs 108(1), 108(2) and rear legs 110(1), 110(2) towards one another towards the first folded configuration. Further, each of the connectors 120(1) and 120(2) retract as the front and rear legs move towards one another. Thus, it can be said that the child carriage 100 comprises at least one linkage that causes at least one connector to retract when the child carriage 100 is transitioned to the first folded configuration.

Conversely, when the third crosspiece 114(3) is moved downwards relative to the first and second leg assemblies 106(1) and 106(2), the inner ends of the first and second links 124a and 124b of each linkage 124(1), 124(2) pivot relative to one another and move downwards. This in turn causes the outer ends of the first and second links 124a and 124b of each linkage 124(1), 124(2) to move away from one another, thereby moving the front legs 108(1), 108(2) and rear legs 110(1), 110(2) away from one another towards the expanded configuration. Further, each of the connectors 120(1) and 120(2) extend as the front and rear legs move away from one another. Thus, it can be said that the child carriage 100 comprises at least one linkage that causes at least one connector to extend when the child carriage 100 is transitioned to the expanded configuration. It will be understood that, in alternative examples, the third crosspiece 114(3) need not be coupled to the at least one linkage. For example, the third crosspiece 114(3) could alternatively be coupled to one of the carriage legs 108(1), 108(2), 110(1), 110(2), or to the hinges 112(1), 112(2).

With continued reference to FIGS. 5A to 5C, each coupler 116(1), 116(2) can be configured positionally fixed relative to a corresponding one of the leg assemblies 106(1), 106(2) when the carriage 100 is in the expanded configuration such that that coupler 116(1), 116(2) is prevented from rotating relative to the leg assembly 106(1), 106(2). In some examples, each coupler 116(1), 116(2) can be permitted to rotate when the carriage 100 transitioned to the first folded configuration. For instance, each coupler 116(1), 116(2) can be configured to rotate forward towards the front end of the carriage 100 to enable the toddler seat 400 to remain attached to the carriage 100 when the carriage 100 is transitioned to the first folded configuration as will be discussed further below in relation to FIGS. 37A and 37B. The carriage 100 can comprise at least one stop for each coupler 116(1), 116(2) that is configured to limit rotation of the coupler 116(1), 116(2) when the carriage 100 is in the expanded configuration and to permit rotation when the carriage is in the first folded configuration. For example, the carriage 100 can comprise a stop 119 for each coupler 116(1), 116(2) that is configured to engage the coupler 116(1), 116(2) to limit downward rotation of the coupler 116(1), 116(2) towards the rear end 102d of the carriage frame 102 when the carriage 100 is in the expanded configuration. Each stop 119 can be attached to one of the rear legs 110(1), 110(2).

Each coupler 116(1), 116(2) can comprise at least one rotatable stop, such as a pair of rotatable stops 116a and 116b. Each rotatable stop 116a, 116b can engage a different side of a leg tube 108a of one of the front legs 108(1), 108(2). Each coupler 116(1), 116(2) can comprise a rotatable hub 116c, attached to the bayonet 117 of the coupler 116(1), 116(2), that comprises the at least one rotatable stop 116a, 116b. The rotatable hub 116 can be rotationally fixed relative to the bayonet 117 such that rotation of the rotatable hub 116 causes rotation of the bayonet 117. When the carriage 100 is in the expanded configuration (FIG. 5A), the at least one rotatable stop 116a, 116b can be positioned to prevent the rotatable hub 116, and consequently the at least one rotatable stop 116a, 116b and bayonet 117, from rotating forwards towards the front end 102c of the carriage frame 102.

When the carriage 100 is transitioned to the first folded configuration (FIG. 5B), the leg tube 108a rotates, thereby allowing the rotatable hub 116, and consequently the at least one rotatable stop 116a, 116b and bayonet 117, to be rotated forwards as shown in FIG. 5B. The at least one stop 116a, 116b engages the leg tube 108a so as to limit further forward rotation of the rotatable hub 116, at least one stop 116a, 116b, and bayonet 117. Note that, when the carriage is in the first folded configuration in FIG. 5B, the at least one rotatable stop 116a, 116b can be positioned so as to allow downward rotation of the coupler 116(1), 116(2) towards the rear end 102d of the carriage frame 102.

Figures 6A, 6B, 6C:
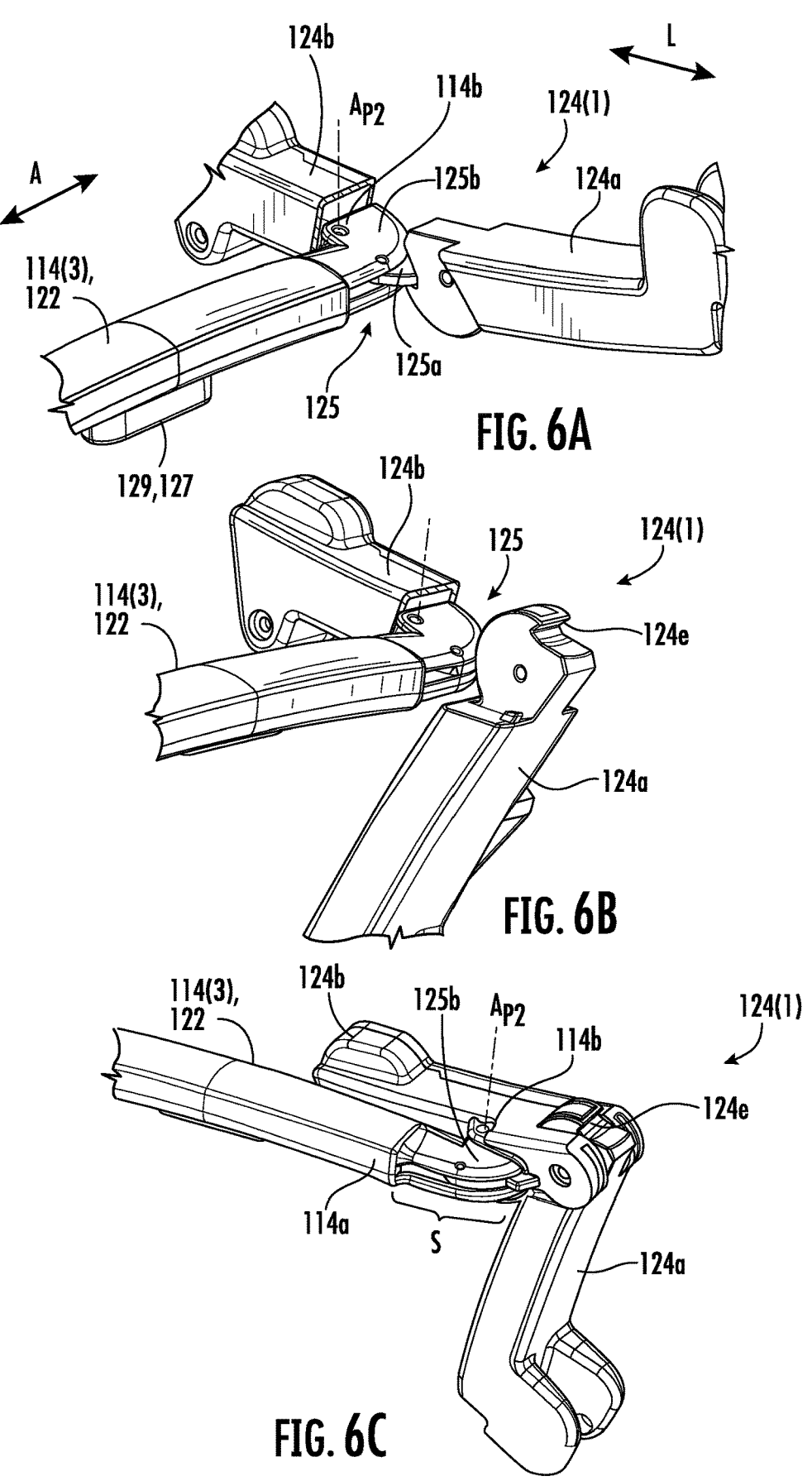
FIG. 6A shows a perspective view of the linkage of FIG. 5A, with a portion of one link cut away to show a latch housing, where the child carriage is in the expanded folded configuration.
FIG. 6B shows a perspective view of the linkage of FIG. 6A, with a portion of one link cut away to show a latch housing, where the child carriage is in the first folded configuration.
FIG. 6C shows a perspective view of the linkage of FIG. 6A, where the child carriage is in a second folded configuration.
Figure 7A:
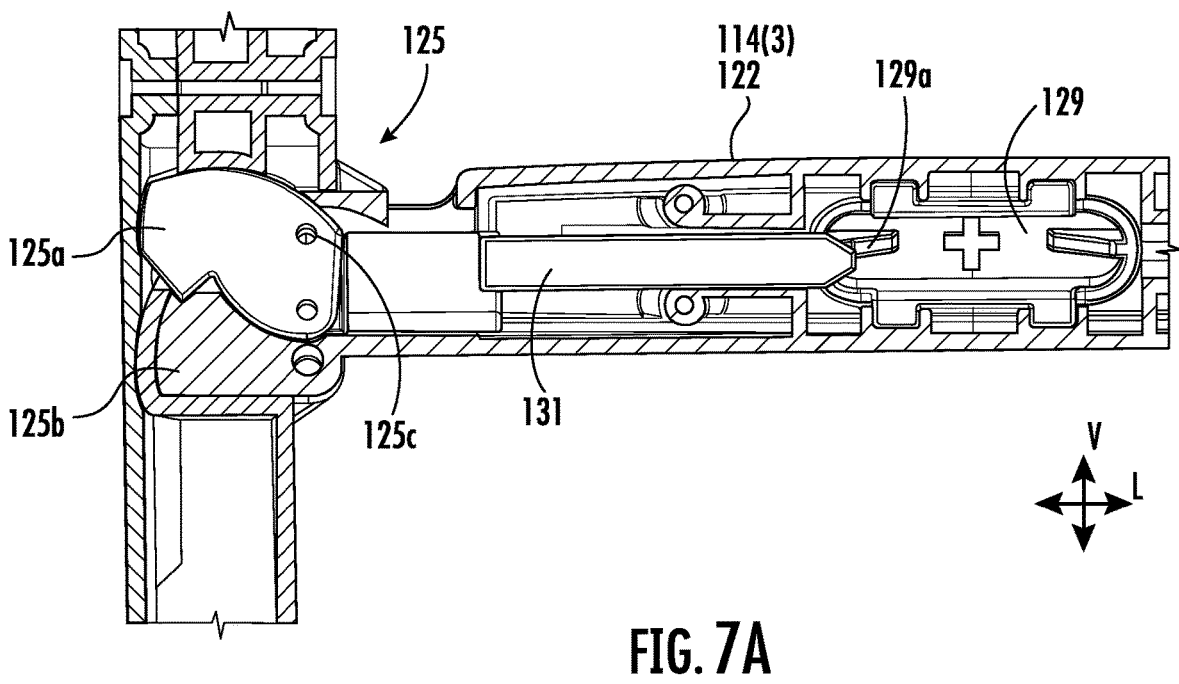
FIG. 7A shows a cross-sectional top view of a portion of the linkage of FIG. 5A and the handle to illustrate a fold latch and actuator in a latched position.
Figure 7B:
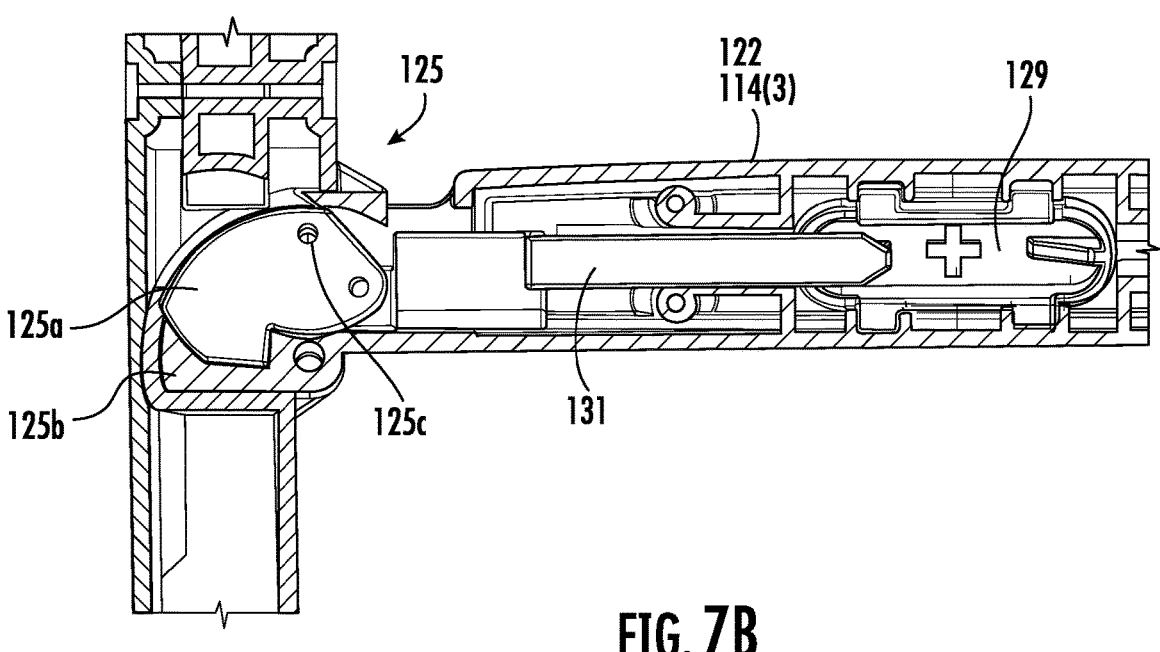
FIG. 7B shows a cross-sectional top view of a portion of the linkage of FIG. 5A and the handle to illustrate the fold latch and the actuator in an unlatched position.

Turning to FIGS. 6A to 7B, the child carriage 100 can comprise a fold latch 125 for each of at least one of the first and second linkages 124(1), 124(2). Each fold latch 125 can prevent the links, such as the first and second links 124a and 124b, of a respective one of the linkages 124(1), 124(2) from pivoting relative to one another. Each fold latch 125 can comprise a movable protrusion 125a that is configured to transition between a locked position and an unlocked position. In the locked position, the protrusion 125a can engage at least one of the first and second links 124a and 124b to prevent the first and second links 124a from pivoting relative to one another about the hinge 124c. The at least one of the first and second links 124a and 124b can comprise an engagement surface 124e that is configured to be engaged by the protrusion 125a. In the unlocked position, the protrusion 125a can retract so that the protrusion 125a is disengaged from the at least one of the first and second links 124a and 124b, thereby permitting the first and second links 124a to pivot relative to one another about the hinge 124c. In some examples, the protrusion 125a can rotate between the locked and unlocked positions as shown in FIGS. 7A and 7B.

Each fold latch 125 can comprise a latch housing 125b that is configured to house the protrusion 125a. Note that, in FIGS. 6A and 6B, a portion of the link 124b is cut away so that the latch housing 125b is visible. Each latch housing 125b can pivotably couple the third crosspiece 114(3) to a respective one of the first and second links 124a and 124b about a pivot axis $A_{P2}$ or $A_{P3}$. The carriage 100 can be configured to fold about the pivot axis $A_{P2}$ or $A_{P3}$ to transition to the second folded configuration (FIG. 6C). The carriage 100 can be configured such that each latch housing 125b is at least partially disposed within a link of a respective one of the linkages 124(1), 124(2) when the carriage 100 is in each of the expanded configuration (FIG. 6A), the first folded configuration (FIG. 6B), and the second folded configuration (FIG. 6C). In this manner, each latch housing 125b can occupy a space S between an end 114a of the third crosspiece 114(3) and a respective one of the first and second linkages 124(1), 124(2) so as to avoid any potential pinch points that would otherwise exist in the space S absent the housing latch 125b.

Turning briefly to FIGS. 7A and 7B, the actuator 127 can comprise a movable actuator body 129 that is configured to be engaged by a caregiver to move the fold latch 125 between the unlocked position and the locked position. The movable actuator body 129 can move relative to the handle 122. In one example, the movable actuator body 129 can be carried by the handle 122. For instance, the movable actuator body 129 can define a button that is configured to retract into the handle 122 when depressed by a caregiver. The actuator 127 can comprise a link 131, such as a band, wire, or cable that is attached to the movable actuator body 129 and the fold latch 125 such that movement of the movable actuator body 129 is converted to movement of the fold latch 125 between the locked position and the unlocked position. For example, the actuator body 129 can have a ramped surface 129a that engages a ramped surface of the link 131 to cause the link 131 to translate along the lateral direction A when the actuator body 129 is moved along a direction (e.g., the vertical or longitudinal direction) that is angularly offset from the lateral direction A. Movement of the link 131 can cause the latch protrusion 125a to rotate about a pivot 125c between the locked and unlocked positions. The latch 125 and actuator 127 can be implemented in another suitable manner.

It will be understood that, in alternative examples, the at least one linkage can be configured in a manner other than that shown. For instance, in some examples, the at least one linkage might not define a support surface. In some examples, the at least one linkage might not support any of the connectors 120(1) or 120(2). In some examples, the at least one linkage might have more than two links and/or the links may be configured in a manner other than that shown. In some examples, the at least one linkage might not engage the at least one fold latch 125, and the at least one fold latch 125 can be located elsewhere. For instance, the at least one fold latch 125 can be located in at least one of the hinges 112(1), 112(2) (FIG. 3).

Turning to FIGS. 8A to 9B, the child carriage 100 can be folded from the expanded configuration to the first folded configuration (FIGS. 8A to 8C) by pivoting the front legs 108(1), 108(2) relative to the rear legs 110(1), 110(2) about a first pivot axis API that extends along the lateral direction A. In some examples, the child carriage 100 can be folded from the first folded configuration (FIGS. 8A to 8C) to a second folded configuration (FIGS. 9A, 9B) about at least one other pivot axis, such as about the pivot axes $A_{P2}$, $A_{P3}$, where each is angularly offset from the first pivot axis $A_{P1}$. For instance, the at least one other pivot axis $A_{P2}$, $A_{P3}$ can extend substantially along the vertical direction V. The child carriage 100 can be folded from the first folded configuration (FIGS. 8A to 8C) to a second folded configuration (FIGS. 9A, 9B) by rotating the first and second leg assemblies 106(1) and 106(2) towards one another about the at least one other pivot axis.

Each crosspiece 114(1), 114(2), 114(3) can comprise at least one hinge, such as a first hinge 114d and a second hinge 114e that are offset from one another along a length of the crosspiece (e.g., along the lateral direction A). The child carriage 100 is configured such that, when the frame 102 is transitioned to the first folded configuration, the first hinges 114b of the crosspieces 114(1), 114(2), 114(3) align with one another along a second pivot axes $A_{P2}$, and the second hinges 114b of the crosspieces 114(1), 114(2), 114(3) align with one another along a third $A_{P3}$. This alignment permits the first leg assembly 106(1) to be rotated towards the second leg assembly 106(2) about the second pivot axis $A_{P2}$, and the second leg assembly 106(2) to be rotated towards the first leg assembly 106(1) about the third pivot axis $A_{P3}$.

As can be seen in FIGS. 1 and 2, the child carriage 100 is devoid of push bars and a push handle that extends up from the leg assemblies 106(1), 106(2) above the child carrier (200, 400) when the child carrier is coupled to the child carriage 100. Further, as can be seen in FIGS. 3 and 4, the child carriage 100 is also devoid of any frame structure that extends above the leg assemblies 106(1), 106(2) to support a fabric seat. In fact, the child carriage 100 can be configured such that no portion of the child carriage 100 extends above the child carrier (200, 400) when the child carrier (200, 400) is coupled to the child carriage 100.

Child Carriage Basket

Referring to FIGS. 43 to 45, the child carriage 100 is shown with a basket 126 according to one example. The basket 126 can be formed from at least one fabric. The basket 126 can be disposed between the first and second leg assemblies 106(1) and 106(2). The basket 126 can comprise a front end 126a and a rear end 126b that are offset from one another along the longitudinal direction L. The front and rear ends 126a and 126b can be substantially closed. The basket 126 can comprise a first side 126c and a second side 126d that are offset from one another along the lateral direction A. The first side 126c can be attached to the first leg assembly 106(1), and the second side 126c can be attached to the second leg assembly 106(2). The first and second sides 126c and 126d can extend from the front end 126a to the rear end 126b. The first and second sides 126c and 126d can be substantially closed. The front end 126a and rear end 126b can extend from the first side 126c to the second side 126d.

The basket 126 can comprise an upper end 126e and a lower end 126f that are offset from one another along the vertical direction V. The upper end 126e and the lower end 126f can extend from the front end 126a to the rear end 126b and from the first side 126e to the second side 126d. At least a portion, up to all, of the upper end 126e can be open. The lower end 126e can be closed so as to prevent items stowed therein from falling out of the basket 126. The basket 126 can define a recess therein between the front end 126a and the rear end 126b, between the first side 126c and the second side 126d, and between the upper end 126e and the lower end 126f.

The basket 126 can be attached to the first and second front legs 108(1) and 108(2) and to the first and second rear legs 110(1) and 110(2). The rear end 126b of the basket 126 can extend beyond at least a portion of each of the first and second rear legs 110(1) and 110(2) along the longitudinal direction L. The rear end 126b can extend beyond the second (i.e., rearward) crosspiece 114(2) along the longitudinal direction L. The second crosspiece 114(2) can be disposed within the basket 126. The first side 126c, the second side 126d, the front end 126a, and the rear end 126b can extend above the second crosspiece 114(2) such that the second crosspiece 114(2) is between the front end 126 and the rear end 126b and between the first side 126c and the second side 126d. In some examples, the second crosspiece 124(2) can be disposed closer to the lower end 126f than to the upper end 126e.

The rear end 126b can comprise a stiffener 128 therein. In one example, the stiffener 128 can have a "U" shape having first and second ends 128a and 128b that are attached to the first and second leg assemblies 106(1) and 106(2), respectively. The stiffener 128 can be a piece of plastic or other flexible material. In some examples, the stiffener 128 can be a bent rod that is received in a tunnel (e.g., a fabric tunnel) of the basket 126. The stiffener 128 can be disposed along the upper end 126e. The stiffener 128 can be configured such that, when the child carriage 100 is transitioned from the expanded configuration (FIG. 43) to the first folded configuration (FIG. 44), the stiffener 128, and hence the rear end 126b of the basket 126, retract relative to the first and second rear legs 110(1) and 110(2). For example, the first and second ends 128a and 128b of the stiffener 128 can be pivotably attached to the first and second rear legs 110(1) and 110(2), respectively, such that, when the child carriage 100 is transitioned from the expanded configuration (FIG. 43) to the first folded configuration (FIG. 44), the stiffener 128 rotates relative to the first and second rear legs 110(1) and 110(2) about a pivot axis. The pivot axis can extend along the lateral direction A. The stiffener 128 can also bend or move as the child carriage 100 is transitioned from the first folded configuration (FIG. 44) to the second folded configuration (FIG. 45). Thus, the child carriage 100 can transition to the first and second folded configurations while the basket 126 remains attached. This is made possible, at least in part, by at least one, up to all of (1) the basket 126 extending beyond the rear legs 110(1) and 110(2), and the stiffener 128 flexing and/or pivoting while the child carriage 100 is being folded.

Referring to FIGS. 46 to 48, the child carriage 100 is shown with a basket 126 according to another example. The basket 126 has a front end 126a, a first side 126c, a second side 126, an upper end 126e, and a lower end 126f that are configured in a manner similar to that discussed above in FIGS. 43 to 45. The basket 126 also has a rear end 126b that is configured differently from the rear end 126b discussed above in FIGS. 43 to 45. In this example, the rear end 126b extends beyond at least a portion of the rear legs 110(1) and 110(2). The rear end 126b comprises a stiffener 128 that has a planar shape. The stiffener 128 can be a piece of plastic or other flexible material. The stiffener 128 can extend from the upper end 126e to the lower end 126f The stiffener 128 can extend from the first side 126c to the second side 126d. Each of the first and second sides 126c and 126d can comprise at least one fold 130, such as an accordion fold, that permits the rear end 126 to transition between an open position (as shown) and a closed position, where the rear end 126 extends further from the first and second rear legs 110(1) and 110(2) along the longitudinal direction L in the open position than in the closed position. The child carriage 100 can comprise at least one pair of magnets that is configured to maintain the rear end 126b in the closed position, and that can be separated to transition the basket 126 to the open position. For example, a pair of magnets can comprise at least one first magnet 121 disposed on the frame 102 and at least one second magnet 123 disposed on the basket 126 (e.g., on the rear end 126b or on the fabric between adjacent folds 130) that is configured to mate with the at least one first magnet 121. In some examples, the child carriage 100 can comprise a pair of magnets on each side 102e and 102f of the frame 102. Each first magnet 121 can be fixed to one of the first and second linkages 124(1), 124(2), such as to a rear end of one of the first and second linkages 124(1), 124(2).

Infant Car Seat with Push Handle

Turning to FIGS. 10 and 11, a child carrier 200 is shown according to one example. The child carrier 200 can be in infant car seat (also known as an infant carrier). In general, the infant car seat 200 comprises an infant car seat body 202. The body 202 can define a seat shell. The infant car seat body 202 comprises an upper end 202a and a lower end 202b, opposite one another along the vertical direction V. The upper end 202a defines a recess 204 that extends therein towards the lower end 202b and that terminates at a seating surface 206 that is configured to support an infant thereon. The seating surface 206 can comprise a seat back 206a and a seat pan 206b. Note that the underside of the seat pan 206b is shown in FIG. 11. Although not shown, the infant car seat 200 can comprise soft goods disposed within the recess 204 that is configured to provide cushioning to the infant.

The lower end 202b has a bottom surface 208 configured to rest on a vehicle seat pan when the infant car seat 200 is installed in the vehicle. The infant car seat body 202 comprises a first or front end 202c and a second or back end 202d, opposite one another along the longitudinal direction L. The front end 202c is spaced from the back end 202d along a forward direction. The front end 202c is configured to face a seat back of the vehicle seat on which the infant car seat 200 is installed. Conversely, the back end 202d is configured to face away from the seat back of the vehicle seat on which the infant car seat 200 is installed. The child's head is disposed closer to the back end 202d and the child's feet are disposed closer to the front end 202c when the child is seated in the infant car seat body 202. The infant car seat body 202 comprises a first side 202e and a second side 202f, opposite one another along the lateral direction A.

In some examples, the bottom surface 208 can be curved at it extends along the longitudinal direction L such that the infant car seat 200 can be rocked back and forth along the longitudinal direction L when the infant car seat 200 is supported on a floor. For example, the bottom surface 208 can be curved such that, when the infant car seat 200 is disposed on a planar surface, a portion of the bottom surface 208 between the front end 202c and the back end 202d contacts the planar surface, and the bottom surface 208 is spaced from the planar surface at one or both of the front end 202c and the back end 202d. However, it will be understood that the bottom surface 208 need not be curved.

In some examples, the lower end 202b can comprise a first rail 210(1) and a second rail 210(2) that are spaced from one another along the lateral direction A. The first rail 210(1) can be defined at the first side 202e and the second rail 210(2) can be defined at the second side 202f. Each of the first and second rails 210(1) and 210(2) can have an inner surface and an outer surface that are opposite from one another along the lateral direction A. Each of the first and second rails 210(1) and 210(2) can have a length along the longitudinal direction L that is greater than a width of the rail 210(1), 210(2) along the lateral direction A. Thus, each rail 210(1) and 210(2) can be elongate along the longitudinal direction L. The lower end 202b can define a space 212 between the first rail 210(1) and the second rail 210(2). For example, the inner surface of the first rail 210(1) can oppose the inner surface of the second rail 210(2) so as to define the space 212 therebetween. Each rail 210(1), 210(2) can comprise a portion of the bottom surface 208. It will be understood that, in alternative examples, the lower end 208 need not have first and second rails.

The infant car seat 200 can comprise at least one coupler that is configured to couple the infant car seat 200 to the child carriage 100 such that movement of the infant car seat 200 relative to the child carriage 100 is limited along at least one of the vertical direction V, the longitudinal direction L, and the lateral direction A. FIGS. 10 and 11 show one specific example of couplers that can be used to couple the infant car seat 200 to the child carriage 100; however, it will be understood that the infant car seat 200 can be coupled to the child carriage 100 using any other suitable coupler or couplers. In some examples, as shown in FIGS. 10 and 11, the at least one coupler can comprise a first pair of couplers 214(1), 214(2). A first coupler 214(1) of the first pair can be disposed at the first side 202e of the infant car seat 200. A second coupler 214(2) of the first pair can be disposed at the second side 202f of the infant car seat 200. Each of the first and second couplers 214(1), 214(2) can define a protrusion or an opening 216 that is configured to engage another of a protrusion and an opening 118 of the child carriage 100. Each side 202e, 202f and each coupler 214(1), 214(2) can engage a different lateral side of the child carriage 100 so as to limit movement of the child carrier along the lateral direction A. The protrusion or recess 216 of each coupler 214(1), 214(2) can be configured to engage the other of a protrusion and an opening 118 of the child carriage 100 along the lateral direction A so as to limit movement of the infant car seat 200 along the vertical direction V (e.g., along at least one of an upward and downward direction).

FIGS. 10 and 11 show one example in which each coupler 214(1), 214(2) comprises a movable latch that defines a protrusion 216 that extends out from a side of the infant car seat 200. The first coupler 214(1) can comprise a protrusion 216 that extends out from the first side 202e of the infant car seat 200. The protrusion 216 can be movably attached to the car seat body 202 such that the protrusion 216 is configured to retract into the first side 202e of the car seat body 202 and extend out from the first side 202e of the car seat body 202. The protrusion 216 of the first coupler 214(1) can be spring loaded such that it is biased towards the extended position. The first coupler 214(1) can be configured to couple to the first coupler 116(1) of the child carriage 100. For example, the protrusion 216 of the first coupler 214(1) can be configured to be received in the opening 118 of the first coupler 116(1) of the child carriage 100.

The second coupler 214(2) of the first pair can be disposed at the second side 202f of the infant car seat 200. The second coupler 214(2) can comprise a protrusion 216 that extends out from the second side 202f of the infant car seat 200. The protrusion 216 can be movably attached to the car seat body 202 such that the protrusion 216 is configured to retract into the second side 202f of the car seat body 202 and extend out from the second side 202f of the car seat body 202. The protrusion 216 of the second coupler 214(2) can be spring loaded such that it is biased towards the extended position. The second coupler 214(2) can be configured to couple to the second coupler 116(2) of the child carriage 100. For example, the protrusion 216 of the second coupler 214(2) can be configured to be received in the opening 118 of the second coupler 116(2) of the child carriage 100.

The at least one coupler can comprise at least one other coupler, such as a second pair of couplers 218(1), 218(2). Each of the at least one other coupler 218(1), 218(2) can comprise a movable latch 220 that is configured to engage an engagement surface (e.g., 120(1), 120(2)) of the child carriage 100 so as to limit movement of the infant car seat 200 relative to the child carriage 100 along at least one of the vertical direction V and the longitudinal direction L. Each of the at least one other coupler 218(1), 218(2) can be offset from the first pair of couplers 214(1), 214(2) along the longitudinal direction L. For example, each of the at least one other coupler 218(1), 218(2) can be disposed closer to the front end 202c than the first pair of couplers 214(1), 214(2). Each of the at least one other coupler 218(1), 218(2) can be disposed forward of a handle hub 228(1), 228(2) (discussed below). Each of the at least one other coupler

218(1), 218(2) can be disposed at the lower end 202b of the infant car seat 200, such as at an underside of the infant car seat 200.

FIGS. 10 and 11 show one specific example where each movable latch 220 defines a movable hook that engages a corresponding one of the couplers 120(1), 120(2) of the child carriage 100. Each movable latch 220 can be disposed in a recess that extends into the lower end 202b, such as into the bottom surface 208, of the infant car seat 200. It will be understood that, in alternative examples, each movable latch 220 can be defined by a shape other than a hook or can be oriented in another manner. For example, each movable latch 220 could be a movable bar, and each coupler 120(1), 120(2) of the child carriage 100 can define a hook that receives the movable bar. The couplers 218(1), 218(2) can be the same couplers that are used to attach the infant car seat 200 to a car seat base (500 of FIGS. 13A and 13B) to install the infant car seat 200 onto a vehicle seat. In other words, each coupler 218(1), 218(2) can be configured to removably couple to a coupler (508 of FIGS. 13A and 13B) of the car seat base to prevent the infant car seat 200 from being removed from the car seat base (500 of FIGS. 13A and 13B) along an upwards direction. Each of the at least one other coupler 218(1), 218(2) can be configured to engage a coupler (e.g., 508 of FIGS. 13A and 13B) along the downward direction.

Referring briefly to FIGS. 13A and 13B, the car seat base 500 comprises a lower end 502 that is configured to rest on a vehicle seat when the car seat base 500 is installed in a vehicle. The car seat base 500 comprises an upper end 504 that is configured to support the infant car seat 200. In some examples, the car seat base 500 can define at least one recess 506 that extends into the upper end 504 towards the lower end 502. The recess 506 can be configured to receive a lower portion or portions of the infant car seat 200 therein. The car seat base 500 can comprise at least one coupler 508, such as a pair of couplers 508 that are offset from one another along the lateral direction A. Each coupler 508 can be disposed within the at least one recess 506 of the car seat base 500. Each coupler 508 can be configured to couple to one of the couplers 218(1), 218(2) of the infant car seat 200 so as to prevent removal of the infant car seat 200 along the vertical direction V. The couplers 508 can be configured in any suitable manner. In some examples, each coupler 508 can comprise a rod that is configured to be engaged by a hook defined by a respective one of the couplers 218(1), 218(2) of the infant car seat 200.

Referring back to FIGS. 10 and 11, the infant car seat 200 can comprise at least one actuator 224 that is configured to be actuated by a caregiver to transition the couplers 214(1), 214(2) of the infant car seat 200 and/or the couplers 218(1), 218(2) of the infant car seat 200 between an unlocked configuration and a locked configuration. For example, the at least one actuator 224 can be configured to be actuated by a caregiver to release (1) the couplers 214(1), 214(2) of the infant car seat 200 from the couplers 116(1), 116(2) of the child carriage 100, and/or (2) the couplers 218(1), 218(2) of the infant car seat 200 from the couplers 120(1), 120(2) of the child carriage 100. In addition, the at least one actuator 224 can be configured to be actuated by a caregiver to release the couplers 218(1), 218(2) of the infant car seat 200 from the couplers 508 of the base 500. For example, the actuator 224 can be configured to cause the couplers 214(1) and 214(2) of the infant car seat 200 to retract into the seat body 202 when actuated by a caregiver. The actuator 224 can be configured to cause the movable latches 220 of the couplers 218(1), 218(2) to move so as to disengage from the couplers 120(1), 120(2) of the child carriage 100 when actuated by a caregiver. In some examples, the actuator 224 can comprise a handle that is engaged by the caregiver to actuate the actuator 224. In some examples, the actuator 224 can be disposed on an underside of the seat body 202 near the back end 202*d* of the seat body 202. However, it will be understood that the actuator 224 can be disposed at other locations.

With reference to FIGS. 10 to 12B, the infant car seat 200 can comprise a handle 226. The infant car seat handle 226 can be configured to transition between a retracted position (FIG. 12A), wherein the handle 226 can be grasped by a caregiver to carry the infant car seat 200, and an extended position (FIG. 12B), wherein the handle 226 can be used to push the child carriage 100 when the car seat 200 is coupled thereto as illustrated in FIG. 1. Thus, the infant car seat handle 226 can be referred to as a push and carry handle. The handle 226 can have a first side bar 227*a* and a second side bar 227*b* that are spaced from on another along the lateral direction A. The handle 226 can define a space between the first side bar 227*a* and the second side bar 227*b*. The space can have a width that is greater than a width of the car seat body 202. The handle 226 can have a grab bar 227*c* that defines a surface to be grasped by a caregiver to carry and/or push the infant car seat 200. The grab bar 227*c* can extend from the first handle side bar 227*a* to the second handle side bar 227*b*.

The infant car seat 200 can comprise a first handle hub 228(1), and a second handle hub 228(2). The first handle hub 228(1) can be configured to couple the first handle side bar 227*a* of the infant car seat handle 226 to the first side 202*e* of the car seat body 202 such that the handle 226 is selectively rotatable relative to the car seat body 202. Similarly, the second handle hub 228(2) can be configured to couple the second handle side bar 227*b* of the infant car seat handle 226 to the second side 202*f* of the car seat body 100 such that the handle 226 is selectively rotatable relative to the car seat body 202. The infant car seat handle 226 can have a first handle portion 226*a*, a second handle portion 226*b*, and a third handle portion 226*c* that is attached to the first and second handle portions 226*a* and 226*b* such that the third handle portion 226*c* telescopes relative to each of the first and second handle portions 226*a* and 226*b*. The first handle portion 226*a* extends from the first hub 228(1) and defines a portion of the first handle side bar 227*a*. The second handle portion 226*b* extends from the second hub 228(2) and defines a portion of the second handle side bar 227*b*. Each handle portion 226*a* and 226*b* can have a tubular shape. The third handle portion 226*c* can be tubular and have a "U" shape, where the ends of the "U" shape are attached to the first and second handle portions 226*a* and 226*b*. For instance, the ends of the "U" shape can be received in the first and second handle portions 226*a* and 226*b* to translate within the first and second handle portions 226*a* and 226*b*. The bottom of the "U" shape can define the grab bar 227*c*. In some examples, the infant car seat handle 226 can have a grip 226*d* disposed on the third handle portion 226*c* for grasping by a caregiver. The grip 226*d* can be a soft, such as a rubberized, surface.

Turning to FIG. 14, the infant car seat handle 226 can be configured to selectively rotate between a plurality of different positions. For example, the handle 226 can be configured to rotate to a first rotational position (position A) in which the handle 226 is angled upwards and away from the seat body 202 as the handle 226 extends towards the front end 202*c* of the seat body 202. The first rotational position can be oriented to allow the caregiver to use the handle 226 to push the child carriage 100 when the car seat 200 is coupled thereto. The first position can be referred to as an "angled position" or "push position." The handle 226 can be configured to rotate to a second rotational position (position B) in which the handle 226 extends upwards along the vertical direction V. The second rotational position can be oriented to allow the caregiver to use the handle 226 to carry the infant car seat 200. The second rotational position can be referred to as an "upright position" or "carry position." The handle 226 can be configured to rotate to a third rotational position (position C) in which the handle 226 is angled upwards and away from the seat body 202 as the handle 226 extends towards the rear end 202*d* of the seat body 202. The handle 226 can be configured to rotate to a fourth rotational position (position D) in which the handle 226 extends along longitudinal direction L towards the back end 202*d* of the car seat 200. The handle 226 can be configured to rotate to a fifth rotational position (position E) in which the handle 226 extends downwards away from the car seat body 202 as the handle 226 extends towards the back end 202*d* of the car seat 200. It will be understood that, in alternative examples, one or more of the third, fourth, and fifth rotational positions can be omitted.

Now, the operation of the handle 226 will be described. In general, the infant car seat 200 can be configured such that the handle 226 can transition from the retracted position to the extended position when the handle 226 is in the first rotational position (also referred to as the push position or position A), but not when the handle 226 is in one or more other positions. In some examples, the infant car seat 200 can be configured such that the handle 226 can only transition from the retracted position to the extended position when the handle 226 is in the first rotational position (position A). The infant car seat 200 can comprise at least one handle extension stop (e.g., 244 of FIGS. 20 to 22 discussed further below) that is configured to prevent the handle 226 from transitioning from the retracted position to the extended position when the handle 226 is not in the push position. Thus, the infant car seat 200 can be configured such that the handle 226 is prevented from transitioning to the extended position when the handle 226 is in the second, third, fourth, and fifth rotational positions as illustrated in FIG. 14. The infant car seat 200 can comprise at least one handle extension lock (e.g., 246 of FIGS. 23 to 25 discussed further below) that is configured to selectively lock the handle 226 in the extended position and the retracted position, while the handle 226 is in the push position. The handle extension lock can be actuated by a caregiver, while the handle 226 is in the push position, to transition the handle extension lock between a locked position in which the handle 226 is prevented from extending or retracting, and an unlocked position in which the handle 226 is permitted to extend or retract. If a caregiver attempts to actuate the handle extension lock while the handle 226 is not in the push position, the handle extension stop (e.g., 244 of FIGS. 20 to 22) can prevent the handle 226 from extending.

The infant car seat 200 can be configured such that the handle 226 is prevented from rotating while the handle 226 is in the extended position. The infant car seat 200 can comprise at least one handle rotation stop (e.g., 242 of FIGS. 18 and 19 discussed further below) that is configured to prevent the handle 226 from rotating while the handle 226 is in the extended position. Thus, the handle 226 can be prevented from rotating to the second, third, fourth, and fifth rotational positions when the handle 226 is in the extended position as illustrated in FIG. 14. The infant car seat 200 can comprise at least one handle rotation lock (e.g., 230 of FIG.

15 discussed further below) that is configured to be actuated by a caregiver to selectively lock the handle 226 in the different rotational positions, while the handle 226 is in the retracted position. The handle rotation lock can be moved between a locked position, wherein the handle 226 is prevented from being rotated from a select one of the rotational positions, and an unlocked position, wherein the handle 226 is permitted to rotate to another one of the rotational positions. If the caregiver attempts to actuate the handle rotation lock while the handle 226 is in the extended position, the handle rotation stop (e.g., 242 of FIGS. 18 and 19) can prevent the handle 226 from rotating.

Turning now more specifically to FIGS. 15 to 17, one example of a rotation lock 230 is shown that is implemented within one of the handle hubs 228(2). It will be understood that another rotation lock 230 could also be implemented within the other one of the handle hubs 228(1). Further, it will be understood that the rotation lock 230 could be implemented in another suitable manner. The rotation lock 230 comprises a locking plate 234 that defines the plurality of rotational positions of the handle 226. For example, the locking plate 234 can have a surface that defines a slot 236 therein. The slot 236 can have a circular or partially circular portion 236a and a plurality of grooves 236b that are open to the circular or partially-circular portion 236a and that are circumferentially spaced from one another along a length of the slot 236. Each groove 236b can correspond to a different rotational position (e.g., positions A to E) of the handle 226. The rotation lock 230 can comprises a rotation latch 238 with a projection 238a, such as a pin, extending therefrom into the slot 236. The projection 238a can be configured to be selectively received in the grooves 236b to lock the handle 226 in the different rotational positions.

In an alternative example (not shown), the rotation latch 238 can define at least one recess, and the locking plate 234 can define a plurality of projections spaced circumferentially from one another. The at least one recess of the rotation latch 238 can be configured to selectively receive the projections so as to selectively lock the handle 226 in the plurality of rotational positions. Thus, it can be said that the locking plate can define a plurality of grooves or projections, and the rotation latch can define at least one projection or groove that is configured to selectively engage the grooves or projections to selectively lock the handle in the different rotational positions.

The rotation latch 238 is configured to be transitioned between a locked position (FIG. 16) in which the rotation latch 238 engages the locking plate 234 (e.g., the projection 238a is received in one of the grooves 236b corresponding to one of the rotational positions), and an unlocked position (FIG. 17) wherein the rotation latch 238 disengages the locking plate 234 (e.g., the projection 238a is moved out from one of the grooves 236b into the circular or partially circular portion 236a of the slot 236). The rotation latch 238 can be configured to translate along an axis of a respective one of the first and second handle portions 226a, 226b so that the rotation latch 238 disengages the locking plate 234 (e.g., the projection 236a can be removed from the one of the grooves 236), thereby allowing the handle 226 to rotate. The handle 226 can then be rotated to another rotational position. The rotation latch 238 (and projection 238a) are rotationally fixed to the handle 226 such that rotation of the handle 226 causes the rotation latch 238 (and projection 238a) to rotate correspondingly relative to the locking plate 234. Both the handle 226 and the rotation latch 238 can be configured to rotate about a pivot 240. The pivot 240 can define a pivot axis that extends along the lateral direction A. The rotation latch 238 can define a slot 238b that receives the pivot 240 such that the pivot 240 translates within the slot 238b as the rotation latch 238 transitions between the locked position and the unlocked position. When the handle 226 is rotated to another rotational position, the rotation latch 238 (and projection 238a) can be moved to the locked position in which the rotation latch 238 engages the locking plate 234 (e.g., the projection 238a is received in the groove 236b corresponding to the other rotational position). The rotation latch 238 can be spring biased towards the locked position such that the rotation latch 238 engages the locking plate 234 (e.g., the projection 238a of the rotation latch 238 moves into one of the grooves 236b) when the rotation actuator 232 is released.

The infant car seat 200 can comprise a rotation actuator 232 that is configured to be actuated by a caregiver to move the at least one rotational lock 230 from a locked position (FIG. 16) in which the handle 226 is prevented from rotating, to an unlocked position (FIG. 17) in which the handle 226 is permitted to rotate. The rotation actuator 232 comprises a movable body 235 that defines an engagement surface 235a (shown in FIG. 15) that is configured to be engaged by a caregiver to actuate the rotation actuator 232. In one example, the movable body 234 can be shaped as a handle that is disposed around one of the first and second handle portions 226a, 226b and configured to translate along the lower handle portion 226a. The movable body 235 can have a tubular or other suitable shape, such as a collar, and the engagement surface 235a can be the outer surface of the rotation actuator. The rotation actuator 232 can comprise a wire or cable 236 that extends from the movable body 235 to the rotation latch 238. Movement of the movable body 235 along a select direction Ds away from the hub 228(2) causes a corresponding movement of the wire or cable 236 along the select direction Ds, which causes a corresponding movement of the rotation latch 238 along the select direction Ds to disengage the rotation latch 238 from the locking plate 234 (e.g., to move the projection 238a out of one of the grooves 236b of the locking plate 234). It will be understood that, in alternative examples, the rotation actuator 232 can be configured in another suitable manner. For example, the movable body 235 can be implemented as a push button, rather than a handle. As another example, the movable body 235 could be located in another position, such as at the bottom of the "U" shape of the third handle portion 226c (i.e., on the grab bar 227c) or on one of the handle hubs 228(1), 228(2).

With reference to FIGS. 18 and 19, the rotation stop 242 is configured to prevent rotation of the handle 226 when the handle 226 is in the extended position. Note that the rotation stop 242 is hidden in FIGS. 15 to 17 to make the rotation latch 238 more clearly visible. The rotation stop 242 can be configured to move between (i) a blocking position (FIG. 19), wherein the stop 242 interferes with the rotation latch 238 to prevent the rotation latch 238 from being moved to the unlocked position (thereby preventing the handle 226 from being rotated), and (ii) a released position (FIG. 18), wherein the interference between the stop 242 and the rotation latch 238 is removed such that the rotation latch 238 is permitted to be moved to the unlocked position (thereby allowing the handle 226 to be rotated). FIGS. 18 and 19 show one example of a rotation stop 242; however, it will be understood that the rotation stop 242 can be implemented in any other suitable manner.

The rotation stop 242 can have a first engagement surface 242a that is configured to engage the rotation latch 238 when in the blocking position to interfere with the rotation latch

238. The rotation stop 242 can have a second engagement surface 242*b* that is configured to be engaged by the third handle portion 226*c* so as to move the rotation stop 242 into the released position. In particular, the third handle portion 226*c* can telescope relative to the first and second handle portions 226*a* and 226*b* between an extended position and a retracted position as discussed above. As shown in FIG. 18, when the third handle portion 226*c* is in the retracted position, the third handle portion 226*c* can engage the second engagement surface 242*b* to thereby move the rotation stop 242 to the released position. Further, as shown in FIG. 19, when the third handle portion 226*c* is in the extended position, the third handle portion 226*c* can be spaced from the second engagement surface 242*b*, thereby allowing the rotation stop 242 to move to the blocking position. The rotation stop 242 can be spring biased towards the blocking position. The rotation stop 242 can be configured to rotate about the pivot 240.

Turning to FIGS. 20 to 22, the handle extension stop 244 is configured to prevent extension of the handle 226 when the handle 226 is not in the push position (i.e., not in position A of FIG. 14). The handle extension stop 244 can be configured to move between a released position (FIGS. 20 and 21) and a blocking position (FIG. 22). For example, the handle extension stop 244 can be configured to rotate about a rotation axis between the released position and the blocking position. The handle extension stop 244, and the rotation axis, can be disposed within a respective one of the handle hubs 228(1), 228(2). In the blocking position, the handle 226 is in a position other than the push position, and the handle extension stop 244 prevents the handle 226 from moving to the extended position. For example, the handle extension stop 244 can comprise a protrusion 244*a* that extends through an opening in one of the first and second handle portions 226*a*, 226*b* and into the third handle portion 226*c* while the handle extension stop 244 is in the blocking position (FIG. 22). The protrusion 244*a* blocks the third handle portion 226*c* from extending. The protrusion 244*a* can be disposed within a respective one of the first and second handle hubs 228(1), 228(2). The handle extension stop 244 is moved to the released position (FIGS. 20 and 21) by rotating the handle 226 to the push position. In the released position, the protrusion 244*a* is removed from the third handle portion 226*c* such that the handle 226 is permitted to extend. The handle extension stop 244 can be spring biased towards the unlocked position. While the handle extension stop 244 is in the released position, the handle 226 is permitted to move from the retracted position to the extended position when the handle extension lock 246 (discussed below) is in an unlocked position. The handle extension stop 244 can be configured to prevent extension of the handle 226 while the handle 226 is in the carry position (position B), regardless of whether the handle extension lock 246 is in the locked or unlocked position.

The handle extension stop 244 can have a first side that defines the protrusion 244*a*, and a second side 244*b* opposite the first side 244*a*. The handle extension stop 244 can be configured such that, as the handle 226 is rotated, the second side 244*b* of the handle extension stop 244 rides along an inner surface of a corresponding one of the handle hubs 228(1), 228(2). The inner surface obstructs outward rotation of the handle extension stop 244, thereby keeping the handle extension stop 244 in the blocking position. When the handle 226 is rotated to a select position (e.g., the push position shown in FIGS. 20 and 21), the second side 244*b* of the handle extension stop 244 aligns with an opening 245 in the inner surface, allowing the handle extension stop 244 to rotate outwards, at least partially through the opening, to the released position. Note that the handle extension stop 244 can be disposed entirely within a housing of a corresponding one of the handle hubs 228(1), 228(2), and that the outer portion of the housing is hidden in FIG. 20 so that the inside of the handle hub is visible.

Turning to FIGS. 23 to 25, the handle extension lock 246 is configured to selectively lock the handle 226 in the retracted and extended positions. The handle extension lock 246 can be implemented in one of the first and second handle portions 226*a*, 226*b*. It will be understood that another handle extension lock 246 could also be implemented within the other one of the first and second handle portions 226*a*, 226*b*. Further, although FIGS. 23 to 25 show one exemplary handle extension lock 246, it will be understood that the handle extension lock 246 could be implemented in another suitable manner.

The handle extension lock 246 can comprise a handle extension latch 248 configured to move between a locked position (FIG. 25) and an unlocked position. In the locked position, the latch 248 prevents the handle 226 from transitioning between the extended position and the retracted position. In the unlocked position, the handle 226 is permitted to transition between the extended position and the retracted position when the handle 226 is in the first rotational position (i.e., when the handle extension stop 244 is in the released position). When the handle extension stop 244 is in the blocked position, the handle 226 cannot extend, regardless of whether the handle extension lock 246 is in the locked or unlocked position.

The handle extension latch 248 can comprise a protrusion 248*a* that is configured to move between the locked position and the unlocked position. The protrusion 248*a* can move along a direction that is angularly offset from, such as perpendicular to, the axis $A_H$ of the handle 226. In the locked position, the protrusion 248*a* extends into an opening in one of the first and second handle portions 226*a*, 226*b* and into an opening in the third handle portion 226*c* such that the protrusion 248*a* blocks the third handle portion 226*c* from extending. Note that, in some examples, the handle portions 226*a*, 226*b* can comprise a plurality of openings that are offset from one another along their respective axes, and each opening can correspond to a different extended position. In the unlocked position, the protrusion 248*a* is removed from the opening in the third handle portion 226*c*, thereby allowing the third handle portion 226*c* to extend or retract.

The handle extension lock 246 can comprise a latch guide 250 that is configured to guide movement of the latch 248 between the locked and unlocked positions. The latch guide 250 can be configured to translate along a select direction $D_s$ along an axis $A_H$ of the handle 226 towards and away from a respective one of the hubs 228(1), 228(2). The latch guide 250 can include a guide surface that guides a corresponding surface of the latch 248. For example, the latch guide 250 can include a slot 250*a* that is angularly offset from the select direction $D_s$, and the latch 248 can include a pin 248*b* that is received in the slot 250*a*. When the latch guide 250 is moved along the select direction away from the respective one of the hubs 228(1), 228(2), the pin 248*b* translates along the slot 250*a*, thereby causing the protrusion 248*a* to move out of the opening in the one of the first and second handle portions 226*a*, 226*b* and out of the third handle portion 226*c* (i.e., causing the latch 248 to move to the unlocked position). When the latch guide 250 is moved along the select direction towards the respective one of the hubs 228(1), 228(2), the pin 248*b* translates along the slot 250*a*, thereby causing the protrusion 248*a* to move into the opening in the one of the first and second handle portions 226a, 226b and into the third handle portion 226c (i.e., causing the latch 248 to move to the locked position).

The infant car seat 200 can comprise a handle extension actuator 252 (labeled in FIG. 24) that is configured to be engaged by a caregiver to move the handle extension latch 248 between the locked and unlocked positions. The handle extension actuator 252 comprises a movable body 254 having an engagement surface 254a that is configured to be engaged by a caregiver to actuate the handle extension actuator 252. In one example, the movable body 254 defines a push button that defines the engagement surface 254a. The push button can actuated by depressing the push button into the handle 226 along an actuation direction $D_A$, such as into the third handle portion 226c or other handle portion.

The handle extension actuator 252 can comprise a link 258, such as a wire or cable, that extends from the movable body 254 to the handle extension lock 246. The handle extension actuator 252 can be configured such that movement of the movable body 254 by the caregiver causes the link 258 to correspondingly move, which causes the handle actuation lock 246 to transition between the locked and unlocked positions. The handle extension actuator 252 can be configured to convert the translational movement of the movable body 254 into the handle 226 along the action direction $D_A$ to translational movement of the link 258 along the handle 226. For example, an inner side of the movable body 254 can define at least one ramped surface 254b, and the handle extension actuator 252 can comprise at least one wedge 256 having at least one ramped surface 256a that engages the at least one ramped surface 254b of the movable body 254. The handle extension actuator 252 can be configured such that, when the movable body 254 is depressed by a caregiver, the at least one ramped surface 254b of the movable body 254 translates along the at least one ramped surface of the at least one wedge 256, thereby causing the at least one wedge 256 to move along a direction that is perpendicular to the action direction $D_A$. This, in turn, causes the link 258 to move along the handle 226 to move the handle actuation lock 246. It will be understood that, in other examples, the handle extension actuator 252 can be implemented in another suitable manner. For example, the handle extension actuator 252 can be implemented as a handle instead of a button, and/or can be implemented in another location such as along one of the first and second handle portions 226a, 226b.

Bassinet or Carrycot with Push Handle

Although not shown, according to some examples, the child carrier can be a bassinet or carrycot. The bassinet or carrycot can have a body and/or frame as is known in the art. The bassinet or carrycot can have a handle that is configured as discussed above in relation to the infant car seat 200, such that the handle operates in the manner described above in relation to the handle 226 of the infant car seat 200. Further, the bassinet or carrycot can comprise couplers similar to couplers 214(1) and 214(2), and optionally, couplers that are similar to couplers 218(1) and 218(2). It will be understood that the descriptions of couplers 214(1), 214(2), 218(1), and 218(2) above can apply equally to the bassinet or carrycot.

Travel Organizer

Turning now to FIGS. 29 to 33, the travel system 10 can optionally comprise a travel organizer 300 that can be configured to hold at least one item such as a beverage container, a mobile device, or other items for the caregiver. The organizer 300 can be configured to removably couple to the handle 226 of the child carrier (e.g., 200, 400). For instance, the organizer 300 can be configured to couple to the handle 226 in the space between the first handle side bar 227a and the second handle side bar 227b, and between the grab bar 227c and the seat of the child carrier. It will be understood that the organizer 300 can be configured to couple to any suitable handle of any suitable child carrier (e.g., any infant car seat, toddler seat, bassinet, or carrycot).

The organizer 300 can have a first organizer side 300a and a second organizer side 300b that are offset from one another along the lateral direction A. In some examples, the organizer 300 can have a length along the lateral direction A that is greater than a width of the organizer 300 along the longitudinal direction L and/or a height of the organizer 300 along the vertical direction V.

The organizer 300 can comprise a tray 302 and a storage container 304 that is coupled to and disposed below the tray 302. The tray 302 can be formed from a suitably rigid material such as a polymer or other suitable material. The tray 302 can have a tray upper end 302a that defines an upper surface, and a tray lower end 302b spaced from the tray upper end 302a along the vertical direction V. The tray 302 can define at least one tray opening, such as a plurality of tray openings, that extends into the tray upper end 302a towards the tray lower end 302b. For example, the tray 302 can define a circular tray opening 302c that extends into the tray upper end 302a. The circular tray opening 302c can be sized and shaped to receive a beverage container, such as a can, bottle, or cup, therein. As another example, the tray 302 can additionally, or alternatively, define a tray opening 302d that defines a recess that extends into the tray upper end 302a and is closed at a bottom of the tray opening 302d. As yet another example, the tray 302 can additionally, or alternatively, define a tray opening 302e that defines a through hole that extends entirely through the tray 302 (i.e., through the tray upper end 302a and the tray lower end 302b) such that the tray opening 302e is open to the storage container 304 below the tray 302. In some examples, the tray 302 can comprise a lid 306 that closes to cover at least one of the tray openings and opens to give a caregiver access to the contents of the at least one of the tray openings.

The storage container 304 can have a container upper end 304a, and a container lower end 304b that is spaced from the container upper end 304a along the vertical direction V. The container upper end 304a can define at least one container opening 304c that extends therein and terminates before the container lower end 304b such that a bottom of the at least one container opening 304c is closed. The at least one container opening 304c can be aligned along the vertical direction with at least one of the openings of the tray 302. For example, the at least one container opening 304c can be aligned with the tray opening 302e such that items can be placed through the tray opening 302e into the at least one container opening 304c. In some examples, the at least one tray opening 302e can be aligned with all of the tray openings along the vertical direction.

In some examples, the tray 302 and the storage container 304 can each have a cross-sectional shape in a plane that is perpendicular to the vertical direction, wherein the cross-sectionals shapes of the tray 302 and storage container 304 conform to one another and/or match one another. In alternative examples, the tray 302 can have a cross-sectional shape that is larger than that of the storage container 304 is disposed below only a portion of the tray 302. When the tray 302 is coupled to the storage container 304, the tray 302 can act as a top for the storage container 304.

Turning briefly to FIGS. 34 and 35, in some examples, the organizer 300 can be configured to transition between a compact configuration (FIG. 34) and an expanded configuration (FIG. 35). In particular, the tray 302 can be movably coupled to the storage container 304 such that a vertical distance between the tray 302 and the storage container 304 can be selectively increased and decreased. In other words, the organizer 300 can be transitioned from the compact configuration to the expanded configuration by increasing a distance between the tray 302 and the storage container 304, and transitioned from the expanded configuration to the compact configuration by decreasing a distance between the tray 302 and the storage container 304. When the organizer 300 is in the compact configuration, the tray 302 and storage container 304 can be in contact with one another. The organizer 300 has a greater internal storage volume when the organizer 300 is in the expanded configuration than when the organizer 300 is in the compact configuration.

The organizer 300 can comprise a flexible material 308 that is coupled to the tray 302 and the storage container 304. The flexible material 308 can be a fabric, such as a mesh fabric, or any other suitable material. In one example, the storage container 304 can be formed of a semi-rigid material, such as an Ethylene-Vinyl Acetate (EVA), that is less rigid than the tray 302 but more rigid than the flexible material 308, and the flexible material 308 can be a fabric that is thermoformed to storage container 304. The flexible material 308 can have a tubular shape that defines an upper end 308a and a lower end 308b that are offset from one another along the vertical direction V. The flexible material 308 can define a receiving space that extends from the upper end 308a to the lower end 308b. The upper end 308a can be coupled to the tray 302, such as the lower end 302b of the tray 302. The lower end 308b can be coupled to the storage container 304, such as to the upper end 304a of the storage container 304. Alternatively, the lower end 308b can wrap around the lower end 304b of the storage container 304.

When the organizer 300 is in the expanded configuration, the flexible material 308 can define sides of the organizer 300 to container items within receiving space. When the organizer 300 is in the compact configuration, the flexible material 308 can be folded inside of the organizer 300. Although not shown, in some examples, the flexible material 308 can define an access opening in a side thereof, between the open upper and lower ends 308a and 308b to provide access to a caregiver to the receiving space in the flexible material 308. Additionally, or alternatively, the caregiver can access the receiving space through the opening 203e that defines the through hole that extends through the tray 302.

The organizer 300 can comprise a fastener 310 that is configured to selectively fix the organizer 300 in the compact configuration. For example, the fastener 310 can comprise a zipper having a first tape portion 310a having a first plurality of teeth, and a second tape portion 310b having a second plurality of teeth, configured to mate with the first plurality of teeth. The tray 302 can include the first tape portion 310a, which can be attached to a body of the tray 302, such as the lower end 302b of the tray 302. The storage container 304 can include the second tape portion 310b, which can be attached to a body of the storage container 304, such as the upper end 304a of the storage container 304. It will be understood that, in alternative examples, the organizer 300 can be implemented with a fastener 310 other than a zipper, such as snaps, buttons, toggle latch, or any other suitable fastener that capable of fixing the organizer 300 in the compact configuration.

Referring back to FIGS. 31 and 32, as discussed above, the organizer 300 can be configured to removably attach to the handle 226 of the infant car seat 200. The organizer 300 can define a first coupler 312(1) at the first organizer side 300a that is configured to engage a first coupler 229 (See FIG. 26) of the first handle side bar 227a of the handle 226 to couple the first organizer side 300a to the first handle side bar 227a. The first coupler 312(1) of the organizer 300 can define at least one of a protrusion and an opening, and the first coupler of the handle 226 can define another of a protrusion and an opening that is configured to mate with the first coupler 312(1). Similarly, the organizer 300 can define a second coupler 312(2) at the second organizer side 300b that is configured to engage a second coupler 229 of the second handle side bar 227b of the handle 226 to couple the second organizer side 300b to the second handle side bar 227b. The second coupler 312(2) of the organizer 300 can define at least one of a protrusion and an opening, and the second coupler of the handle 226 can define another of a protrusion and an opening that is configured to mate with the second coupler 312(2).

FIGS. 31 and 32 show one specific example, where each of the first and second couplers 312(1) of the organizer 300 define protrusions, and couplers 229 of the car seat handle 226 define openings that receive the protrusions. The first and second couplers 312(1) and 312(2) are attached to the tray 302; however, in alternative examples, the couplers could be attached to another part of the organizer 300. The protrusion of one of the couplers, such as the protrusion of the first coupler 312(1), can be positionally fixed such that it does not retract into the organizer 300. Additionally, or alternatively, the protrusion of another one of the couplers, such as the protrusion of the second coupler 312(2), can be configured to selectively extend out from the organizer 300 (FIG. 32) and retract into the organizer 300 (FIG. 33). In such examples, the protrusion of the second coupler 312(2) can be spring biased to extend out from the organizer 300. The organizer 300 can optionally include an actuator 314 that is configured to be engaged by a caregiver to transition the protrusion of the first coupler 312(1) between an extended position (FIG. 32) and a retracted position (FIG. 33).

Turning now to FIGS. 24 and 26 to 28, in some examples, the infant car seat 200 can be configured such that the organizer 300 can only be installed when the handle 226 is in the extended position. Additionally, or alternatively, in some examples, the infant car seat 200 can be configured such that the handle 226 cannot be retracted while the organizer 300 is coupled thereto. For example, the handle 226 of the infant car seat 200 can comprise at least one organizer latch 260 that is configured to transition between a blocked position (FIG. 26), wherein the organizer 300 is prevented from being attached to the coupler or couplers 229 of the car seat handle 226, and an unblocked position (e.g., FIG. 27), wherein the organizer 300 is permitted to attach to the coupler or couplers 229 of the car seat handle 226.

Each organizer latch 260 can be implemented in one of the handle side bars 227a, 227b. In some examples, each handle side bar 227a, 227b can comprise an organizer latch 260. FIGS. 26 and 27 show one specific example of an organizer latch 260; however, it will be understood that the organizer latch 260 can be implemented in any other suitable manner. The organizer latch 260 can define an opening 260a therein. The organizer latch 260 can be configured such that, when the organizer latch 260 is in the unblocked position (FIG. 27), the opening 260a of the organizer latch 260 is substantially aligned with the opening defined by the handle coupler 229. As such, one of the couplers 312(1), 312(2) of the organizer 300 can be received through the opening 229 of the handle 226 and into the opening 260a of the organizer latch 260. This is illustrated in FIG. 28. In some examples, the organizer latch 260 can be coupled to the link 258 of the handle extension actuator 252 such that, when the caregiver actuates the handle extension actuator 252, the organizer latch 260 moves from the unlocked position (FIG. 27) to the blocked position (FIG. 26). Referring to FIG. 28, when the organizer 300 is attached to the car seat handle 226, a respective one of the couplers 312(1), 312(2) interferes with movement of the organizer latch 260, thereby preventing the caregiver from actuating the handle extension actuator 252. Thus, the handle 226 is prevented from being moved from the extended position to the retracted position while the organizer 300 is coupled to the handle 226. Conversely, while the handle extension actuator 252 is actuated by the caregiver, the organizer latch 260 is in the blocked position, thereby preventing the organizer 300 from being installed.

The infant car seat handle 226 can be configured such that, when the infant car seat handle 226 is in the retracted position, each organizer coupler 229 of the handle 226 is covered by one of the first and second handle portions 226*a*, 226*b*. In other words, in the retracted position, each organizer coupler 229 can retract into one of the first and second handle portions 226*a*, 226*b* such that the organizer 300 cannot be coupled to the organizer coupler 229.

Although FIGS. 24 and 26 to 28 show an example, where each organizer coupler 229 of the infant car seat handle 226 defines an opening configured to receive a protrusion of a coupler 312(1), 312(2) of the organizer 300, examples of the disclosure are not so limited. In alternative examples, each organizer coupler 229 of the infant car seat handle 226 can comprise a protrusion (not shown) that extends inward from the handle 226, and each coupler 312(1), 312(2) of the organizer 300 comprises an opening configured to receive a corresponding one of the protrusions. In some such examples, the protrusions of each organizer coupler 229 can be configured to retract into the handle 226 when the handle 226 is in the retracted position, thereby preventing the organizer 300 from being attached to the coupler 229. Further, when the organizer 300 is attached to each organizer coupler 229 of the handle 226, each coupler 229 can interfere with a respective one of the couplers 312(1), 312(2) of the organizer 300 to thereby prevent the respective one of the couplers 312(1), 312(2) from being retracted into the handle 226. It will be understood that the handle 226 discussed above could alternatively be implemented on a child carrier other than an infant car seat, such as on the toddler seat 400 or on a bassinet or carrycot. Therefore, the description above can equally apply to the toddler seat 400 or a bassinet or carrycot.

Toddler Seat with Push Handle

Turning to FIGS. 36A to 37B, the travel system 10 is shown with the child carriage 100 of FIGS. 3 and 4 and a removable child carrier 400 that is a toddler seat. The toddler seat 400 comprises a seat frame 402 and a push handle 404 attached to the seat frame 402. The seat frame 402 can be a tubular frame that is formed from one or more tubes. The seat frame 402 comprises a first side rail 406 and a second side rail 408 that are spaced from one another along the lateral direction A so as to define an opening or space 410 therebetween in which the child is positioned when seated in the toddler seat. The toddler seat 400 can comprise soft goods 416 disposed within the space 410 that is configured to provide a seating surface 416*a* and cushioning to the toddler. The soft goods 416 can define a seat pan 416*b* and a seatback 416*c*. The soft goods 416 can define a pair of sidewalls 416*d* that are spaced from one another. The seat pan 416*b* and seatback 416*c* can extend between the sidewalls 416*d*. In an alternative example (not shown), the toddler seat 400 can comprise a plastic body that defines the seating surface 416*a*, including the seat pan 416*b* and the seatback 416*c*.

The first side rail 406 has a first rail end 406*a* and a second rail end 406*b* that are spaced from one another along a first direction $D_1$. The first side rail 406 can be elongate along the first direction $D_1$. Similarly, the second side rail 408 has a first rail end 408*a* and a second rail end 408*b* that are spaced from one another along the first direction $D_1$. The second side rail 406 can be elongate along the first direction $D_1$. The seat frame 402 can comprise a foot rail 412 that extends between the first and second side rails 406 and 408. For example, the foot rail 412 can extend from the second rail end 406*b* of the first side rail 406 to the second rail end 408*b* of the second side rail 408. The foot rail 412 can extend along a second direction $D_2$, perpendicular to the first direction $D_1$. In some examples, the second direction $D_2$ can be aligned with the lateral direction A. The foot rail 412 can be elongate along the second direction $D_2$. Thus, the first side rail 406, the second side rail 408, and the foot rail 412 can together define a "U" shape. The first side rail 406, the second side rail 408, and the foot rail 412 can be separate parts that are coupled to one another or can be portions of a continuous tube that is bent to define the shape of the seat frame 402.

The push handle 404 is configured to be grasped by a caregiver to push the travel system 10 when the toddler seat 400 is attached to the child carriage 100. For example, the push handle 404 can extend above the seat frame 402 so as to be accessible to the caregiver. The toddler seat 400 is configured such that removal of the toddler seat 400 from the child carriage 100 causes the handle 400 to be removed with the toddler seat 400 from the child carriage 100.

The push handle 404 can be configured to transition between an extended position and a retracted position. In some examples, the push handle 404 can be configured to transition to one or more intermediate positions between the extended position and the retracted position. The push handle 404 can extend further above the seat frame 402 when in the extended position than in the retracted position. In one example, the push handle 404 can be attached to the seat frame 402 such that the handle 404 telescopes relative to the seat frame 402. For example, the handle 404 can comprise a first handle portion 404*a* and a second handle portion 404*b*. The first handle portion 404*a* can telescope relative to the first side rail 406, and the second handle portion 404*b* can telescope relative to the second side rail 408. The first and second handle portions 404*a* and 404*b* can be offset from one another along the lateral direction A. The handle 404 can optionally comprise a third handle portion 404*c* that extends between the first and second handle portions 404*a* and 404*b*. In an alternative example (not shown), the push handle can be pivotably attached to the seat frame at a pivot point such that the handle rotates towards and away from the seat frame along a pivot axis, where the pivot axis can extend along, for example, the second direction $D_2$.

Referring to FIG. 38, the toddler seat 400 can comprise at least one handle extension lock 420 that is configured to selectively lock the handle 404 in the extended position and the retracted position. The at least one handle extension lock 420 is configured to selectively lock the handle 404 in the retracted and extended positions. Each handle extension lock 420 can be implemented in one of the first and second handle portions 404*a* and 404*b*. The handle extension lock 420 can comprise a handle extension latch 422 configured to move between a locked position (FIG. 38) and an unlocked position. In the locked position, the latch 422 prevents the handle 404 from transitioning between the extended position and the retracted position. In the unlocked position, the handle 404 is permitted to transition between the extended position and the retracted position. For example, the handle extension latch 422 can define a protrusion 422a that is configured to move between the locked position and the unlocked position. The handle extension latch 422 can move along a direction that is angularly offset from, such as perpendicular to, the axis A$_H$ of the first or second handle portion 404a or 404b. In the locked position, the protrusion 422a of the handle extension latch 420a extends into an opening 409 in one of the first and second side rails 406 and 408 such that the protrusion 422a blocks the handle 404 from extending. The one of the first and second siderails 406 and 408 can comprise a plurality of openings 409 that are offset from one another along the axis A$_H$, each corresponding to a different position of the handle 404. In the unlocked position, the protrusion 422a of the handle extension latch 422 is removed from the opening 409 in the one of the first and second side rails 406 and 408, thereby allowing the handle 404 to extend or retract.

The handle extension lock 420 can comprise a latch guide 424 that is configured to guide movement of the latch 420 between the locked and unlocked positions. The latch guide 424 can be configured to translate along a select direction D$_s$ along an axis A$_H$ of the handle 404. The latch guide 424 can include a guide surface that guides a corresponding surface of the latch 422. For example, the latch guide 424 can include a slot 424a that is angularly offset from the select direction D$_s$, and the latch 422 can include a pin 422b that is received in the slot 424a. When the latch guide 424 is moved upwards along the select direction D$_s$, the pin 422b translates along the slot 424a, thereby causing the protrusion 422a to move out of the opening 409 in the one of the first and second siderails 406 and 408. When the latch guide 424 is moved downwards along the select direction D$_s$, the pin 422b translates along the slot 424a, thereby causing the protrusion 422a to move into one of the openings 409 in the one of the first and second siderails 406 and 408.

The toddler seat 400 can comprise a handle extension actuator 426 (labeled in FIG. 36A) that is configured to be engaged by a caregiver to move the handle extension lock 420 between the locked and unlocked positions. The handle extension actuator 426 can be implemented in any suitable manner. The handle extension actuator 426 comprises a movable body having an engagement surface that is configured to be engaged by a caregiver to actuate the handle extension actuator 426. In one example, the movable body defines a push button that defines the engagement surface. The push button can be actuated by depressing the push button into the handle 404.

With continued reference to FIG. 38, the handle extension actuator 426 can comprise a link 428, such as a wire, cable, or band, that extends from the movable body of the actuator 426 to the handle extension lock 420. The handle extension actuator 426 can be configured such that movement of the movable body by the caregiver causes the link 428 to correspondingly move, which causes the handle actuation lock 420 to transition between the locked and unlocked positions. The handle extension actuator 426 can be configured to convert the translational movement of the movable body of the actuator 426 into translational movement of the link 428 along the axis A$_H$. It will be understood that, in other examples, the handle extension actuator 426 can be implemented in another suitable manner. For example, the handle extension actuator 426 can be implemented as a pull handle instead of a button, or as a collar that translates along a portion of the handle 404. The handle extension actuator 426 can also be implemented in a location other than that shown.

Referring back to FIGS. 36A to 37B, the toddler seat 400 can be configured to transition between an expanded configuration (FIG. 37A) and a folded configuration (FIG. 37B). The frame 402 can comprise an upper frame end 402a and a lower frame end 402b, where the upper frame end 402a is disposed closer to a child's head and the lower frame end 402b is disposed closer to the child's feet when the child is seated in the toddler seat 400. The toddler seat 400 is configured to be transitioned from the expanded configuration to the folded configuration by rotating the upper frame end 402a towards the lower frame end 402b, and from the folded configuration to the expanded configuration by rotating the upper frame end 402a away from the lower frame end 402b. When in the folded configuration, the upper frame end 402a can be substantially parallel to the lower frame end 402b. The frame 402 can comprise a pair of fold hubs 418(1), 418(2) that pivotably connect the upper frame end 402a and the lower frame end 402b to one another. The first fold hub 418(1) can be attached to the first side rail 406 between the first and second rail ends 406a and 406b of the first side rail 406. Similarly, the second fold hub 418(2) can be attached to the second side rail 408 between the first and second rail ends 408a and 408b of the second side rail 408. The toddler seat 400 can be configured to remain affixed to the carriage 100 when the toddler seat is in the folded configuration and the carriage 100 is in the first folded configuration as shown in FIG. 37B. As shown, when both the toddler seat 400 and carriage 100 are folded, the couplers 116(1), 116(2) can be rotated forwards so that the upper frame end 402a of the toddler seat 400, the lower frame end 402b of the toddler seat 400, and the front legs 108(1), 108(2) of the carriage 100 can be substantially parallel to one another.

Turning to FIGS. 39A to 39C, the toddler seat 400 can comprise at least one fold latch 430 that is configured to releasably lock the child carriage 100 in the expanded position. Each fold latch 430 can be disposed in one of the fold hubs 418(1), 418(2). Each fold latch 430 can be implemented in any suitable manner. FIGS. 39A to 39C show an example of the first fold hub 418(1). The second fold hub 418(2) could be implemented in a similar manner. However, it will be understood that the fold hub 418(1) and fold latch 430 can be implemented in another suitable manner. The toddler seat 400 can comprise a fold actuator 432 (labeled in FIG. 36B) that is configured to actuate the at least one fold latch 430 to move the at least one fold latch 430 between an unlocked position, wherein the toddler seat 400 is permitted to be folded, and a locked position, wherein the toddler seat 400 is prevented from being folded. The actuator 432 can be any suitable actuator.

In general, each fold hub 418(1), 418(2) has a lower end plate 434 and an upper end plate 436 that are pivotably coupled to one another. The upper end plate 436 is positionally fixed to the upper frame end 402a of the seat frame 402 such that rotation of the upper frame end 402a causes a corresponding rotation of the upper end plate 436. The lower end plate 434 is positionally fixed to the lower frame end 402b of the seat frame 402 such that rotation of the lower frame end 402b causes a corresponding rotation of the lower end plate 434. The upper end plate 436 and the lower end plate 434 can be aligned with one another along a fold pivot axis A$_F$. The fold latch 430 can be rotationally fixed relative to one of the upper end plate 436 and the lower end plate 434, and can be configured to releasably engage the other of upper end plate 436 and the lower end plate 434 so as to rotationally lock the upper frame end 402a and the lower frame end 402b relative to one another.

For instance, FIGS. 39A to 39C shows one specific example in which the fold latch 430 is rotationally fixed relative to the upper end plate 436, and is configured to releasably engage the lower end plate 434. The fold latch 430 is translatable along an axis of the upper end 402a relative to the upper end plate 436. The lower end plate 434 can define a guide slot 434a, and a plurality of recesses 434b, 434c that extend from the guide slot 434a. The guide slot 434a can be curved so as to define an arc or circle. Each recess 434b, 434c can correspond to a different fold configuration of the toddler seat 400. For example, the lower end plate 434 can define a first recess 434b that corresponds to the expanded configuration and a second recess 434c that corresponds to the folded configuration. The fold latch 430 comprises a protrusion 430a that is configured to translate along the guide slot 434a as the toddler seat 400 is transitioned between the folded and expanded configurations. The protrusion 430a can extend through a linear slot 436a of the upper end plate 436 and into the guide slot 434a of the lower end plate 434 to translate along the linear slot 436a. The protrusion 430a is configured to be selectively received in the recesses 434b, 434c to so as to rotationally lock the upper frame end 402a and lower frame end 402b relative to one another in one of the expanded and collapsed configurations. FIG. 39B shows the toddler seat 400 in the expanded configuration, with the protrusion 430a of the fold latch 430 received in the first recess 434b, and FIG. 39C shows the toddler seat 400 in the folded configuration, with the protrusion 430a of the fold latch 430 received in the second recess 434b.

The toddler seat 400 can optionally comprise an arm bar or child tray 438. The arm bar or child tray 438 can be configured to fold with the seat frame 402. In one example, the fold hub can be configured to guide the arm bar or child tray 438 to transition between the expanded and folded configurations. For example, the arm bar or child tray 438 can comprise a hub 440 that has a protrusion 440a. The lower end plate 434 can have a first groove 434d that receives the protrusion 440a of the hub 440. The first groove 434d can be curved so as to define an arc or circle. The first groove 434d can have an upper end 434e that limits movement of the protrusion 440a along the upwards direction, and hence upward movement of the arm bar or tray 438, when the toddler seat 400 is in the expanded configuration as shown in FIG. 39B. Tupper end plate 436 can have a second groove 436b that receives the protrusion 440a of the hub 440. The second groove 436b has a lower end 436c and an upper end 436d. The lower end 436d limits downward movement of the protrusion 440a, and hence downward movement of the arm bar or tray 438, when the toddler seat 400 is in the expanded configuration as shown in FIG. 39B. When the frame 402 is rotated to the folded configuration, the upper end plate 436 rotates downward, causing the upper end 436d of the second groove 436b to rotate downward and engage the protrusion 440a of the hub 440 to drive the protrusion 440a, and hence the arm bar or tray 438, downward as shown in FIG. 39C.

Referring back to FIGS. 36A to 37B, the toddler seat 400 is configured to removably couple to the child carriage 100. The toddler seat 400 can comprise at least one coupler that is configured to removably couple the toddler seat 400 to the carriage 100. The at least one coupler can comprise a pair of couplers 414(1), 414(2). The first coupler 414(1) of the pair can be configured to removably couple to the first seat coupler 116(1) of the child carriage 100. The first coupler 414(1) can be attached to the first side rail 406 between the first and second rail ends 406a and 406b of the first side rail 406. The second coupler 414(2) of the pair can be configured to removably couple to the second seat coupler 116(2) of the child carriage 100. The second coupler 414(2) can be attached to the second side rail 408 between the first and second rail ends 408a and 408b of the second side rail 408.

Referring to FIGS. 40A to 42, in some examples, each of the first and second couplers 414(1), 414(2) of the toddler seat 400 can define a receptacle 442 that is configured receive a bayonet 117 of a corresponding one of the first and second seat couplers 116(1) and 116(2). It will be noted that, in alternative examples, the child carriage 100 can comprise the receptacles and the toddler seat 400 can comprise the bayonets. Each receptacle 442 defines a recess 444 that is configured to receive at least a portion of a corresponding one of the bayonets 117 therein, such as an upper portion of the bayonet 117. Each of the first and second couplers 414(1), 414(2) can define a protrusion or an opening 446a that is configured to engage another of a protrusion and an opening 118 (labeled in FIG. 5A) of the child carriage 100. FIGS. 40A to 42 show one example in which each of the first and second couplers 414(1), 414(2) defines a protrusion 446a that is configured to be received in an opening 118 (labeled in FIG. 5A) of the child carriage 100. Each protrusion 446a extends into the recess 444 of a respective one of the couplers 414(1), 414(2). Each coupler 414(1), 414(2) can engage a different lateral side of the child carriage 100 so as to limit movement of the toddler seat 400 relative to the carriage 100 along the lateral direction A, the vertical direction V, and/or the longitudinal direction L.

In some examples, each coupler 414(1), 414(2) can comprise a movable latch 446 that comprises the protrusion 446a. The movable latch 446 can be movable between a latched position (FIG. 41B) and an unlatched position (FIG. 41A). In the latched position, the protrusion 446a can extend into an opening 118 of a corresponding one of the seat couplers 116(1), 116(2) of the child carriage 100. In the unlatched position, the protrusion 446a is removed from the opening 118.

Referring more specifically to FIGS. 41A to 42, the toddler seat 400 can comprise an actuator 450 for each coupler 414(1), 414(2) that is configured to be engaged by a caregiver to move the latch 446 between the latched and unlatched positions. Each actuator 450 can be any suitable actuator. Each actuator 450 can define an actuation surface 452 such as a push button that is configured to be depressed into a corresponding one of the fold hubs 418(1), 418(2). In alternative examples (not shown), each actuation surface 452 can define a pull handle. Each actuator 450 can comprise at least one link 454 that operatively couples the engagement surface 452 to the movable latch 446. In one example, the at least one link 454 can comprise at least one ramped surface 454a, such as a pair of ramped surfaces 454a, that engage at least one engagement surface 446b of a corresponding one of the latches 446, so as to cause the at least one engagement surface 454a to ride along the at least one ramped surface 454a, thereby causing the latch 446 to pivot between the latched and unlatched positions.

Referring back to FIGS. 40A and 40B, in some examples, the toddler seat 400 can comprise at least one other coupler 456, such as a pair of other couplers 456, that is disposed in front of, or behind, the pair of couplers 414(1), 414(2). The pair of other couplers 456 can be offset from one another along the lateral direction A. Each of the at least one other coupler 456 can be attached to a respective one of the first and second side rails 406, 408. Each of the at least one other coupler 456 can be configured to removably couple to one of the at least one other coupler 132(1) or 132(2) (labeled in FIG. 3) of the child carriage 100. Each of the at least one other coupler 456 couples the toddler seat 400 to the carriage 100 so as to limit torque applied to the pair of couplers 414(1), 414(2) when a force is applied to the handle 404 (see FIG. 36) of the toddler seat 400.

In some examples, each of the at least one other coupler 456 can comprise a movable latch 458 that is configured to move between a latched configuration (FIG. 40B) and an unlatched configuration (FIG. 40A). For example, each movable latch 458 can define a hook that is configured to pivot between the latched and unlatched configurations. Each movable latch 458 can be configured to be actuated by an actuator 450. The actuator 450 can be any suitable actuator. In some examples, each movable latch 458 can be actuated by an actuator 450 that also actuates one of the latches 446. Each actuator 450 can comprise a link 460 that operatively couples one of the latches 446 to a corresponding one of the actuation surfaces 452. Each link 460 can extend at least partially within one of the first and second side rails 406 and 408. Actuation of the actuator 450 can cause translation of the link 406, thereby causing the latch 458 to pivot between the latched (FIG. 40B) and unlatched configurations (FIG. 40A). The latch 458 can be biased to the latched configuration.

It should be noted that the illustrations and descriptions of the examples and embodiments shown in the figures are for exemplary purposes only, and should not be construed limiting the disclosure. One skilled in the art will appreciate that the present disclosure contemplates various embodiments. Additionally, it should be understood that the concepts described above with the above-described examples and embodiments may be employed alone or in combination with any of the other examples and embodiments described above. It should further be appreciated that the various alternative examples and embodiments described above with respect to one illustrated embodiment can apply to all examples and embodiments as described herein, unless otherwise indicated.

Unless explicitly stated otherwise, each numerical value and range should be interpreted as being approximate as if the word "about," "approximately," or "substantially" preceded the value or range. The terms "about," "approximately," and "substantially" can be understood as describing a range that is within 15 percent of a specified value unless otherwise stated.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain examples have been described, these examples are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

The words "inward," "outward," "upper," and "lower" refer to directions toward or away from, respectively, the geometric center of the component.

It will be understood that reference herein to "a" or "one" to describe a feature such as a component or step does not foreclose additional features or multiples of the feature. For instance, reference to a device having, comprising, including, or defining "one" of a feature does not preclude the device from having, comprising, including, or defining more than one of the feature, as long as the device has, comprises, includes, or defines at least one of the feature. Similarly, reference herein to "one of" a plurality of features does not foreclose the invention from including two or more of the features. For instance, reference to a device having, comprising, including, or defining "one of a protrusion and a recess" does not foreclose the device from having both the protrusion and the recess.

What is claimed is:

1. A carriage for pushing a child carrier that is removable from the carriage, the carriage comprising:
   a frame comprising:
      at least one seat coupler configured to removably couple the child carrier to the carriage;
      a first leg assembly and a second leg assembly, each comprising a front leg and a rear leg that are pivotably coupled to one another about a first pivot axis;
      a first crosspiece that extends between the front legs of the first and second leg assemblies to space the front legs from one another, the first crosspiece comprising a hinge;
      a second crosspiece that extends between the rear legs of the first and second leg assemblies to space the rear legs from one another, the second crosspiece comprising a hinge;
      at least one fold latch configured to releasably lock the child carriage in the expanded position;

a third crosspiece extending between the first leg assembly and the second leg assembly, the third crosspiece including an actuator configured to actuate the at least one fold latch to move the at least one fold latch from a locked position to an unlocked position in which the child carriage can be folded; and a plurality of wheels attached to the front and rear legs of the first and second leg assemblies, wherein:

the carriage is devoid of any push handle that extends above the child carrier;

the frame is configured to fold about the first pivot axis from an expanded configuration to a first folded configuration so as to align the hinges of the first and second crosspieces with one another along a second pivot axis; and the frame is configured to fold about the second pivot axis from the first folded configuration to a second folded configuration.

2. The carriage of claim 1, wherein each of the first and second crosspieces comprises a second hinge, the frame is configured to fold about the first pivot axis from the expanded configuration to the first folded configuration so as to align the second hinges of the first and second crosspieces with one another along a third pivot axis, and the frame is configured to fold about the third pivot axis from the first folded configuration to the second folded configuration.

3. The carriage of claim 1, wherein the frame is configured to fold about the second pivot axis by rotating the first and second leg assemblies towards one another.

4. The carriage of claim 1, wherein the third crosspiece comprising a hinge, wherein:

the frame is configured to fold about the first pivot axis so as to align the hinges of the first, second, and third crosspieces with one another along the second pivot axis; and the frame is configured to fold about the second pivot axis from the first folded configuration to the second folded configuration.

5. The carriage of claim 4, wherein, when the carriage is in the expanded configuration, the first and second crosspieces are offset from one another along a longitudinal direction, and the third crosspiece is positioned higher than the first and second crosspieces with respect to a vertical direction and between the first and second crosspieces with respect to the longitudinal direction.

6. The carriage of claim 4, wherein the third crosspiece defines a carry handle for carrying the carriage when the child carrier is detached from the carriage.

7. The carriage of claim 4, wherein:

the first and second leg assemblies comprise first and second linkages, respectively, that are configured to guide movement of the front and rear legs of the first and second leg assemblies as the frame is transitioned from the expanded configuration to the first folded configuration; and the third crosspiece extends from the first linkage to the second linkage.

8. The carriage of claim 7, wherein:

the first linkage comprises a first link pivotally connected to the front leg of the first leg assembly, and a second link pivotally connected to the rear leg of the first leg assembly, the first and second links being pivotally coupled to one another; and the second linkage comprises a first link pivotally connected to the front leg of the second leg assembly, and a second link pivotally connected to the rear leg of the second leg assembly, the first and second links of the second linkage being pivotally coupled to one another.

9. The carriage of claim 1, wherein the at least one seat coupler is configured to removably couple to a rigid portion of the child carrier.

10. The carriage of claim 1, wherein the at least one seat coupler comprises a pair of bayonets that are configured to removably couple to opposing sides of the child carrier.

11. The carriage of claim 10, wherein the at least one seat coupler comprises at least one other seat coupler disposed in front of or behind the pair of bayonets such that the at least one other seat coupler removably couples to the child carrier at a location that is in front or behind the pair of bayonets.

12. The travel system of claim 11, wherein the child carrier is an infant car seat comprising:

a seat shell; and a handle pivotally coupled to the seat shell such that the handle is configured to be used to carry the infant car seat when the infant car seat is detached from the carriage and to push the carriage when the infant car seat is coupled to the carriage, wherein the handle is configured such that removal of the infant car seat from the carriage causes the handle to be removed from the carriage.

13. The travel system of claim 12, wherein the handle is configured to extend and retract.

14. A travel system, comprising:

the carriage of claim 1; and the child carrier.

15. The travel system of claim 14, wherein the child carrier is a toddler seat comprising:

a frame defining an opening therein;

soft goods seating supported by the frame within the opening to define a seating surface; and a push handle attached to the frame such that the push handle is configured to be used to push the carriage when the toddler seat is coupled to the carriage and such that removal of the toddler seat from the carriage causes the push handle to be removed.

16. The travel system of claim 14, wherein:

the at least one seat coupler comprises a pair of bayonets that are configured to removably couple to opposing sides of the child carrier; and the child carrier comprises a pair of movable latches, each configured to releasably engage one of the bayonets of the pair of bayonets, and an actuator configured to actuate the pair of movable latches.

17. The travel system of claim 14, wherein:

the child carrier has a movable latch on an underside of the child carrier, and an actuator configured to actuate the movable latch; and the at least one seat coupler of the carriage comprises a seat coupler that is configured to be engaged by the movable latch to affix the child carrier to the carriage so as to prevent the child carrier from being removed from the carriage along a vertical direction.

18. The travel system of claim 14, wherein:

the child carrier comprises a movable latch that is configured to affix the child carrier to a car seat base for installation in a vehicle; and the at least one seat coupler of the carriage comprises a seat coupler that is configured to engage the movable latch that affixes the child carrier to the car seat base.

19. A carriage, comprising:

a frame configured to support a removable child carrier above a riding surface, the frame comprising:

a first leg assembly comprising a front leg and a rear leg that are pivotably coupled to one another about a first pivot axis;

a second leg assembly comprising a front leg and a rear leg that are pivotably coupled to one another about the first pivot axis;

a first crosspiece that extends between the front legs of the first and second leg assemblies to space the front legs from one another, the first crosspiece comprising a hinge;

a second crosspiece that extends between the first and second leg assemblies to space the rear legs from one another, the second crosspiece comprising a hinge; and a plurality of wheels attached to the front and rear legs of the first and second leg assemblies; and a basket attached to the frame and disposed between the first and second leg assemblies, the basket having first and second sides, an open upper end, a closed lower end, and a rear end, the rear end extending between the first and second sides and extending outwardly from the second crosspiece along a longitudinal direction such that the second crosspiece is disposed within the basket below the upper end, wherein:

the frame is configured to fold about the first pivot axis from an expanded configuration to a first folded configuration;

the frame is configured to fold about a second pivot axis from the first folded configuration to a second folded configuration, the second pivot axis extending through the hinges of both the first and second crosspieces; and the carriage is configured to be transitioned to the first and second folded configurations while the basket is attached to the frame.

20. The carriage of claim 19, wherein the rear end of the basket comprises a stiffener that is configured to retract relative to the first and second rear legs when the carriage is transitioned to the first folded configuration.

21. The carriage of claim 19, wherein the first and second sides of the basket each comprise at least one fold that permits the rear end to transition between an open position and a closed position, where the rear end extends further from the first and second rear legs in the open position than in the closed position.

22. The carriage of claim 21, comprising at least one pair of magnets that is configured to maintain the rear end in the closed position, and that can be separated from one another to transition the basket to the open position.

23. The carriage of claim 19, wherein the first crosspiece is disposed within the basket below the upper end.

24. A carriage for pushing a child carrier that is removable from the carriage, the carriage comprising:

a frame comprising:

at least one seat coupler configured to removably couple the child carrier to the carriage, wherein the at least one seat coupler comprises a pair of bayonets that are configured to removably couple to opposing sides of the child carrier.;

a first leg assembly and a second leg assembly, each comprising a front leg and a rear leg that are pivotably coupled to one another about a first pivot axis;

a first crosspiece that extends between the front legs of the first and second leg assemblies to space the front legs from one another, the first crosspiece comprising a hinge;

a second crosspiece that extends between the rear legs of the first and second leg assemblies to space the rear legs from one another, the second crosspiece comprising a hinge; and a plurality of wheels attached to the front and rear legs of the first and second leg assemblies, wherein:

the carriage is devoid of any push handle that extends above the child carrier;

the frame is configured to fold about the first pivot axis from an expanded configuration to a first folded configuration so as to align the hinges of the first and second crosspieces with one another along a second pivot axis; and the frame is configured to fold about the second pivot axis from the first folded configuration to a second folded configuration.

* * * * *